United States Patent
Olarig et al.

[19]

[11] Patent Number: 6,003,144
[45] Date of Patent: Dec. 14, 1999

[54] ERROR DETECTION AND CORRECTION

[75] Inventors: Sompong P. Olarig, Cypress; Michael F. Angelo, Houston, both of Tex.

[73] Assignee: Compaq Computer Corporation, Houston, Tex.

[21] Appl. No.: 08/860,029

[22] Filed: Jun. 30, 1997

[51] Int. Cl.$^6$ .................................................. G06F 11/00
[52] U.S. Cl. ............................................................ 714/42
[58] Field of Search ........................ 395/183.18, 185.05, 395/185.06, 185.07; 321/37.2, 37.6, 37.7, 39.1, 40.13, 37.11, 37.12, 44, 45

[56] References Cited

U.S. PATENT DOCUMENTS

| | | | |
|---|---|---|---|
| 3,623,155 | 11/1971 | Hsiao et al. | 340/146.1 |
| 3,648,239 | 3/1972 | Carter et al. | 340/146.1 |
| 3,688,265 | 8/1972 | Carter et al. | 340/146.1 |
| 3,750,154 | 7/1973 | Almasi | 340/174 TF |
| 3,766,521 | 10/1973 | Carter et al. | 371/37.6 |
| 3,825,893 | 7/1974 | Bossen et al. | 340/146.1 |
| 3,868,632 | 2/1975 | Hong et al. | 340/461.1 |
| 4,099,160 | 7/1978 | Flagg | 340/146.1 |
| 4,916,701 | 4/1990 | Eggenberger et al. | 371/37.7 |
| 4,995,041 | 2/1991 | Hetherington et al. | 371/40.1 |
| 5,065,312 | 11/1991 | Bruckert et al. | 395/182.09 |
| 5,107,503 | 4/1992 | Riggle et al. | 371/37.1 |
| 5,226,043 | 7/1993 | Pughe, Jr. et al. | 371/40.1 |
| 5,321,706 | 6/1994 | Holm et al. | 371/51.1 |
| 5,331,645 | 7/1994 | Miller et al. | 371/37.1 |
| 5,331,646 | 7/1994 | Kreuger et al. | 371/40.1 |
| 5,357,521 | 10/1994 | Cheng et al. | 371/40.13 |
| 5,404,361 | 4/1995 | Casorso et al. | 371/40.1 |
| 5,452,261 | 9/1995 | Chung et al. | 365/233 |
| 5,481,552 | 1/1996 | Aldereguia et al. | 371/40.1 |
| 5,490,155 | 2/1996 | Abdoo et al. | 371/40.11 |
| 5,537,425 | 7/1996 | Tsou | 371/51.1 |
| 5,555,250 | 9/1996 | Walker et al. | 371/40.1 |
| 5,577,004 | 11/1996 | Leshem | 365/230.03 |

(List continued on next page.)

FOREIGN PATENT DOCUMENTS 2 182 789 11/1985 United Kingdom.

OTHER PUBLICATIONS

Katti, "Comments on a Systematic (18,8) Code for Correcting Double Errors and Detecting Triple Adjacement Errors", IEEE Trans. on Computers, vol. 44 No. 12, pp. 1472–1473, Dec. 1995.

Demassieux et al., "A 10 MHz (255,223) Reed Soloman Decoder", IEEE Custom Integrated Circuits Conf., pp. 17/6.1–17/6.4, 1988.

Bliss et al., "Error Correcting Code", IBM Technical Disclosure Bulletin, vol. 23, No. 10, pp. 4629–4632, Mar. 1991.

Coe et al., "It Takes Six Ones to Reach a Flaw," IEEE 1995, pp. 140–146.

Novitsky et al., "Optimizing Systems Performance Based on Pentium™ Processors," IEEE 1993, pp. 63–72.

Saini, "Design of the Intel Pentium™ Processor," IEEE 1993, pp. 258–261.

Jahed, "Interfacing Synchronous DRAMs to Pentium Processors," IEEE, pp. 25–28, date unknown.

(List continued on next page.)

*Primary Examiner*—Robert W. Beausoliel, Jr.
*Assistant Examiner*—Pierre Eddy Elisca
*Attorney, Agent, or Firm*—Sharp, Comfort & Merrett, PC

[57] ABSTRACT

A computer system having a CPU, a disk array system accessible by the CPU, and a disk array controller that includes error detection and connection logic. The disk array controller includes a processor and a memory system connected to signal lines carrying data bits, address bits, and check bits. An error detection and correction device is connected to detect and correct N-bit errors in the data bits using the check bits, N being greater than two. An error in the address bits is detected using the same check bits. The data bits are organized as multiple bytes, and the error detection and correction device is connected to detect and correct up to eight-bit errors in each byte and to detect a single-bit error or a two-adjacent-bit error in the address bits.

48 Claims, 24 Drawing Sheets

U.S. PATENT DOCUMENTS

| | | | |
|---|---|---|---|
| 5,579,477 | 11/1996 | Ogletree | 395/183.2 |
| 5,610,929 | 3/1997 | Yamamoto | 371/37.7 |
| 5,691,996 | 11/1997 | Chen et al. | 371/51.1 |
| 5,740,188 | 4/1998 | Olarig | 371/40.11 |
| 5,841,795 | 11/1998 | Olarig et al. | 371/40.13 |

OTHER PUBLICATIONS

Berkman et al., "A Performance Analysis of Pentium Processor Systems," IEEE, 1995, pp. 72–83.

No Author, "Error Correction Codes with Address Checking," IBM Technical Bulletin, vol. 32, No. 1, Jun. 1989, pp. 375–377 (no copy attached).

Lin et al., "Error Control Coding, Fundamentals and Applications", Prentice–Hall, pp. 9–82 (1982).

Hoeve et al., "Error Correction and Concealment in the Compact Disc System", Philips Technical Review, vol. 40, No. 6, pp. 166–172 (1980).

Hsiao, "A Class of Optimal Odd–weight column SEC–DED Codes", IBM J. Res. Revelop., pp. 395–400 (1990).

Fung, "A Survey of the Theory of Error–Correcting Codes", (Located on the Internet) (Undated).

Bossen, "b–Adjacent Error Correction", IBM J. Res. Develop., pp. 402–408 (1970).

Kaneda, "A Class of Odd–Weight–Column SEC–DED–S-bED Codes for Memory System Applications", IEEE Trans. On Computers, vol. C–33, No. 8, pp. 737–739 (1984).

Rao, et al., "Error–Control Coding for Computer Systems", Prentice–Hall, pp. 261–293 (1989).

<----------------Address Bits------------------->

|  | 0123 4567 | 11 1111<br>8901 2345 | 1111 2222<br>6789 0123 | 2222 2233<br>4567 8901 |
|---|---|---|---|---|
| PCHK[F] | xxx0 0000 | 0000 0000 | 0000 0000 | 0000 0000 |
| PCHK[E] | xxx0 0000 | 0000 0000 | 0000 0000 | 0000 0000 |
| PCHK[D] | xxx0 0000 | 0000 0000 | 0000 0000 | 0000 0000 |
| PCHK[C] | xxx0 0000 | 0000 0000 | 0000 0000 | 0000 0000 |
| PCHK[B] | xxx0 0000 | 0000 0000 | 0000 0000 | 0000 0000 |
| PCHK[A] | xxx0 0010 | 0011 1000 | 0011 1110 | 0000 1110 |
| PCHK[9] | xxx0 1100 | 1100 0110 | 1100 0001 | 1011 0001 |
| PCHK[8] | xxx1 0101 | 0101 0101 | 0101 0101 | 0101 0101 |
| PCHK[7] | xxx0 0000 | 0000 1100 | 0000 0010 | 1000 0010 |
| PCHK[6] | xxx0 0000 | 0000 1000 | 0000 0000 | 0000 0001 |
| PCHK[5] | xxx0 0010 | 1010 0000 | 0000 0011 | 0010 0100 |
| PCHK[4] | xxx0 1000 | 0110 0010 | 1000 0100 | 0001 0000 |
| PCHK[3] | xxx0 0000 | 0000 0000 | 1000 1000 | 0100 0010 |
| PCHK[2] | xxx0 0001 | 0000 0011 | 0001 0000 | 1000 1000 |
| PCHK[1] | xxx1 1000 | 0101 0001 | 0110 0000 | 0010 0000 |
| PCHK[0] | xxx1 0111 | 1100 0000 | 0010 1000 | 0100 1000 |

| SYNDROME BIT[Y] | Byte 0<br>0123 4567 | Byte 1<br>11 1111<br>8901 2345 | Byte 2<br>1111 2222<br>6789 0123 | Byte 3<br>2222 2233<br>4567 8901 | Byte 4<br>3333 3333<br>2345 6789 | Byte 5<br>4444 4444<br>0123 4567 | Byte 6<br>4455 5555<br>8901 2345 | Byte 7<br>5555 6666<br>6789 0123 | Byte 8<br>CCCC CCCC<br>0123 4567 | Byte 9<br>CCCC CCCC<br>89AB CDEF | |
|---|---|---|---|---|---|---|---|---|---|---|---|
| F | 0000 0001 | 0000 0001 | 0000 0001 | 0000 0001 | 0000 0001 | 0000 0001 | 0000 0001 | 0000 0001 | 0000 0000 | 0000 0001 | PCHK[F] |
| E | 0000 0010 | 0000 0010 | 0000 0010 | 0000 0010 | 0000 0010 | 0000 0010 | 0000 0010 | 0000 0010 | 0000 0000 | 0000 0010 | PCHK[E] |
| D | 0000 0100 | 0000 0100 | 0000 0100 | 0000 0100 | 0000 0100 | 0000 0100 | 0000 0100 | 0000 0100 | 0000 0000 | 0000 0100 | PCHK[D] |
| C | 0000 1000 | 0000 1000 | 0000 1000 | 0000 1000 | 0000 1000 | 0000 1000 | 0000 1000 | 0000 1000 | 0000 0000 | 0000 1000 | PCHK[C] |
| B | 0001 0000 | 0001 0000 | 0001 0000 | 0001 0000 | 0001 0000 | 0001 0000 | 0001 0000 | 0001 0000 | 0000 0000 | 0001 0000 | PCHK[B] |
| A | 0010 0000 | 0010 0000 | 0010 0000 | 0010 0000 | 0010 0000 | 0010 0000 | 0010 0000 | 0010 0000 | 0000 0000 | 0010 0000 | PCHK[A] |
| 9 | 0100 0000 | 0100 0000 | 0100 0000 | 0100 0000 | 0100 0000 | 0100 0000 | 0100 0000 | 0100 0000 | 0000 0000 | 0100 0000 | PCHK[9] |
| 8 | 1000 0000 | 1000 0000 | 1000 0000 | 1000 0000 | 1000 0000 | 1000 0000 | 1000 0000 | 1000 0000 | 0000 0000 | 1000 0000 | PCHK[8] |
| 7 | 1000 1110 | 1000 1110 | 0010 0111 | 0001 0001 | 0001 0001 | 0001 0001 | 0001 0001 | 0000 0001 | 0000 0001 | 0000 0000 | PCHK[7] |
| 6 | 0001 1100 | 0001 1100 | 0100 0111 | 0010 0011 | 0010 0011 | 0010 0011 | 0010 0011 | 0000 0010 | 0000 0010 | 0000 0000 | PCHK[6] |
| 5 | 0011 1000 | 0001 1000 | 1000 1110 | 0100 0111 | 0100 0111 | 0100 0111 | 0000 0110 | 0000 0100 | 0000 0100 | 0000 0000 | PCHK[5] |
| 4 | 0111 1000 | 0001 1000 | 0001 1100 | 1000 1110 | 1000 1110 | 1000 1110 | 0000 1100 | 0000 1000 | 0000 1000 | 0000 0000 | PCHK[4] |
| 3 | 0011 1100 | 0011 1000 | 0011 1000 | 0001 1100 | 0100 1100 | 0001 1100 | 0000 1000 | 0001 0000 | 0001 0000 | 0000 0000 | PCHK[3] |
| 2 | 0101 0110 | 0011 0110 | 0001 0110 | 0000 0101 | 0000 0101 | 1000 0010 | 1000 0001 | 0010 0001 | 0010 0000 | 0000 0000 | PCHK[2] |
| 1 | 0010 0011 | 0001 0001 | 0000 1000 | 0000 0100 | 0000 0010 | 0000 0001 | 0000 0001 | 0100 0000 | 0100 0000 | 0000 0000 | PCHK[1] |
| 0 | 0100 0111 | 0010 0011 | 0001 0001 | 0000 0100 | 0000 0010 | 0000 0010 | 0000 0010 | 1000 0000 | 1000 0000 | 0000 0000 | PCHK[0] |

<---Syndrome Bit[Y]---> <---Data Bits---> <---Check Bits--->

| Byte 0 | Byte 1 | Byte 2 | Byte 3 | Byte 4 | Byte 5 | Byte 6 | Byte 7 | Byte 8 | Byte 9 |
|---|---|---|---|---|---|---|---|---|---|
| Syndrome code (Hex) and position for a single bit ||||||||||
| 0000 No error |||||||||||
| 8013 D07 | 8087 D15 | 80CD D23 | 80E8 D31 | 8074 D39 | 803A D47 | 801D D55 | 1010 D63 | 0001 CB 0 | 0100 CB 8 |
| 4087 D06 | 40CD D14 | 40E8 D22 | 4074 D30 | 403A D38 | 401D D46 | 4080 D54 | 2020 D62 | 0002 CB 1 | 0200 CB 9 |
| 20CD D05 | 20E8 D13 | 2074 D21 | 203A D29 | 201D D37 | 2080 D45 | 2040 D53 | 4040 D61 | 0004 CB 2 | 0400 CB A |
| 10E8 D04 | 1074 D12 | 103A D20 | 101D D28 | 1080 D36 | 1040 D44 | 1020 D52 | 8080 D60 | 0008 CB 3 | 0800 CB B |
| 0874 D03 | 083A D11 | 081D D19 | 0880 D27 | 0840 D35 | 0820 D43 | 0810 D51 | 0808 D59 | 0010 CB 4 | 1000 CB C |
| 043A D02 | 041D D10 | 0480 D18 | 0440 D26 | 0420 D34 | 0410 D42 | 0408 D50 | 0404 D58 | 0020 CB 5 | 2000 CB D |
| 021D D01 | 0280 D09 | 0240 D17 | 0220 D25 | 0210 D33 | 0208 D41 | 0204 D49 | 0202 D57 | 0040 CB 6 | 4000 CB E |
| 0180 D00 | 0140 D08 | 0120 D16 | 0110 D24 | 0108 D32 | 0104 D40 | 0102 D48 | 0101 D56 | 0080 CB 7 | 8000 CB F |

FIG. 7A

| Syndrome code (Hex) and position for double-bit within the same byte | | | | | | | | | |
|---|---|---|---|---|---|---|---|---|---|
| C094 D0607 | C04A D1415 | C025 D2223 | C09C D3031 | C04E D3839 | C027 D4647 | C09D D5455 | 3030 D6263 | 0003 CB 01 | 0300 CB 89 |
| A0DE D0507 | A06F D1315 | A0B9 D2123 | A0D2 D2931 | A069 D3739 | A0BA D4547 | A05D D5355 | 5050 D6163 | 0005 CB 02 | 0500 CB 8A |
| 90FB D0407 | 90F3 D1215 | 90F7 D2023 | 90F5 D2831 | 90F4 D3639 | 907A D4447 | 903D D5255 | 9090 D6063 | 0009 CB 03 | 0900 CB 8B |
| 8867 D0307 | 88BD D1115 | 88D0 D1923 | 8868 D2731 | 8834 D3539 | 881A D4347 | 880D D5155 | 1818 D5963 | 0011 CB 04 | 1100 CB 8C |
| 8429 D0207 | 849A D1015 | 844D D1823 | 84A8 D2631 | 8454 D3439 | 842A D4247 | 8415 D5055 | 1414 D5863 | 0021 CB 05 | 2100 CB 8D |
| 820E D0107 | 8207 D0915 | 828D D1723 | 82C8 D2531 | 8264 D3339 | 8232 D4147 | 8219 D4955 | 1212 D5763 | 0041 CB 06 | 4100 CB 8E |
| 8193 D0007 | 81C7 D0815 | 81ED D1623 | 81F8 D2431 | 817C D3239 | 813E D4047 | 811F D4855 | 1111 D5663 | 0081 CB 07 | 8100 CB 8F |
| 604A D0506 | 6025 D1314 | 609C D2122 | 604E D2930 | 6027 D3738 | 609D D4546 | 60C0 D5354 | 6060 D6162 | 0006 CB 12 | 0600 CB 9A |
| 506F D0406 | 50B9 D1214 | 50D2 D2022 | 5069 D2830 | 50BA D3638 | 505D D4446 | 50A0 D5254 | A0A0 D6062 | 000A CB 13 | 0A00 CB 9B |
| 48F3 D0306 | 48F7 D1114 | 48F5 D1922 | 48F4 D2730 | 487A D3538 | 483D D4346 | 4890 D5154 | 2828 D5962 | 0012 CB 14 | 1200 CB 9C |
| 44BD D0206 | 44D0 D1014 | 4468 D1822 | 4434 D2630 | 441A D3438 | 440D D4246 | 4488 D5054 | 2424 D5862 | 0022 CB 15 | 2200 CB 9D |
| 429A D0106 | 424D D0914 | 42A8 D1722 | 4254 D2530 | 422A D3338 | 4215 D4146 | 4284 D4954 | 2222 D5762 | 0042 CB 16 | 4200 CB 9E |
| 4107 D0006 | 418D D0814 | 41C8 D1622 | 4164 D2430 | 4132 D3238 | 4119 D4046 | 4182 D4854 | 2121 D5662 | 0082 CB 17 | 8200 CB 9F |
| 3025 D0405 | 309C D1213 | 304E D2021 | 3027 D2829 | 309D D3637 | 30C0 D4445 | 3060 D5253 | C0C0 D6061 | 000C CB 23 | 0C00 CB AB |
| 28B9 D0305 | 28D2 D1113 | 2869 D1921 | 28BA D2729 | 285D D3537 | 28A0 D4345 | 2850 D5153 | 4848 D5961 | 0014 CB 24 | 1400 CB AC |
| 24F7 D0205 | 24F5 D1013 | 24F4 D1821 | 247A D2629 | 243D D3437 | 2490 D4245 | 2448 D5053 | 4444 D5861 | 0024 CB 25 | 2400 CB AD |
| 22D0 D0105 | 2268 D0913 | 2234 D1721 | 221A D2529 | 220D D3337 | 2288 D4145 | 2244 D4953 | 4242 D5761 | 0044 CB 26 | 4400 CB AE |
| 214D D0005 | 21A8 D0813 | 2154 D1621 | 212A D2429 | 2115 D3237 | 2184 D4045 | 2142 D4853 | 4141 D5661 | 0084 CB 27 | 8400 CB AF |
| 189C D0304 | 184E D1112 | 1827 D1920 | 189D D2728 | 18C0 D3536 | 1860 D4344 | 1830 D5152 | 8888 D5960 | 0018 CB 34 | 1800 CB BC |
| 14D2 D0204 | 1469 D1012 | 14BA D1820 | 145D D2628 | 14A0 D3436 | 1450 D4244 | 1428 D5052 | 8484 D5860 | 0028 CB 35 | 2800 CB BD |
| 12F5 D0104 | 12F4 D0912 | 127A D1720 | 123D D2528 | 1290 D3336 | 1248 D4144 | 1224 D4952 | 8282 D5760 | 0048 CB 36 | 4800 CB BE |
| 1168 D0004 | 1134 D0812 | 111A D1620 | 110D D2428 | 1188 D3236 | 1144 D4044 | 1122 D4852 | 8181 D5660 | 0088 CB 37 | 8800 CB BF |
| 0C4E D0203 | 0C27 D1011 | 0C9D D1819 | 0CC0 D2627 | 0C60 D3435 | 0C30 D4243 | 0C18 D5051 | 0C0C D5859 | 0030 CB 45 | 3000 CB CD |
| 0A69 D0103 | 0ABA D0911 | 0A5D D1719 | 0AA0 D2527 | 0A50 D3335 | 0A28 D4143 | 0A14 D4951 | 0A0A D5759 | 0050 CB 46 | 5000 CB CE |
| 09F4 D0003 | 097A D0811 | 093D D1619 | 0990 D2427 | 0948 D3235 | 0924 D4043 | 0912 D4851 | 0909 D5659 | 0090 CB 47 | 9000 CB CF |
| 0627 D0102 | 069D D0910 | 06C0 D1718 | 0660 D2526 | 0630 D3334 | 0618 D4142 | 060C D4950 | 0606 D5758 | 0060 CB 56 | 6000 CB DE |
| 05BA D0002 | 055D D0810 | 05A0 D1618 | 0550 D2426 | 0528 D3234 | 0514 D4042 | 050A D4850 | 0505 D5658 | 00A0 CB 57 | A000 CB DF |
| 039D D0001 | 03C0 D0809 | 0360 D1617 | 0330 D2425 | 0318 D3233 | 030C D4041 | 0306 D4849 | 0303 D5657 | 00C0 CB 67 | C000 CB EF |

FIG. 7B

| Syndrome code and position for any combination of 3 bits within the same byte ||||||||||
|---|---|---|---|---|---|---|---|---|---|
| E059 D0506 07 | E0A2 D1314 15 | E051 D2122 23 | E0A6 D2930 31 | E053 D3738 39 | E0A7 D4546 47 | E0DD D5354 55 | 7070 D6162 63 | 0007 CB 012 | 0700 CB 89A |
| D07C D0406 07 | D03E D1214 15 | D01F D2022 23 | D081 D2830 31 | D0CE D3638 39 | D067 D4446 47 | D0BD D5254 55 | B0B0 D6062 63 | 000B CB 013 | 0B00 CB 89B |
| C8E0 D0306 07 | C870 D1114 15 | C838 D1922 23 | C81C D2730 31 | C80E D3538 39 | C807 D4346 47 | C88D D5154 55 | 3838 D5962 63 | 0013 CB 014 | 1300 CB 89C |
| C4AE D0206 07 | C457 D1014 15 | C4A5 D1822 23 | C4DC D2630 31 | C46E D3438 39 | C437 D4246 47 | C495 D5054 55 | 3434 D5862 63 | 0023 CB 015 | 2300 CB 89D |
| C289 D0106 07 | C2CA D0914 15 | C265 D1722 23 | C2BC D2530 31 | C25E D3338 39 | C22F D4146 47 | C299 D4954 55 | 3232 D5762 63 | 0043 CB 016 | 4300 CB 89E |
| C114 D0006 07 | C10A D0814 15 | C105 D1622 23 | C18C D2430 31 | C146 D3238 39 | C123 D4046 47 | C19F D4854 55 | 3131 D5662 63 | 0083 CB 017 | 8300 CB 89F |
| B036 D0405 07 | B01B D1213 15 | B083 D2021 23 | B0CF D2829 31 | B0E9 D3637 39 | B0FA D4445 47 | B07D D5253 55 | D0D0 D6061 63 | 000D CB 023 | 0D00 CB 8AB |
| A8AA D0305 07 | A855 D1113 15 | A8A4 D1921 23 | A852 D2729 31 | A829 D3537 39 | A89A D4345 47 | A84D D5153 55 | 5858 D5961 63 | 0015 CB 024 | 1500 CB 8AC |
| A4E4 D0205 07 | A472 D1013 15 | A439 D1821 23 | A492 D2629 31 | A449 D3437 39 | A4AA D4245 47 | A455 D5053 55 | 5454 D5861 63 | 0025 CB 025 | 2500 CB 8AD |
| A2C3 D0105 07 | A2EF D0913 15 | A2F9 D1721 23 | A2F2 D2529 31 | A279 D3337 39 | A2B2 D4145 47 | A259 D4953 55 | 5252 D5761 63 | 0045 CB 026 | 4500 CB 8AE |
| A15E D0005 07 | A12F D0813 15 | A199 D1621 23 | A1C2 D2429 31 | A161 D3237 39 | A1BE D4045 47 | A15F D4853 55 | 5151 D5661 63 | 0085 CB 027 | 8500 CB 8AF |
| 988F D0304 07 | 98C9 D1112 15 | 98EA D1920 23 | 9875 D2728 31 | 98B4 D3536 39 | 985A D4344 47 | 982D D5152 55 | 9898 D5960 63 | 0019 CB 034 | 1900 CB 8BC |
| 94C1 D0204 07 | 94EE D1012 15 | 9477 D1820 23 | 94B5 D2628 31 | 94D4 D3436 39 | 946A D4244 47 | 9435 D5052 55 | 9494 D5860 63 | 0029 CB 035 | 2900 CB 8BD |
| 92E6 D0104 07 | 9273 D0912 15 | 92B7 D1720 23 | 92D5 D2528 31 | 92E4 D3336 39 | 9272 D4144 47 | 9239 D4952 55 | 9292 D5760 63 | 0049 CB 036 | 4900 CB 8BE |
| 917B D0004 07 | 91B3 D0812 15 | 91D7 D1620 23 | 91E5 D2428 31 | 91FC D3236 39 | 917E D4044 47 | 913F D4852 55 | 9191 D5660 63 | 0089 CB 037 | 8900 CB 8BF |
| 8C5D D0203 07 | 8CA0 D1011 15 | 8C50 D1819 23 | 8C28 D2627 31 | 8C14 D3435 39 | 8C0A D4243 47 | 8C05 D5051 55 | 1C1C D5859 63 | 0031 CB 045 | 3100 CB 8CD |
| 8A7A D0103 07 | 8A3D D0911 15 | 8A90 D1719 23 | 8A48 D2527 31 | 8A24 D3335 39 | 8A12 D4143 47 | 8A09 D4951 55 | 1A1A D5759 63 | 0051 CB 046 | 5100 CB 8CE |
| 89E7 D0003 07 | 89FD D0811 15 | 89F0 D1619 23 | 8978 D2427 31 | 893C D3235 39 | 891E D4043 47 | 890F D4851 55 | 1919 D5659 63 | 0091 CB 047 | 9100 CB 8CF |
| 8634 D0102 07 | 861A D0910 15 | 860D D1718 23 | 8688 D2526 31 | 8644 D3334 39 | 8622 D4142 47 | 8611 D4950 55 | 1616 D5758 63 | 0061 CB 056 | 6100 CB 8DE |
| 85A9 D0002 07 | 85DA D0810 15 | 856D D1618 23 | 85B8 D2426 31 | 855C D3234 39 | 852E D4042 47 | 8517 D4850 55 | 1515 D5658 63 | 00A1 CB 057 | A100 CB 8DF |
| 838E D0001 07 | 8347 D0809 15 | 83AD D1617 23 | 83D8 D2425 31 | 836C D3233 39 | 8336 D4041 47 | 831B D4849 55 | 1313 D5657 63 | 00C1 CB 067 | C100 CB 8EF |

FIG. 7C

| | | | | | | | | | |
|---|---|---|---|---|---|---|---|---|---|
| 70A2 D0405 06 | 7051 D1213 14 | 70A6 D2021 22 | 7053 D2829 30 | 70A7 D3637 38 | 70DD D4445 46 | 70E0 D5253 54 | E0E0 D6061 62 | 000E CB 123 | 0E00 CB 9AB |
| 683E D0305 06 | 681F D1113 14 | 6881 D1921 22 | 68CE D2729 30 | 6867 D3537 38 | 68BD D4345 46 | 68D0 D5153 54 | 6868 D5961 62 | 0016 CB 124 | 1600 CB 9AC |
| 6470 D0205 06 | 6438 D1013 14 | 641C D1821 22 | 640E D2629 30 | 6407 D3437 38 | 648D D4245 46 | 64C8 D5053 54 | 6464 D5861 62 | 0026 CB 125 | 2600 CB 9AD |
| 6257 D0105 06 | 62A5 D0913 14 | 62DC D1721 22 | 626E D2529 30 | 6237 D3337 38 | 6295 D4145 46 | 62C4 D4953 54 | 6262 D5761 62 | 0046 CB 126 | 4600 CB 9AE |
| 61CA D0005 06 | 6165 D0813 14 | 61BC D1621 22 | 615E D2429 30 | 612F D3237 38 | 6199 D4045 46 | 61C2 D4853 54 | 6161 D5661 62 | 0086 CB 127 | 8600 CB 9AF |
| 581B D0304 06 | 5883 D1112 14 | 58CF D1920 22 | 58E9 D2728 30 | 58FA D3536 38 | 587D D4344 46 | 58B0 D5152 54 | A8A8 D5960 62 | 001A CB 134 | 1A00 CB 9BC |
| 5455 D0204 06 | 54A4 D1012 14 | 5452 D1820 22 | 5429 D2628 30 | 549A D3436 38 | 544D D4244 46 | 54A8 D5052 54 | A4A4 D5860 62 | 002A CB 135 | 2A00 CB 9BD |
| 5272 D0104 06 | 5239 D0912 14 | 5292 D1720 22 | 5249 D2528 30 | 52AA D3336 38 | 5255 D4144 46 | 52A4 D4952 54 | A2A2 D5760 62 | 004A CB 136 | 4A00 CB 9BE |
| 51EF D0004 06 | 51F9 D0812 14 | 51F2 D1620 22 | 5179 D2428 30 | 51B2 D3236 38 | 5159 D4044 46 | 51A2 D4852 54 | A1A1 D5660 62 | 008A CB 137 | 8A00 CB 9BF |
| 4CC9 D0203 06 | 4CEA D1011 14 | 4C75 D1819 22 | 4CB4 D2627 30 | 4C5A D3435 38 | 4C2D D4243 46 | 4C98 D5051 54 | 2C2C D5859 62 | 0032 CB 145 | 3200 CB 9CD |
| 4AEE D0103 06 | 4A77 D0911 14 | 4AB5 D1719 22 | 4AD4 D2527 30 | 4A6A D3335 38 | 4A35 D4143 46 | 4A94 D4951 54 | 2A2A D5759 62 | 0052 CB 146 | 5200 CB 9CE |
| 4973 D0003 06 | 49B7 D0811 14 | 49D5 D1619 22 | 49E4 D2427 30 | 4972 D3235 38 | 4939 D4043 46 | 4992 D4851 54 | 2929 D5659 62 | 0092 CB 147 | 9200 CB 9CF |
| 46A0 D0102 06 | 4650 D0910 14 | 4628 D1718 22 | 4614 D2526 30 | 460A D3334 38 | 4605 D4142 46 | 468C D4950 54 | 2626 D5758 62 | 0062 CB 156 | 6200 CB 9DE |
| 453D D0002 06 | 4590 D0810 14 | 4548 D1618 22 | 4524 D2426 30 | 4512 D3234 38 | 4509 D4042 46 | 458A D4850 54 | 2525 D5658 62 | 00A2 CB 157 | A200 CB 9DF |
| 431A D0001 06 | 430D D0809 14 | 4388 D1617 22 | 4344 D2425 30 | 4322 D3233 38 | 4311 D4041 46 | 4386 D4849 54 | 2323 D5657 62 | 00C2 CB 167 | C200 CB 9EF |
| 3851 D0304 05 | 38A6 D1112 13 | 3853 D1920 21 | 38A7 D2728 29 | 38DD D3536 37 | 38E0 D4344 45 | 3870 D5152 53 | C8C8 D5960 61 | 001C CB 234 | 1C00 CB ABC |
| 341F D0204 05 | 3481 D1012 13 | 34CE D1820 21 | 3467 D2628 29 | 34BD D3436 37 | 34D0 D4244 45 | 3468 D5052 53 | C4C4 D5860 61 | 002C CB 235 | 2C00 CB ABD |
| 3238 D0104 05 | 321C D0912 13 | 320E D1720 21 | 3207 D2528 29 | 328D D3336 37 | 32C8 D4144 45 | 3264 D4952 53 | C2C2 D5760 61 | 004C CB 236 | 4C00 CB ABE |
| 31A5 D000 405 | 31DC D0812 13 | 316E D1620 21 | 3137 D2428 29 | 3195 D3236 37 | 31C4 D4044 45 | 3162 D4852 53 | C1C1 D5660 61 | 008C CB 237 | 8C00 CB ABF |
| 2C83 D0203 05 | 2CCF D1011 13 | 2CE9 D1819 21 | 2CFA D2627 29 | 2C7D D3435 37 | 2CB0 D4243 45 | 2C58 D5051 53 | 4C4C D5859 61 | 0034 CB 245 | 3400 CB ACD |
| 2AA4 D0103 05 | 2A52 D0911 13 | 2A29 D1719 21 | 2A9A D2527 29 | 2A4D D3335 37 | 2AA8 D4143 45 | 2A54 D4951 53 | 4A4A D5759 61 | 0054 CB 246 | 5400 CB ACE |
| 2939 D0003 05 | 2992 D0811 13 | 2949 D1619 21 | 29AA D2427 29 | 2955 D3235 37 | 29A4 D4043 45 | 2952 D4851 53 | 4949 D5659 61 | 0094 CB 247 | 9400 CB ACF |
| 26EA D0102 05 | 2675 D0910 13 | 26B4 D1718 21 | 265A D2526 29 | 262D D3334 37 | 2698 D4142 45 | 264C D4950 53 | 4646 D5758 61 | 0064 CB 256 | 6400 CB ADE |
| 2577 D0002 05 | 25B5 D0810 13 | 25D4 D1618 21 | 256A D2426 29 | 2535 D3234 37 | 2594 D4042 45 | 254A D4850 53 | 4545 D5658 61 | 00A4 CB 257 | A400 CB ADF |
| 2350 D0001 05 | 2328 D0809 13 | 2314 D1617 21 | 230A D2425 29 | 2305 D3233 37 | 238C D4041 45 | 2346 D4849 53 | 4343 D5657 61 | 00C4 CB 267 | C400 CB AEF |

FIG. 7D

| 1CA6 D0203 04 | 1C53 D1011 12 | 1CA7 D1819 20 | 1CDD D2627 28 | 1CE0 D3435 36 | 1C70 D4243 44 | 1C38 D5051 52 | 8C8C D5859 60 | 0038 CB 345 | 3800 CB BCD |
|---|---|---|---|---|---|---|---|---|---|
| 1A81 D0103 04 | 1ACE D0911 12 | 1A67 D1719 20 | 1ABD D2527 28 | 1AD0 D3335 36 | 1A68 D4143 44 | 1A34 D4951 52 | 8A8A D5759 60 | 0058 CB 346 | 5800 CB BCE |
| 191C D0003 04 | 190E D0811 12 | 1907 D1619 20 | 198D D2427 28 | 19C8 D3235 36 | 1964 D4043 44 | 1932 D4851 52 | 8989 D5659 60 | 0098 CB 347 | 9800 CB BCF |
| 16CF D0102 04 | 16E9 D0910 12 | 16FA D1718 20 | 167D D2526 28 | 16B0 D3334 36 | 1658 D4142 44 | 162C D4950 52 | 8686 D5758 60 | 0068 CB 356 | 6800 CB BDE |
| 1552 D0002 04 | 1529 D0810 12 | 159A D1618 20 | 154D D2426 28 | 15A8 D3234 36 | 1554 D4042 44 | 152A D4850 52 | 8585 D5658 60 | 00A8 CB 357 | A800 CB BDF |
| 1375 D0001 04 | 13B4 D0809 12 | 135A D1617 20 | 132D D2425 28 | 1398 D3233 36 | 134C D4041 44 | 1326 D4849 52 | 8383 D5657 60 | 00C8 CB 367 | C800 CB BEF |
| 0E53 D0102 03 | 0EA7 D0910 11 | 0EDD D1718 19 | 0EE0 D2526 27 | 0E70 D3334 35 | 0E38 D4142 43 | 0E1C D4950 51 | 0E0E D5758 59 | 0070 CB 456 | 7000 CB CDE |
| 0DCE D0002 03 | 0D67 D0810 11 | 0DBD D1618 19 | 0DD0 D2426 27 | 0D68 D3234 35 | 0D34 D4042 43 | 0D1A D4850 51 | 0D0D D5658 59 | 00B0 CB 457 | B000 CB CDF |
| 0BE9 D0001 03 | 0BFA D0809 11 | 0B7D D1617 19 | 0BB0 D2425 27 | 0B58 D3233 35 | 0B2C D4041 43 | 0B16 D4849 51 | 0B0B D5657 59 | 00D0 CB 467 | D000 CB CEF |
| 07A7 D0001 02 | 07DD D0809 10 | 07E0 D1617 18 | 0770 D2425 26 | 0738 D3233 34 | 071C D4041 42 | 070E D4849 50 | 0707 D5657 58 | 00E0 CB 567 | E000 CB DEF |

FIG. 7E

| Syndrome code and position for any combination of 4 bits within the same byte | | | | | | | | | |
|---|---|---|---|---|---|---|---|---|---|
| F0B1 D0405 0607 | F0D6 D1213 1415 | F06B D2021 2223 | F0BB D2829 3031 | F0D3 D3637 3839 | F0E7 D4445 4647 | F0FD D5253 5455 | F0F0 D6061 6263 | 000F CB 0123 | 0F00 CB 89AB |
| E82D D0305 0607 | E898 D1113 1415 | E84C D1921 2223 | E826 D2729 3031 | E813 D3537 3839 | E887 D4345 4647 | E8CD D5153 5455 | 7878 D5961 6263 | 0017 CB 0124 | 1700 CB 89AC |
| E463 D0205 0607 | E4BF D1013 1415 | E4D1 D1821 2223 | E4E6 D2629 3031 | E473 D3437 3839 | E4B7 D4245 4647 | E4D5 D5053 5455 | 7474 D5861 6263 | 0027 CB 0125 | 2700 CB 89AD |
| E244 D0105 0607 | E222 D0913 1415 | E211 D1721 2223 | E286 D2529 3031 | E243 D3337 3839 | E2AF D4145 4647 | E2D9 D4953 5455 | 7272 D5761 6263 | 0047 CB 0126 | 4700 CB 89AE |
| E1D9 D0005 0607 | E1E2 D0813 1415 | E171 D1621 2223 | E1B6 D2429 3031 | E15B D3237 3839 | E1A3 D4045 4647 | E1DF D4853 5455 | 7171 D5661 6263 | 0087 CB 0127 | 8700 CB 89AF |
| D808 D0304 0607 | D804 D1112 1415 | D802 D1920 2223 | D801 D2728 3031 | D88E D3536 3839 | D847 D4344 4647 | D8AD D5152 5455 | B8B8 D5960 6263 | 001B CB 0134 | 1B00 CB 89BC |
| D446 D0204 0607 | D423 D1012 1415 | D49F D1820 2223 | D4C1 D2628 3031 | D4EE D3436 3839 | D477 D4244 4647 | D4B5 D5052 5455 | B4B4 D5860 6263 | 002B CB 0135 | 2B00 CB 89BD |
| D261 D0104 0607 | D2BE D0912 1415 | D25F D1720 2223 | D2A1 D2528 3031 | D2DE D3336 3839 | D26F D4144 4647 | D2B9 D4952 5455 | B2B2 D5760 6263 | 004B CB 0136 | 4B00 CB 89BE |
| D1FC D0004 0607 | D17F D0812 1415 | D13F D1620 2223 | D191 D2428 3031 | D1C6 D3236 3839 | D163 D4044 4647 | D1BF D4852 5455 | B1B1 D5660 6263 | 008B CB 0137 | 8B00 CB 89BF |
| CCDA D0203 0607 | CC6D D1011 1415 | CCB8 D1819 2223 | CC5C D2627 3031 | CC2E D3435 3839 | CC17 D4243 4647 | CC85 D5051 5455 | 3C3C D5859 6263 | 0033 CB 0145 | 3300 CB 89CD |
| CAFD D0103 0607 | CAF0 D0911 1415 | CA78 D1719 2223 | CA3C D2527 3031 | CA1E D3335 3839 | CA0F D4143 4647 | CA89 D4951 5455 | 3A3A D5759 6263 | 0053 CB 0146 | 5300 CB 89CE |
| C960 D0003 0607 | C930 D0811 1415 | C918 D1619 2223 | C90C D2427 3031 | C906 D3235 3839 | C903 D4043 4647 | C98F D4851 5455 | 3939 D5659 6263 | 0093 CB 0147 | 9300 CB 89CF |
| C6B3 D0102 0607 | C6D7 D0910 1415 | C6E5 D1718 2223 | C6FC D2526 3031 | C67E D3334 3839 | C63F D4142 4647 | C691 D4950 5455 | 3636 D5758 6263 | 0063 CB 0156 | 6300 CB 89DE |
| C52E D0002 0607 | C517 D0810 1415 | C585 D1618 2223 | C5CC D2426 3031 | C566 D3234 3839 | C533 D4042 4647 | C597 D4850 5455 | 3535 D5658 6263 | 00A3 CB 0157 | A300 CB 89DF |
| C309 D0001 0607 | C38A D0809 1415 | C345 D1617 2223 | C3AC D2425 3031 | C356 D3233 3839 | C32B D4041 4647 | C39B D4849 5455 | 3333 D5657 6263 | 00C3 CB 0167 | C300 CB 89EF |
| B842 D0304 0507 | B821 D1112 1315 | B89E D1920 2123 | B84F D2728 2931 | B8A9 D3536 3739 | B8DA D4344 4547 | B86D D5152 5355 | D8D8 D5960 6163 | 001D CB 0234 | 1D00 CB 8ABC |
| B40C D0204 0507 | B406 D1012 1315 | B403 D1820 2123 | B48F D2628 2931 | B4C9 D3436 3739 | B4EA D4244 4547 | B475 D5052 5355 | D4D4 D5860 6163 | 002D CB 0235 | 2D00 CB 8ABD |
| B22B D0104 0507 | B29B D0912 1315 | B2C3 D1720 2123 | B2EF D2528 2931 | B2F9 D3336 3739 | B2F2 D4144 4547 | B279 D4952 5355 | D2D2 D5760 6163 | 004D CB 0236 | 4D00 CB 8ABE |
| B1B6 D0004 0507 | B15B D0812 1315 | B1A3 D1620 2123 | B1DF D2428 2931 | B1E1 D3236 3739 | B1FE D4044 4547 | B17F D4852 5355 | D1D1 D5660 6163 | 008D CB 0237 | 8D00 CB 8ABF |
| AC90 D0203 0507 | AC48 D1011 1315 | AC24 D1819 2123 | AC12 D2627 2931 | AC09 D3435 3739 | AC8A D4243 4547 | AC45 D5051 5355 | 5C5C D5859 6163 | 0035 CB 0245 | 3500 CB 8ACD |
| AAB7 D0103 0507 | AAD5 D0911 1315 | AAE4 D1719 2123 | AA72 D2527 2931 | AA39 D3335 3739 | AA92 D4143 4547 | AA49 D4951 5355 | 5A5A D5759 6163 | 0055 CB 0246 | 5500 CB 8ACE |
| A92A D0003 0507 | A915 D0811 1315 | A984 D1619 2123 | A942 D2427 2931 | A921 D3235 3739 | A99E D4043 4547 | A94F D4851 5355 | 5959 D5659 6163 | 0095 CB 0247 | 9500 CB 8ACF |
| A6F9 D0102 0507 | A6F2 D0910 1315 | A679 D1718 2123 | A6B2 D2526 2931 | A659 D3334 3739 | A6A2 D4142 4547 | A651 D4950 5355 | 5656 D5758 6163 | 0065 CB 0256 | 6500 CB 8ADE |
| A564 D0002 0507 | A532 D0810 1315 | A519 D1618 2123 | A582 D2426 2931 | A541 D3234 3739 | A5AE D4042 4547 | A557 D4850 5355 | 5555 D5658 6163 | 00A5 CB 0257 | A500 CB 8ADF |

FIG. 7F

| A343 D0001 0507 | A3AF D0809 1315 | A3D9 D1617 2123 | A3E2 D2425 2931 | A371 D3233 3739 | A3B6 D4041 4547 | A35B D4849 5355 | 5353 D5657 6163 | 00C5 CB 0267 | C500 CB 8AEF |
|---|---|---|---|---|---|---|---|---|---|
| 9CB5 D0203 0407 | 9CD4 D1011 1215 | 9C6A D1819 2023 | 9C35 D2627 2831 | 9C94 D3435 3639 | 9C4A D4243 4447 | 9C25 D5051 5255 | 9C9C D5859 6063 | 0039 CB 0345 | 3900 CB 8BCD |
| 9A92 D0103 0407 | 9A49 D0911 1215 | 9AAA D1719 2023 | 9A55 D2527 2831 | 9A52 D3335 3639 | 9A52 D4143 4447 | 9A29 D4951 5255 | 9A9A D5759 6063 | 0059 CB 0346 | 5900 CB 8BCE |
| 990F D0003 0407 | 9989 D0811 1215 | 99CA D1619 2023 | 9965 D2427 2831 | 99BC D3235 3639 | 995E D4043 4447 | 992F D4851 5255 | 9999 D5659 6063 | 0099 CB 0347 | 9900 CB 8BCF |
| 96DC D0102 0407 | 966E D0910 1215 | 9637 D1718 2023 | 9695 D2526 2831 | 96C4 D3334 3639 | 9662 D4142 4447 | 9631 D4950 5255 | 9696 D5758 6063 | 0069 CB 0356 | 6900 CB 8BDE |
| 9541 D0002 0407 | 95AE D0810 1215 | 9557 D1618 2023 | 95A5 D2426 2831 | 95DC D3234 3639 | 956E D4042 4447 | 9537 D4850 5255 | 9595 D5658 6063 | 00A9 CB 0357 | A900 CB 8BDF |
| 9366 D0001 0407 | 9333 D0809 1215 | 9397 D1617 2023 | 93C5 D2425 2831 | 93EC D3233 3639 | 9376 D4041 4447 | 933B D4849 5255 | 9393 D5657 6063 | 00C9 CB 0367 | C900 CB 8BEF |
| 8E40 D0102 0307 | 8E20 D0910 1115 | 8E10 D1718 1923 | 8E08 D2526 2731 | 8E04 D3334 3539 | 8E02 D4142 4347 | 8E01 D4950 5155 | 1E1E D5758 5963 | 0071 CB 0456 | 7100 CB 8CDE |
| 8DDD D0002 0307 | 8DE0 D0810 1115 | 8D70 D1618 1923 | 8D38 D2426 2731 | 8D1C D3234 3539 | 8D0E D4042 4347 | 8D07 D4850 5155 | 1D1D D5658 5963 | 00B1 CB 0457 | B100 CB 8CDF |
| 8BFA D0001 0307 | 8B7D D0809 1115 | 8BB0 D1617 1923 | 8B58 D2425 2731 | 8B2C D3233 3539 | 8B16 D4041 4347 | 8B0B D4849 5155 | 1B1B D5657 5963 | 00D1 CB 0467 | D100 CB 8CEF |
| 87B4 D0001 0207 | 875A D0809 1015 | 872D D1617 1823 | 8798 D2425 2631 | 874C D3233 3439 | 8726 D4041 4247 | 8713 D4849 5055 | 1717 D5657 5863 | 00E1 CB 0567 | E100 CB 8DEF |
| 78D6 D0304 0506 | 786B D1112 1314 | 78BB D1920 2122 | 78D3 D2728 2930 | 78E7 D3536 3738 | 78FD D4344 4546 | 78F0 D5152 5354 | E8E8 D5960 6162 | 001E CB 1234 | 1E00 CB 9ABC |
| 7498 D0204 0506 | 744C D1012 1314 | 7426 D1820 2122 | 7413 D2628 2930 | 7487 D3436 3738 | 74CD D4244 4546 | 74E8 D5052 5354 | E4E4 D5860 6162 | 002E CB 1235 | 2E00 CB 9ABD |
| 72BF D0104 0506 | 72D1 D0912 1314 | 72E6 D1720 2122 | 7273 D2528 2930 | 72B7 D3336 3738 | 72D5 D4144 4546 | 72E4 D4952 5354 | E2E2 D5760 6162 | 004E CB 1236 | 4E00 CB 9ABE |
| 7122 D0004 0506 | 7111 D0812 1314 | 7186 D1620 2122 | 7143 D2428 2930 | 71AF D3236 3738 | 71D9 D4044 4546 | 71E2 D4852 5354 | E1E1 D5660 6162 | 008E CB 1237 | 8E00 CB 9ABF |
| 6C04 D0203 0506 | 6C02 D1011 1314 | 6C01 D1819 2122 | 6C8E D2627 2930 | 6C47 D3435 3738 | 6CAD D4243 4546 | 6CD8 D5051 5354 | 6C6C D5859 6162 | 0036 CB 1245 | 3600 CB 9ACD |
| 6A23 D0103 0506 | 6A9F D0911 1314 | 6AC1 D1719 2122 | 6AEE D2527 2930 | 6A77 D3335 3738 | 6AB5 D4143 4546 | 6AD4 D4951 5354 | 6A6A D5759 6162 | 0056 CB 1246 | 5600 CB 9ACE |
| 69BE D0003 0506 | 695F D0811 1314 | 69A1 D1619 2122 | 69DE D2427 2930 | 696F D3235 3738 | 69B9 D404 3546 | 69D2 D4851 5354 | 6969 D5659 6162 | 0096 CB 1247 | 9600 CB 9ACF |
| 666D D0102 0506 | 66B8 D0910 1314 | 665C D1718 2122 | 662E D2526 2930 | 6617 D3334 3738 | 6685 D4142 4546 | 66CC D4950 5354 | 6666 D5758 6162 | 0066 CB 1256 | 6600 CB 9ADE |
| 65F0 D0002 0506 | 6578 D0810 1314 | 653C D1618 2122 | 651E D2426 2930 | 650F D3234 3738 | 6589 D4042 4546 | 65CA D4850 5354 | 6565 D5658 6162 | 00A6 CB 1257 | A600 CB 9ADF |
| 63D7 D0001 0506 | 63E5 D0809 1314 | 63FC D1617 2122 | 637E D2425 2930 | 633F D3233 3738 | 6391 D4041 4546 | 63C6 D4849 5354 | 6363 D5657 6162 | 00C6 CB 1267 | C600 CB 9AEF |
| 5C21 D0203 0406 | 5C9E D1011 1214 | 5C4F D1819 2022 | 5CA9 D2627 2830 | 5CDA D3435 3638 | 5C6D D4243 4446 | 5CB8 D5051 5254 | ACAC D5859 6062 | 003A CB 1345 | 3A00 CB 9BCD |
| 5A06 D0103 0406 | 5A03 D0911 1214 | 5A8F D1719 2022 | 5AC9 D2527 2830 | 5AEA D3335 3638 | 5A75 D4143 4446 | 5AB4 D4951 5254 | AAAA D5759 6062 | 005A CB 1346 | 5A00 CB 9BCE |
| 599B D0003 0406 | 59C3 D0811 1214 | 59EF D1619 2022 | 59F9 D2427 2830 | 59F2 D3235 3638 | 5979 D4043 4446 | 59B2 D4851 5254 | A9A9 D5659 6062 | 009A CB 1347 | 9A00 CB 9BCF |
| 5648 D0102 0406 | 5624 D0910 1214 | 5612 D1718 2022 | 5609 D2526 2830 | 568A D3334 3638 | 5645 D4142 4446 | 56AC D4950 5254 | A6A6 D5758 6062 | 006A CB 1356 | 6A00 CB 9BDE |

FIG. 7G

| | | | | | | | | | |
|---|---|---|---|---|---|---|---|---|---|
| 55D5 D0002 0406 | 55E4 D0810 1214 | 5572 D1618 2022 | 5539 D2426 2830 | 5592 D3234 3638 | 5549 D4042 4446 | 55AA D4850 5254 | A5A5 D5658 6062 | 00AA CB 1357 | AA00 CB 9BDF |
| 53F2 D0001 0406 | 5379 D0809 1214 | 53B2 D1617 2022 | 5359 D2425 2830 | 53A2 D3233 3638 | 5351 D4041 4446 | 53A6 D4849 5254 | A3A3 D5657 6062 | 00CA CB 1367 | CA00 CB 9BEF |
| 4ED4 D0102 0306 | 4E6A D0910 1114 | 4E35 D1718 1922 | 4E94 D2526 2730 | 4E4A D3334 3538 | 4E25 D4142 4346 | 4E9C D4950 5154 | 2E2E D5758 5962 | 0072 CB 1456 | 7200 CB 9CDE |
| 4D49 D0002 0306 | 4DAA D0810 1114 | 4D55 D1618 1922 | 4DA4 D2426 2730 | 4D52 D3234 3538 | 4D29 D4042 4346 | 4D9A D4850 5154 | 2D2D D5658 5962 | 00B2 CB 1457 | B200 CB 9CDF |
| 4B6E D0001 0306 | 4B37 D0809 1114 | 4B95 D1617 1922 | 4BC4 D2425 2730 | 4B62 D3233 3538 | 4B31 D4041 4346 | 4B96 D4849 5154 | 2B2B D5657 5962 | 00D2 CB 1467 | D200 CB 9CEF |
| 4720 D0001 0206 | 4710 D0809 1014 | 4708 D1617 1822 | 4704 D2425 2630 | 4702 D3233 3438 | 4701 D4041 4246 | 478E D4849 5054 | 2727 D5657 5862 | 00E2 CB 1567 | E200 CB 9DEF |
| 3C6B D0203 0405 | 3CBB D1011 1213 | 3CD3 D1819 2021 | 3CE7 D2627 2829 | 3CFD D3435 3637 | 3CF0 D4243 4445 | 3C78 D5051 5253 | CCCC D5859 6061 | 003C CB 2345 | 3C00 CB ABCD |
| 3A4C D0103 0405 | 3A26 D0911 1213 | 3A13 D1719 2021 | 3A87 D2527 2829 | 3ACD D3335 3637 | 3AE8 D4143 4445 | 3A74 D4951 5253 | CACA D5759 6061 | 005C CB 2346 | 5C00 CB ABCE |
| 39D1 D0003 0405 | 39E6 D0811 1213 | 3973 D1619 2021 | 39B7 D2427 2829 | 39D5 D3235 3637 | 39E4 D4043 4445 | 3972 D4851 5253 | C9C9 D5659 6061 | 009C CB 2347 | 9C00 CB ABCF |
| 3602 D0102 0405 | 3601 D0910 1213 | 368E D1718 2021 | 3647 D2526 2829 | 36AD D3334 3637 | 36D8 D4142 4445 | 366C D4950 5253 | C6C6 D5758 6061 | 006C CB 2356 | 6C00 CB ABDE |
| 359F D0002 0405 | 35C1 D0810 1213 | 35EE D1618 2021 | 3577 D2426 2829 | 35B5 D3234 3637 | 35D4 D4042 4445 | 356A D4850 5253 | C5C5 D5658 6061 | 00AC CB 2357 | AC00 CB ABDF |
| 33B8 D0001 0405 | 335C D0809 1213 | 332E D1617 2021 | 3317 D2425 2829 | 3385 D3233 3637 | 33CC D4041 4445 | 3366 D4849 5253 | C3C3 D5657 6061 | 00CC CB 2367 | CC00 CB ABEF |
| 2E9E D0102 0305 | 2E4F D0910 1113 | 2EA9 D1718 1921 | 2EDA D2526 2729 | 2E6D D3334 3537 | 2EB8 D4142 4345 | 2E5C D4950 5153 | 4E4E D5758 5961 | 0074 CB 2456 | 7400 CB ACDE |
| 2D03 D0002 0305 | 2D8F D0810 1113 | 2DC9 D1618 1921 | 2DEA D2426 2729 | 2D75 D3234 3537 | 2DB4 D4042 4345 | 2D5A D4850 5153 | 4D4D D5658 5961 | 00B4 CB 2457 | B400 CB ACDF |
| 2B24 D0001 0305 | 2B12 D0809 1113 | 2B09 D1617 1921 | 2B8A D2425 2729 | 2B45 D3233 3537 | 2BAC D4041 4345 | 2B56 D4849 5153 | 4B4B D5657 5961 | 00D4 CB 2467 | D400 CB ACEF |
| 276A D0001 0205 | 2735 D0809 1013 | 2794 D1617 1821 | 274A D2425 2629 | 2725 D3233 3437 | 279C D4041 4245 | 274E D4849 5053 | 4747 D5657 5861 | 00E4 CB 2567 | E400 CB ADEF |
| 1EBB D0102 0304 | 1ED3 D0910 1112 | 1EE7 D1718 1920 | 1EFD D2526 2728 | 1EF0 D3334 3536 | 1E78 D4142 4344 | 1E3C D4950 5152 | 8E8E D5758 5960 | 0078 CB 3456 | 7800 CB BCDE |
| 1D26 D0002 0304 | 1D13 D0810 1112 | 1D87 D1618 1920 | 1DCD D2426 2728 | 1DE8 D3234 3536 | 1D74 D4042 4344 | 1D3A D4850 5152 | 8D8D D5658 5960 | 00B8 CB 3457 | B800 CB BCDF |
| 1B01 D0001 0304 | 1B8E D0809 1112 | 1B47 D1617 1920 | 1BAD D2425 2728 | 1BD8 D3233 3536 | 1B6C D4041 4344 | 1B36 D4849 5152 | 8B8B D5657 5960 | 00D8 CB 3467 | D800 CB BCEF |
| 174F D0001 0204 | 17A9 D0809 1012 | 17DA D1617 1820 | 176D D2425 2628 | 17B8 D3233 3436 | 175C D4041 4244 | 172E D4849 5052 | 8787 D5657 5860 | 00E8 CB 3567 | E800 CB BDEF |
| 0FD3 D0001 0203 | 0FE7 D0809 1011 | 0FFD D1617 1819 | 0FF0 D2425 2627 | 0F78 D3233 3435 | 0F3C D4041 4243 | 0F1E D4849 5051 | 0F0F D5657 5859 | 00F0 CB 4567 | F000 CB CDEF |

| Syndrome code and position for any combination of 5 bits within the same byte | | | | | | | | | |
|---|---|---|---|---|---|---|---|---|---|
| F8C5 D0304 050607 | F8EC D1112 131415 | F876 D1920 212223 | F83B D2728 293031 | F893 D3536 373839 | F8C7 D4344 454647 | F8ED D5152 535455 | F8F8 D5960 616263 | 001F CB 01234 | 1F00 CB 89ABC |
| F48B D0204 050607 | F4CB D1012 131415 | F4EB D1820 212223 | F4FB D2628 293031 | F4F3 D3436 373839 | F4F7 D4244 454647 | F4F5 D5052 535455 | F4F4 D5860 616263 | 002F CB 01235 | 2F00 CB 89ABD |
| F2AC D0104 050607 | F256 D0912 131415 | F22B D1720 212223 | F29B D2528 293031 | F2C3 D3336 373839 | F2EF D4144 454647 | F2F9 D4952 535455 | F2F2 D5760 616263 | 004F CB 01236 | 4F00 CB 89ABE |
| F131 D0004 050607 | F196 D0812 131415 | F14B D1620 212223 | F1AB D2428 293031 | F1DB D3236 373839 | F1E3 D4044 454647 | F1FF D4852 535455 | F1F1 D5660 616263 | 008F CB 01237 | 8F00 CB 89ABF |
| EC17 D0203 050607 | EC85 D1011 131415 | ECCC D1819 212223 | EC66 D2627 293031 | EC33 D3435 373839 | EC97 D4243 454647 | ECC5 D5051 535455 | 7C7C D5859 616263 | 0037 CB 01245 | 3700 CB 89ACD |
| EA30 D0103 050607 | EA18 D0911 131415 | EA0C D1719 212223 | EA06 D2527 293031 | EA03 D3335 373839 | EA8F D4143 454647 | EAC9 D4951 535455 | 7A7A D5759 616263 | 0057 CB 01246 | 5700 CB 89ACE |
| E9AD D0003 050607 | E9D8 D0811 131415 | E96C D1619 212223 | E936 D2427 293031 | E91B D3235 373839 | E983 D4043 454647 | E9CF D4851 535455 | 7979 D5659 616263 | 0097 CB 01247 | 9700 CB 89ACF |
| E67E D0102 050607 | E63F D0910 131415 | E691 D1718 212223 | E6C6 D2526 293031 | E663 D3334 373839 | E6BF D4142 454647 | E6D1 D4950 535455 | 7676 D5758 616263 | 0067 CB 01256 | 6700 CB 89ADE |
| E5E3 D0002 050607 | E5FF D0810 131415 | E5F1 D1618 212223 | E5F6 D2426 293031 | E57B D3234 373839 | E5B3 D4042 454647 | E5D7 D4850 535455 | 7575 D5658 616263 | 00A7 CB 01257 | A700 CB 89ADF |
| E3C4 D0001 050607 | E362 D0809 131415 | E331 D1617 212223 | E396 D2425 293031 | E34B D3233 373839 | E3AB D4041 454647 | E3DB D4849 535455 | 7373 D5657 616263 | 00C7 CB 01267 | C700 CB 89AEF |
| DC32 D0203 040607 | DC19 D1011 121415 | DC82 D1819 202223 | DC41 D2627 283031 | DCAE D3435 363839 | DC57 D4243 444647 | DCA5 D5051 525455 | BCBC D5859 606263 | 003B CB 01345 | 3B00 CB 89BCD |
| DA15 D0103 040607 | DA84 D0911 121415 | DA42 D1719 202223 | DA21 D2527 283031 | DA9E D3335 363839 | DA4F D4143 444647 | DAA9 D4951 525455 | BABA D5759 606263 | 005B CB 01346 | 5B00 CB 89BCE |
| D988 D0003 040607 | D944 D0811 121415 | D922 D1619 202223 | D911 D2427 283031 | D986 D3235 363839 | D943 D4043 444647 | D9AF D4851 525455 | B9B9 D5659 606263 | 009B CB 01347 | 9B00 CB 89BCF |
| D65B D0102 040607 | D6A3 D0910 121415 | D6DF D1718 202223 | D6E1 D2526 283031 | D6FE D3334 363839 | D67F D4142 444647 | D6B1 D4950 525455 | B6B6 D5758 606263 | 006B CB 01356 | 6B00 CB 89BDE |
| D5C6 D0002 040607 | D563 D0810 121415 | D5BF D1618 202223 | D5D1 D2426 283031 | D5E6 D3234 363839 | D573 D4042 444647 | D5B7 D4850 525455 | B5B5 D5658 606263 | 00AB CB 01357 | AB00 CB 89BDF |
| D3E1 D0001 040607 | D3FE D0809 121415 | D37F D1617 202223 | D3B1 D2425 283031 | D3D6 D3233 363839 | D36B D4041 444647 | D3BB D4849 525455 | B3B3 D5657 606263 | 00CB CB 01367 | CB00 CB 89BEF |
| CEC7 D0102 030607 | CEED D0910 111415 | CEF8 D1718 192223 | CE7C D2526 273031 | CE3E D3334 353839 | CE1F D4142 434647 | CE81 D4950 515455 | 3E3E D5758 596263 | 0073 CB 01456 | 7300 CB 89CDE |
| CD5A D0002 030607 | CD2D D0810 111415 | CD98 D1618 192223 | CD4C D2426 273031 | CD26 D3234 353839 | CD13 D4042 434647 | CD87 D4850 515455 | 3D3D D5658 596263 | 00B3 CB 01457 | B300 CB 89CDF |
| CB7D D0001 030607 | CBB0 D0809 111415 | CB58 D1617 192223 | CB2C D2425 273031 | CB16 D3233 353839 | CB0B D4041 434647 | CB8B D4849 515455 | 3B3B D5657 596263 | 00D3 CB 01467 | D300 CB 89CEF |
| C733 D0001 020607 | C797 D0809 101415 | C7C5 D1617 182223 | C7EC D2425 263031 | C776 D3233 343839 | C73B D4041 424647 | C793 D4849 505455 | 3737 D5657 586263 | 00E3 CB 01567 | E300 CB 89DEF |
| BC78 D0203 040507 | BC3C D1011 121315 | BC1E D1819 202123 | BC0F D2627 282931 | BC89 D3435 363739 | BCCA D4243 444547 | BC65 D5051 525355 | DCDC D5859 606163 | 003D CB 02345 | 3D00 CB 8ABCD |
| BA5F D0103 040507 | BAA1 D0911 121315 | BADE D1719 202123 | BA6F D2527 282931 | BAB9 D3335 363739 | BAD2 D4143 444547 | BA69 D4951 525355 | DADA D5759 606163 | 005D CB 02346 | 5D00 CB 8ABCE |
| B9C2 D0003 040507 | B961 D0811 121315 | B9BE D1619 202123 | B95F D2427 282931 | B9A1 D3235 363739 | B9DE D4043 444547 | B96F D4851 525355 | D9D9 D5659 606163 | 009D CB 02347 | 9D00 CB 8ABCF |
| B611 D0102 040507 | B686 D0910 121315 | B643 D1718 202123 | B6AF D2526 282931 | B6D9 D3334 363739 | B6E2 D4142 444547 | B671 D4950 525355 | D6D6 D5758 606163 | 006D CB 02356 | 6D00 CB 8ABDE |

| | | | | | | | | | |
|---|---|---|---|---|---|---|---|---|---|
| B58C<br>D0002<br>040507 | B546<br>D0810<br>121315 | B523<br>D1618<br>202123 | B59F<br>D2426<br>282931 | B5C1<br>D3234<br>363739 | B5EE<br>D4042<br>444547 | B577<br>D4850<br>525355 | D5D5<br>D5658<br>606163 | 00AD<br>CB 02357 | AD00<br>CB 8ABDF |
| B3AB<br>D0001<br>040507 | B3DB<br>D0809<br>121315 | B3E3<br>D1617<br>202123 | B3FF<br>D2425<br>282931 | B3F1<br>D3233<br>363739 | B3F6<br>D4041<br>444547 | B37B<br>D4849<br>525355 | D3D3<br>D5657<br>606163 | 00CD<br>CB 02367 | CD00<br>CB 8ABEF |
| AE8D<br>D0102<br>030507 | AEC8<br>D0910<br>111315 | AE64<br>D1718<br>192123 | AE32<br>D2526<br>272931 | AE19<br>D3334<br>353739 | AE82<br>D4142<br>434547 | AE41<br>D4950<br>515355 | 5E5E<br>D5758<br>596163 | 0075<br>CB 02456 | 7500<br>CB 8ACDE |
| AD10<br>D0002<br>030507 | AD08<br>D0810<br>111315 | AD04<br>D1618<br>192123 | AD02<br>D2426<br>272931 | AD01<br>D3234<br>353739 | AD8E<br>D4042<br>434547 | AD47<br>D4850<br>515355 | 5D5D<br>D5658<br>596163 | 00B5<br>CB 02457 | B500<br>CB 8ACDF |
| AB37<br>D0001<br>030507 | AB95<br>D0809<br>111315 | ABC4<br>D1617<br>192123 | AB62<br>D2425<br>272931 | AB31<br>D3233<br>353739 | AB96<br>D4041<br>434547 | AB4B<br>D4849<br>515355 | 5B5B<br>D5657<br>596163 | 00D5<br>CB 02467 | D500<br>CB 8ACEF |
| A779<br>D0001<br>020507 | A7B2<br>D0809<br>101315 | A759<br>D1617<br>182123 | A7A2<br>D2425<br>262931 | A751<br>D3233<br>343739 | A7A6<br>D4041<br>424547 | A753<br>D4849<br>505355 | 5757<br>D5657<br>586163 | 00E5<br>CB 02567 | E500<br>CB 8ADEF |
| 9EA8<br>D0102<br>030407 | 9E54<br>D0910<br>111215 | 9E2A<br>D1718<br>192023 | 9E15<br>D2526<br>272831 | 9E84<br>D3334<br>353639 | 9E42<br>D4142<br>434447 | 9E21<br>D4950<br>515255 | 9E9E<br>D5758<br>596063 | 0079<br>CB 03456 | 7900<br>CB 8BCDE |
| 9D35<br>D0002<br>030407 | 9D94<br>D0810<br>111215 | 9D4A<br>D1618<br>192023 | 9D25<br>D2426<br>272831 | 9D9C<br>D3234<br>353639 | 9D4E<br>D4042<br>434447 | 9D27<br>D4850<br>515255 | 9D9D<br>D5658<br>596063 | 00B9<br>CB 03457 | B900<br>CB 8BCDF |
| 9B12<br>D0001<br>030407 | 9B09<br>D0809<br>111215 | 9B8A<br>D1617<br>192023 | 9B45<br>D2425<br>272831 | 9BAC<br>D3233<br>353639 | 9B56<br>D4041<br>434447 | 9B2B<br>D4849<br>515255 | 9B9B<br>D5657<br>596063 | 00D9<br>CB 03467 | D900<br>CB 8BCEF |
| 975C<br>D0001<br>020407 | 972E<br>D0809<br>101215 | 9717<br>D1617<br>182023 | 9785<br>D2425<br>262831 | 97CC<br>D3233<br>343639 | 9766<br>D4041<br>424447 | 9733<br>D4849<br>505255 | 9797<br>D5657<br>586063 | 00E9<br>CB 03567 | E900<br>CB 8BDEF |
| 8FC0<br>D0001<br>020307 | 8F60<br>D0809<br>101115 | 8F30<br>D1617<br>181923 | 8F18<br>D2425<br>262731 | 8F06<br>D3233<br>343539 | 8F03<br>D4041<br>424347 | 8F03<br>D4849<br>505155 | 1F1F<br>D5657<br>585963 | 00F1<br>CB 04567 | F100<br>CB 8CDEF |
| 7CEC<br>D0203<br>040506 | 7C76<br>D1011<br>121314 | 7C3B<br>D1819<br>202122 | 7C93<br>D2627<br>282930 | 7CC7<br>D3435<br>363738 | 7CED<br>D4243<br>444546 | 7CF8<br>D5051<br>525354 | ECEC<br>D5859<br>606162 | 003E<br>CB 12345 | 3E00<br>CB 9ABCD |
| 7ACB<br>D0103<br>040506 | 7AEB<br>D0911<br>121314 | 7AFB<br>D1719<br>202122 | 7AF3<br>D2527<br>282930 | 7AF7<br>D3335<br>363738 | 7AF5<br>D4143<br>444546 | 7AF4<br>D4951<br>525354 | EAEA<br>D5759<br>606162 | 005E<br>CB 12346 | 5E00<br>CB 9ABCE |
| 7956<br>D0003<br>040506 | 792B<br>D0811<br>121314 | 799B<br>D1619<br>202122 | 79C3<br>D2427<br>282930 | 79EF<br>D3235<br>363738 | 79F9<br>D4043<br>444546 | 79F2<br>D4851<br>525354 | E9E9<br>D5659<br>606162 | 009E<br>CB 12347 | 9E00<br>CB 9ABCF |
| 7685<br>D0102<br>040506 | 76CC<br>D0910<br>121314 | 7666<br>D1718<br>202122 | 7633<br>D2526<br>282930 | 7697<br>D3334<br>363738 | 76C5<br>D4142<br>444546 | 76EC<br>D4950<br>525354 | E6E6<br>D5758<br>606162 | 006E<br>CB 12356 | 6E00<br>CB 9ABDE |
| 7518<br>D0002<br>040506 | 750C<br>D0810<br>121314 | 7506<br>D1618<br>202122 | 7503<br>D2426<br>282930 | 758F<br>D3234<br>363738 | 75C9<br>D4042<br>444546 | 75EA<br>D4850<br>525354 | E5E5<br>D5658<br>606162 | 00AE<br>CB 12357 | AE00<br>CB 9ABDF |
| 733F<br>D0001<br>040506 | 7391<br>D0809<br>121314 | 73C6<br>D1617<br>202122 | 7363<br>D2425<br>282930 | 73BF<br>D3233<br>363738 | 73D1<br>D4041<br>444546 | 73E6<br>D4849<br>525354 | E3E3<br>D5657<br>606162 | 00CE<br>CB 12367 | CE00<br>CB 9ABEF |
| 6E19<br>D0102<br>030506 | 6E82<br>D0910<br>111314 | 6E41<br>D1718<br>192122 | 6EAE<br>D2526<br>272930 | 6E57<br>D3334<br>353738 | 6EA5<br>D4142<br>434546 | 6EDC<br>D4950<br>515354 | 6E6E<br>D5758<br>596162 | 0076<br>CB 12456 | 7600<br>CB 9ACDE |
| 6D84<br>D0002<br>030506 | 6D42<br>D0810<br>111314 | 6D21<br>D1618<br>192122 | 6D9E<br>D2426<br>272930 | 6D4F<br>D3234<br>353738 | 6DA9<br>D4042<br>434546 | 6DDA<br>D4850<br>515354 | 6D6D<br>D5658<br>596162 | 00B6<br>CB 12457 | B600<br>CB 9ACDF |
| 6BA3<br>D0001<br>030506 | 6BDF<br>D0809<br>111314 | 6BE1<br>D1617<br>192122 | 6BFE<br>D2425<br>272930 | 6B7F<br>D3233<br>353738 | 6BB1<br>D4041<br>434546 | 6BD6<br>D4849<br>515354 | 6B6B<br>D5657<br>596162 | 00D6<br>CB 12467 | D600<br>CB 9ACEF |
| 67ED<br>D0001<br>020506 | 67F8<br>D0809<br>101314 | 677C<br>D1617<br>182122 | 673E<br>D2425<br>262930 | 671F<br>D3233<br>343738 | 6781<br>D4041<br>424546 | 67CE<br>D4849<br>505354 | 6767<br>D5657<br>586162 | 00E6<br>CB 12567 | E600<br>CB 9ADEF |
| 5E3C<br>D0102<br>030406 | 5E1E<br>D0910<br>111214 | 5E0F<br>D1718<br>192022 | 5E89<br>D2526<br>272830 | 5ECA<br>D3334<br>353638 | 5E65<br>D4142<br>434446 | 5EBC<br>D4950<br>515254 | AEAE<br>D5758<br>596062 | 007A<br>CB 13456 | 7A00<br>CB 9BCDE |
| 5DA1<br>D0002<br>030406 | 5DDE<br>D0810<br>111214 | 5D6F<br>D1618<br>192022 | 5DB9<br>D2426<br>272830 | 5DD2<br>D3234<br>353638 | 5D69<br>D4042<br>434446 | 5DBA<br>D4850<br>515254 | ADAD<br>D5758<br>596062 | 00BA<br>CB 13457 | BA00<br>CB 9BCDF |
| 5B86<br>D0001<br>030406 | 5B43<br>D0809<br>111214 | 5BAF<br>D1617<br>192022 | 5BD9<br>D2425<br>272830 | 5BE2<br>D3233<br>353638 | 5B71<br>D4041<br>434446 | 5BB6<br>D4849<br>515254 | ABAB<br>D5657<br>596062 | 00DA<br>CB 13467 | DA00<br>CB 9BCEF |
| 57C8<br>D0001<br>020406 | 5764<br>D0809<br>101214 | 5732<br>D1617<br>182022 | 5719<br>D2425<br>262830 | 5782<br>D3233<br>343638 | 5741<br>D4041<br>424446 | 57AE<br>D4849<br>505254 | A7A7<br>D5657<br>586062 | 00EA<br>CB 13567 | EA00<br>CB 9BDEF |

FIG. 7J

| 4F54 D0001 020306 | 4F2A D0809 101114 | 4F15 D1617 181922 | 4F84 D2425 262730 | 4F42 D3233 343538 | 4F21 D4041 424346 | 4F9E D4849 505154 | 2F2F D5657 585962 | 00F2 CB 14567 | F200 CB 9CDEF |
|---|---|---|---|---|---|---|---|---|---|
| 3E76 D0102 030405 | 3E3B D0910 111213 | 3E93 D1718 192021 | 3EC7 D2526 272829 | 3EED D3334 353637 | 3EF8 D4142 434445 | 3E7C D4950 515253 | CECE D5758 596061 | 007C CB 23456 | 7C00 CB ABCDE |
| 3DEB D0002 030405 | 3DFB D0810 111213 | 3DF3 D1618 192021 | 3DF7 D2426 272829 | 3DF5 D3234 353637 | 3DF4 D4042 434445 | 3D7A D4850 515253 | CDCD D5658 596061 | 00BC CB 23457 | BC00 CB ABCDF |
| 3BCC D0001 030405 | 3B66 D0809 111213 | 3B33 D1617 192021 | 3B97 D2425 272829 | 3BC5 D3233 353637 | 3BEC D4041 434445 | 3B76 D4849 515253 | CBCB D5657 596061 | 00DC CB 23467 | DC00 CB ABCEF |
| 3782 D0001 020405 | 3741 D0809 101213 | 37AE D1617 182021 | 3757 D2425 262829 | 37A5 D3233 343637 | 37DC D4041 424445 | 376E D4849 505253 | C7C7 D5657 586061 | 00EC CB 23567 | EC00 CB ABDEF |
| 2F1E D0001 020305 | 2F0F D0809 101113 | 2F89 D1617 181921 | 2FCA D2425 262729 | 2F65 D3233 343537 | 2FBC D4041 424345 | 2F5E D4849 505153 | 4F4F D5657 585961 | 00F4 CB 24567 | F400 CB ACDEF |
| 1F3B D0001 020304 | 1F93 D0809 101112 | 1FC7 D1617 181920 | 1FED D2425 262728 | 1FF8 D3233 343536 | 1F7C D4041 424344 | 1F3E D4849 505152 | 8F8F D5657 585960 | 00F8 CB 34567 | F800 CB BCDEF |

FIG. 7K

| Syndrome code and position for any combination of 6 bits within the same byte |||||||||||
|---|---|---|---|---|---|---|---|---|---|
| FCFF<br>D0203<br>0405<br>0607 | FCF1<br>D1011<br>1213<br>1415 | FCF6<br>D1819<br>2021<br>2223 | FC7B<br>D2627<br>2829<br>3031 | FCB3<br>D34353<br>637<br>3839 | FCD7<br>D4243<br>4445<br>4647 | FCE5<br>D5051<br>5253<br>5455 | FCFC<br>D5859<br>6061<br>6263 | 003F<br>CB 012345 | 3F00<br>CB 89ABCD |
| FAD8<br>D0103<br>0405<br>0607 | FA6C<br>D0911<br>1213<br>1415 | FA36<br>D1719<br>2021<br>2223 | FA1B<br>D2527<br>2829<br>3031 | FA83<br>D3335<br>3637<br>3839 | FACF<br>D4143<br>4445<br>4647 | FAE9<br>D4951<br>5253<br>5455 | FAFA<br>D5759<br>6061<br>6263 | 005F<br>CB 012346 | 5F00<br>CB 89ABCE |
| F945<br>D0003<br>0405<br>0607 | F9AC<br>D0811<br>1213<br>1415 | F956<br>D1619<br>2021<br>2223 | F92B<br>D2427<br>2829<br>3031 | F99B<br>D3235<br>3637<br>3839 | F9C3<br>D4043<br>4445<br>4647 | F9EF<br>D4851<br>5253<br>5455 | F9F9<br>D5659<br>6061<br>6263 | 009F<br>CB 012347 | 9F00<br>CB 89ABCF |
| F696<br>D0102<br>0405<br>0607 | F64B<br>D0910<br>1213<br>1415 | F6AB<br>D1718<br>2021<br>2223 | F6DB<br>D2526<br>2829<br>3031 | F6E3<br>D3334<br>3637<br>3839 | F6FF<br>D4142<br>4445<br>4647 | F6F1<br>D4950<br>5253<br>5455 | F6F6<br>D5758<br>6061<br>6263 | 006F<br>CB 012356 | 6F00<br>CB 89ABDE |
| F50B<br>D0002<br>0405<br>0607 | F58B<br>D0810<br>1213<br>1415 | F5CB<br>D1618<br>2021<br>2223 | F5EB<br>D2426<br>2829<br>3031 | F5FB<br>D3234<br>3637<br>3839 | F5F3<br>D4042<br>4445<br>4647 | F5P7<br>D4850<br>5253<br>5455 | F5F5<br>D5658<br>6061<br>6263 | 00AF<br>CB 012357 | AF00<br>CB 89ABDF |
| F32C<br>D0001<br>0405<br>0607 | F316<br>D0809<br>1213<br>1415 | F30B<br>D1617<br>2021<br>2223 | F38B<br>D2425<br>2829<br>3031 | F3CB<br>D3233<br>3637<br>3839 | F3EB<br>D4041<br>4445<br>4647 | F3FB<br>D4849<br>5253<br>5455 | F3F3<br>D5657<br>6061<br>6263 | 00CF<br>CB 012367 | CF00<br>CB 89ABEF |
| EE0A<br>D0102<br>0305<br>0607 | EE05<br>D0910<br>1113<br>1415 | EE8C<br>D1718<br>1921<br>2223 | EE46<br>D2526<br>2729<br>3031 | EE23<br>D3334<br>3537<br>3839 | EE9F<br>D4142<br>4345<br>4647 | EEC1<br>D4950<br>5153<br>5455 | 7E7E<br>D5758<br>5961<br>6263 | 0077<br>CB 012456 | 7700<br>CB 89ACDE |
| ED97<br>D0002<br>0305<br>0607 | EDC5<br>D0810<br>1113<br>1415 | EDEC<br>D1618<br>1921<br>2223 | ED76<br>D2426<br>2729<br>3031 | ED3B<br>D3234<br>3537<br>3839 | ED93<br>D4042<br>4345<br>4647 | EDC7<br>D4850<br>5153<br>5455 | 7D7D<br>D5658<br>5961<br>6263 | 00B7<br>CB 012457 | B700<br>CB 89ACDF |
| EBB0<br>D0001<br>0305<br>0607 | EB58<br>D0809<br>1113<br>1415 | EB2C<br>D1617<br>1921<br>2223 | EB16<br>D2425<br>2729<br>3031 | EB0B<br>D3233<br>3537<br>3839 | EB8B<br>D4041<br>4345<br>4647 | EBCB<br>D4849<br>5153<br>5455 | 7B7B<br>D5657<br>5961<br>6263 | 00D7<br>CB 012467 | D700<br>CB 89ACEF |
| E7FE<br>D0001<br>0205<br>0607 | E77F<br>D0809<br>1013<br>1415 | E7B1<br>D1617<br>1821<br>2223 | E7D6<br>D2425<br>2629<br>3031 | E76B<br>D3233<br>3437<br>3839 | E7BB<br>D4041<br>4245<br>4647 | E7D3<br>D4849<br>5053<br>5455 | 7777<br>D5657<br>5861<br>6263 | 00E7<br>CB 012567 | E700<br>CB 89ADEF |
| DE2F<br>D0102<br>0304<br>0607 | DE99<br>D0910<br>1112<br>1415 | DEC2<br>D1718<br>1920<br>2223 | DE61<br>D2526<br>2728<br>3031 | DEBE<br>D3334<br>3536<br>3839 | DE5F<br>D4142<br>4344<br>4647 | DEA1<br>D4950<br>5152<br>5455 | BEBE<br>D5758<br>5960<br>6263 | 007B<br>CB 013456 | 7B00<br>CB 89BCDE |
| DDB2<br>D0002<br>0304<br>0607 | DD59<br>D0810<br>1112<br>1415 | DDA2<br>D1618<br>1920<br>2223 | DD51<br>D2426<br>2728<br>3031 | DDA6<br>D3234<br>3536<br>3839 | DD53<br>D4042<br>4344<br>4647 | DDA7<br>D4850<br>5152<br>5455 | BDBD<br>D5658<br>5960<br>6263 | 00BB<br>CB 013457 | BB00<br>CB 89BCDF |
| DB95<br>D0001<br>0304<br>0607 | DBC4<br>D0809<br>1112<br>1415 | DB62<br>D1617<br>1920<br>2223 | DB31<br>D2425<br>2728<br>3031 | DB96<br>D3233<br>3536<br>3839 | DB4B<br>D4041<br>4344<br>4647 | DBAB<br>D4849<br>5152<br>5455 | BBBB<br>D5657<br>5960<br>6263 | 00DB<br>CB 013467 | DB00<br>CB 89BCEF |
| D7DB<br>D0001<br>0204<br>0607 | D7E3<br>D0809<br>1012<br>1415 | D7FF<br>D1617<br>1820<br>2223 | D7F1<br>D2425<br>2628<br>3031 | D7F6<br>D3233<br>3436<br>3839 | D77B<br>D4041<br>4244<br>4647 | D7B3<br>D4849<br>5052<br>5455 | B7B7<br>D5657<br>5860<br>6263 | 00EB<br>CB 013567 | EB00<br>CB 89BDEF |
| CF47<br>D0001<br>0203<br>0607 | CFAD<br>D0809<br>1011<br>1415 | CFD8<br>D1617<br>1819<br>2223 | CF6C<br>D2425<br>2627<br>3031 | CF36<br>D3233<br>3435<br>3839 | CF1B<br>D4041<br>4243<br>4647 | CF83<br>D4849<br>5051<br>5455 | 3F3F<br>D5657<br>5859<br>6263 | 00F3<br>CB 014567 | F300<br>CB 89CDEF |
| BE65<br>D0102<br>0304<br>0507 | BEBC<br>D0910<br>1112<br>1315 | BE5E<br>D1718<br>1920<br>2123 | BE2F<br>D2526<br>2728<br>2931 | BE99<br>D3334<br>3536<br>3739 | BEC2<br>D4142<br>4344<br>4547 | BE61<br>D4950<br>5152<br>5355 | DEDE<br>D5758<br>5960<br>6163 | 007D<br>CB 023456 | 7D00<br>CB 8ABCDE |

FIG. 7L

| | | | | | | | | | |
|---|---|---|---|---|---|---|---|---|---|
| BDF8 D0002 0304 0507 | BD7C D0810 1112 1315 | BD3E D1618 1920 2123 | BD1F D2426 2728 2931 | BD81 D3234 3536 3739 | BDCE D4042 4344 4547 | BD67 D4850 5152 5355 | DDDD D5658 5960 6163 | 00BD CB 023457 | BD00 CB 8ABCDF |
| BBDF D0001 0304 0507 | BBE1 D0809 1112 1315 | BBFE D1617 1920 2123 | BB7F D2425 2728 2931 | BBB1 D3233 3536 3739 | BBD6 D4041 4344 4547 | BB6B D4849 5152 5355 | DBDB D5657 5960 6163 | 00DD CB 023467 | DD00 CB 8ABCEF |
| B791 D0001 0204 0507 | B7C6 D0809 1012 1315 | B763 D1617 1820 2123 | B7BF D2425 2628 2931 | B7D1 D3233 3436 3739 | B7E6 D4041 4244 4547 | B773 D4849 5052 5355 | D7D7 D5657 5860 6163 | 00ED CB 023567 | ED00 CB 8ABDEF |
| AF0D D0001 0203 0507 | AF88 D0809 1011 1315 | AF44 D1617 1819 2123 | AF22 D2425 2627 2931 | AF11 D3233 3435 3739 | AF86 D4041 4243 4547 | AF43 D4849 5051 5355 | 5F5F D5657 5859 6163 | 00F5 CB 024567 | F500 CB 8ACDEF |
| 9F28 D0001 0203 0407 | 9F14 D0809 1011 1215 | 9F0A D1617 1819 2023 | 9F05 D2425 2627 2831 | 9F8C D3233 3435 3639 | 9F46 D4041 4243 4447 | 9F23 D4849 5051 5255 | 9F9F D5657 5859 6063 | 00F9 CB 034567 | F900 CB 8BCDEF |
| 7EF1 D0102 0304 0506 | 7EF6 D0910 1112 1314 | 7E7B D1718 1920 2122 | 7EB3 D2526 2728 2930 | 7ED7 D3334 3536 3738 | 7EE5 D4142 4344 4546 | 7EFC D4950 5152 5354 | EEEE D5758 5960 6162 | 007E CB 123456 | 7E00 CB 9ABCDE |
| 7D6C D0002 0304 0506 | 7D36 D0810 1112 1314 | 7D1B D1618 1920 2122 | 7D83 D2426 2728 2930 | 7DCF D3234 3536 3738 | 7DE9 D4042 4344 4546 | 7DFA D4850 5152 5354 | EDED D5658 5960 6162 | 00BE CB 123457 | BE00 CB 9ABCDF |
| 7B4B D0001 0304 0506 | 7BAB D0809 1112 1314 | 7BDB D1617 1920 2122 | 7BE3 D2425 2728 2930 | 7BFF D3233 3536 3738 | 7BF1 D4041 4344 4546 | 7BF6 D4849 5152 5354 | EBEB D5657 5960 6162 | 00DE CB 123467 | DE00 CB 9ABCEF |
| 7705 D0001 0204 0506 | 778C D0809 1012 1314 | 7746 D1617 1820 2122 | 7723 D2425 2628 2930 | 779F D3233 3436 3738 | 77C1 D4041 4244 4546 | 77EE D4849 5052 5354 | E7E7 D5657 5860 6162 | 00EE CB 123567 | EE00 CB 9ABDEF |
| 6F99 D0001 0203 0506 | 6FC2 D0809 1011 1314 | 6F61 D1617 1819 2122 | 6FBE D2425 2627 2930 | 6F5F D3233 3435 3738 | 6FA1 D4041 4243 4546 | 6FDE D4849 5051 5354 | 6F6F D5657 5859 6162 | 00F6 CB 124567 | F600 CB 9ACDEF |
| 5FBC D0001 0203 0406 | 5F5E D0809 1011 1214 | 5F2F D1617 1819 2022 | 5F99 D2425 2627 2830 | 5FC2 D3233 3435 3638 | 5F61 D4041 4243 4446 | 5FBE D4849 5051 5254 | AFAF D5657 5859 6062 | 00FA CB 134567 | FA00 CB 9BCDEF |
| 3FF6 D0001 0203 0405 | 3F7B D0809 1011 1213 | 3FB3 D1617 1819 2021 | 3FD7 D2425 2627 2829 | 3FE5 D3233 3435 3637 | 3FFC D4041 4243 4445 | 3F7E D4849 5051 5253 | CFCF D5657 5859 6061 | 00FC CB 234567 | FC00 CB ABCDEF |

FIG. 7M

| Syndrome code and position for any combination of 7 adjacent bits within the same byte | | | | | | | | | |
|---|---|---|---|---|---|---|---|---|---|
| FEE2 D0102 030405 0607 | FE71 D0910 111213 1415 | FEB6 D1718 192021 2223 | FE5B D2526 272829 3031 | FEA3 D3334 353637 3839 | FEDF D4142 434445 4647 | FEE1 D4950 515253 5455 | FEFE D5758 596061 6263 | 007F CB 0123456 | 7F00 CB89ABCDE |
| FD7F D0002 030405 0607 | FDB1 D0810 111213 1415 | FDD6 D1618 192021 2223 | FD6B D2426 272829 3031 | FDBB D3234 353637 3839 | FDD3 D4042 434445 4647 | FDE7 D4850 515253 5455 | FDFD D5657 585960 616263 | 00BF CB 0123457 | DF00 CB 89ABCDF |
| FB58 D0001 030405 0607 | FB2C D0809 111213 1415 | FB16 D1617 192021 2223 | FB0B D2425 272829 3031 | FB8B D3233 353637 3839 | FBCB D4041 434445 4647 | FBEB D4849 515253 5455 | FBFB D5657 596061 6263 | 00DF CB 0123467 | DF00 CB 89ABCEF |
| F716 D0001 0204 050607 | F70B D0809 101213 1415 | F78B D1617 182021 2223 | F7CB D2425 262829 3031 | F7EB D3233 343637 3839 | F7FB D4041 424445 4647 | F7F3 D4849 505253 5455 | F7F7 D5657 586061 6263 | 00EF CB 0123567 | EF00 CB 89ABDEF |
| EF8A D0001 020305 0607 | EF45 D0809 101113 1415 | EFAC D1617 181921 2223 | EF56 D2425 262729 3031 | EF2B D3233 343537 3839 | EF9B D4041 424345 4647 | EFC3 D4849 505153 5455 | 7F7F D5657 585961 6263 | 00F7 CB 0124567 | F700 CB 89ACDEF |
| DFAF D0001 020304 0607 | DFD9 D0809 101112 1415 | DFE2 D1617 181920 2223 | DF71 D2425 262728 3031 | DFB6 D3233 343536 3839 | DF5B D4041 424344 4647 | DFA3 D4849 505152 5455 | BFBF D5657 585960 6263 | 00FB CB 0134567 | FB00 CB 89BCDEF |
| BFE5 D0001 020304 0507 | BFFC D0809 101112 1315 | BF7E D1617 181920 2123 | BF3F D2425 262728 2931 | BF91 D3233 343536 3739 | BFC6 D4041 424344 4547 | BF63 D4849 505152 5355 | DFDF D5657 585960 6163 | 00FD CB 0234567 | FD00 CB 8ABCDEF |
| 7F71 D0001 020304 0506 | 7FB6 D0809 101112 1314 | 7F5B D1617 181920 2122 | 7FA3 D2425 262728 2930 | 7FDF D3233 343536 3738 | 7FE1 D4041 424344 4546 | 7FFE D4849 505152 5354 | EFEF D5657 585960 6162 | 00FE CB 1234567 | FE00 CB 9ABCDEF |

| Syndrome code and position for 8 adj bit |
|---|
| FF00 CB 89ABCDEF |
| FF31 D0809101112131415 |
| FF4B D2425262728293031 |
| FF62 D0001020304050607 |
| FF96 D1617181920212223 |

FIG. 7N

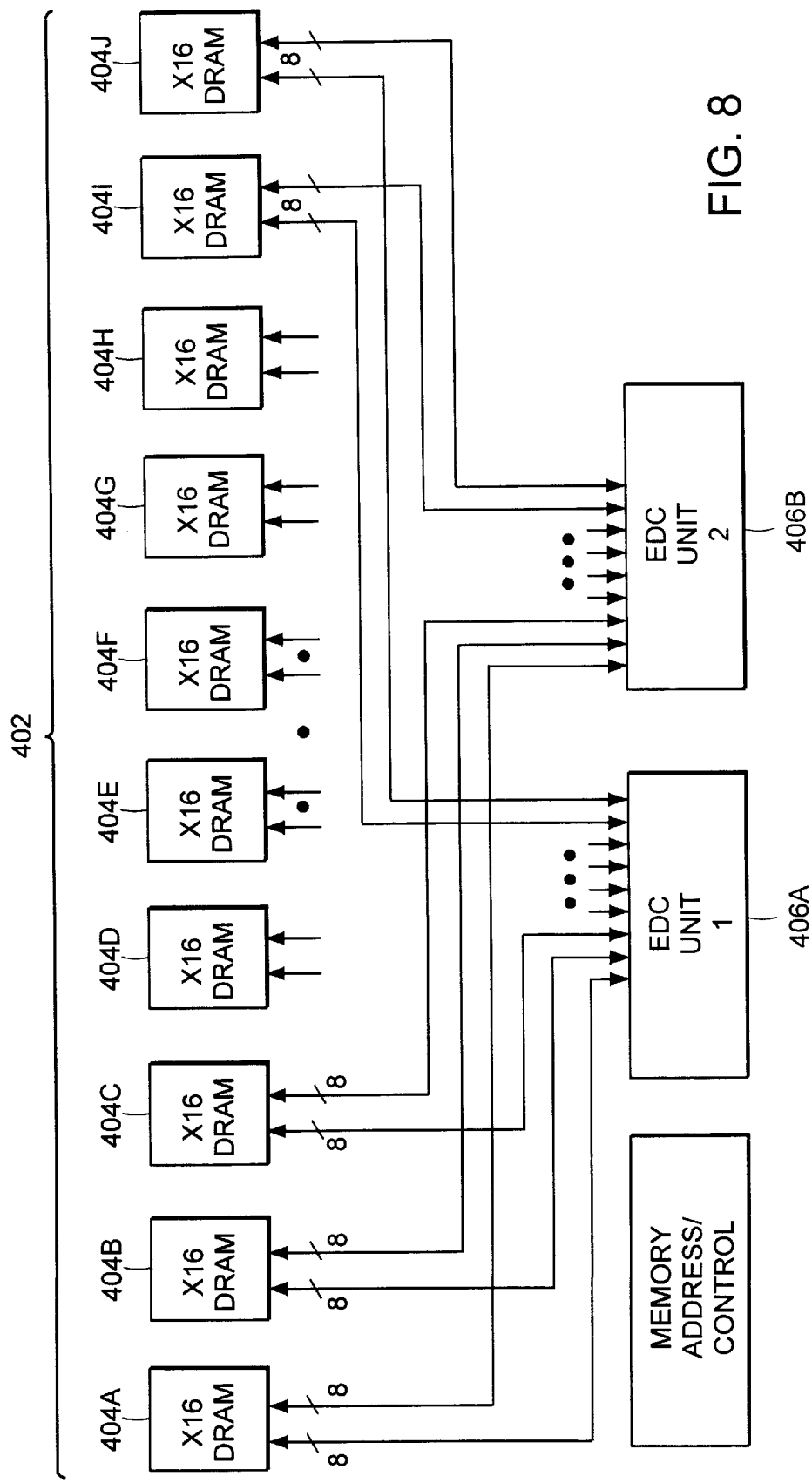

ERROR DETECTION AND CORRECTION

BACKGROUND

The invention relates to error detection and correction.

Error correction codes (ECCs) have been developed that both detect and correct certain types of errors. One class of ECC algorithm includes the "Hamming code," which is capable of detecting multibit errors and correcting single-bit errors. Another well known ECC algorithm is the "Reed-Solomon code," which is able to correct two-bit errors per word.

In D.C. Bossen, "B-Adjacent Error Correction," *IBM J. Res. Develop.*, pp. 402–408 (July 1970), Reed-Solomon and Hamming type codes are described which are capable of correcting not only single-bit errors but also single clusters of multiple adjacent-bit errors.

Some disk array controllers made by Compaq Computer Corporation, such as those sold with the SMART2 disk array controllers, use an ECC algorithm (referred to as the SMART2 ECC algorithm) that protects 64 bits of data with 16 check bits. The SMART2 ECC code can detect and correct errors in 8 adjacent data bits within a single byte. The SMART2 ECC code was implemented to protect data written into and read from write cache buffers in the disk array controller.

SUMMARY

The invention may have one or more of the following advantages. Without adding check bits, detection of address errors and detection and correction of the full range of errors in a data byte (from a single-bit error to an eight-bit error in a byte) can be achieved using the same set of check bits. In addition, the error detection and correction code can be extended to detect and correct 16-bit errors in a word, 32-bit errors in a double word, and so forth.

In general, the invention features a computer system having a CPU, a disk array system accessible by the CPU, and a disk array controller connected to the disk array system. The disk array controller includes a processor and a memory system coupled to the processor. The memory system is connected to signal lines carrying data bits, address bits, and check bits. An error detection and correction device is connected to detect and correct multiple errors in the data bits using the check bits, and to detect an error in the address bits using the same check bits. The data bits are organized as multiple bytes. The error detection and correction device is connected to detect and correct up to eight-bit errors in each byte, and the error detection and correction device is connected to detect a single-bit error or a two-adjacent-bit error in the address bits.

Implementations of the invention may include one or more of the following features. The memory system is connected to signal lines carrying 64 or fewer data bits and 16 check bits.

In general, in another aspect, the invention features a computer system having a memory system connected to signal lines carrying data bits, address bits, and check bits. An error detection and correction device is connected to detect and correct N-bit errors in the data bits using the check bits, and to detect an error in the address bits using the same check bits, N being greater than two.

Implementations of the invention may include one or more of the following features. The data bits are organized as bytes, and the error detection and correction device is connected to detect and correct up to eight-bit errors in each byte. The error detection and correction device is connected to detect a single-bit error or a two-adjacent-bit error in the address bits. The memory system is connected to signal lines carrying 64 or fewer data bits and 16 check bits. The memory system is connected to signal lines carrying 32 or fewer address bits. The error detection and correction device generates a syndrome table that includes entries mapped to correctable or uncorrectable errors, and a detected address error is mapped to an uncorrectable error entry. The computer system also includes a disk controller, and the memory system is located in the disk controller. A disk system is connected to the disk controller, the memory system being used as a cache for data transferred to the disk system. The memory system includes a main memory of the computer system. The error detection and correction device includes a decoder connected to receive the check bits, address bits, and data bits to generate an indication that a memory address or data error has occurred. A correction circuit is connected to correct the data bits if a correctable memory data error is present. The error detection and correction device further includes a partial address check bit generator to generate partial address check bits based on the memory address bits. The decoder is connected to further receive the partial address check bits to determine if a memory address or data error has occurred.

In general, in another aspect, the invention features a computer system having a processor and a memory system coupled to the processor. The memory system is connected to signal lines carrying 64 or fewer data bits, 32 or fewer address bits, and 16 check bits. An error detection and correction device is connected to detect and correct up to eight-bit errors in the data bits using the check bits, and to detect a single-bit error or a two-adjacent-bit error in the address bits using the same check bits. The error detection and correction device generates a syndrome table that includes entries mapped to correctable or uncorrectable errors, and a detected address error is mapped to an uncorrectable error entry. A mass storage device is accessible by the processor.

In general, in another aspect, the invention features a method of detecting and correcting errors in a memory system, the memory system storing data bits, address bits, and check bits. The data bits, address bits, and check bits are received. An error in the address bits is detected using the check bits. N-bit errors in the data bits are detected and corrected using the same check bits, N being greater than two.

In general, in another aspect, the invention features a disk controller having a memory system connected to signal lines carrying data bits, address bits, and check bits. An error detection and correction device is connected to detect and correct N-bit errors in the data bits using the check bits, and to detect an error in the address bits using the same check bits, N being greater than two.

BRIEF DESCRIPTION OF THE DRAWINGS

FIG. 5 is an address parity check matrix.

FIG. 6 is a data parity check matrix.

FIGS. 7A–7N are a syndrome table.

FIGS. 8 and 9 are block diagrams of memory devices connected to multiple error detection and correction units.

DESCRIPTION

Figure 1:
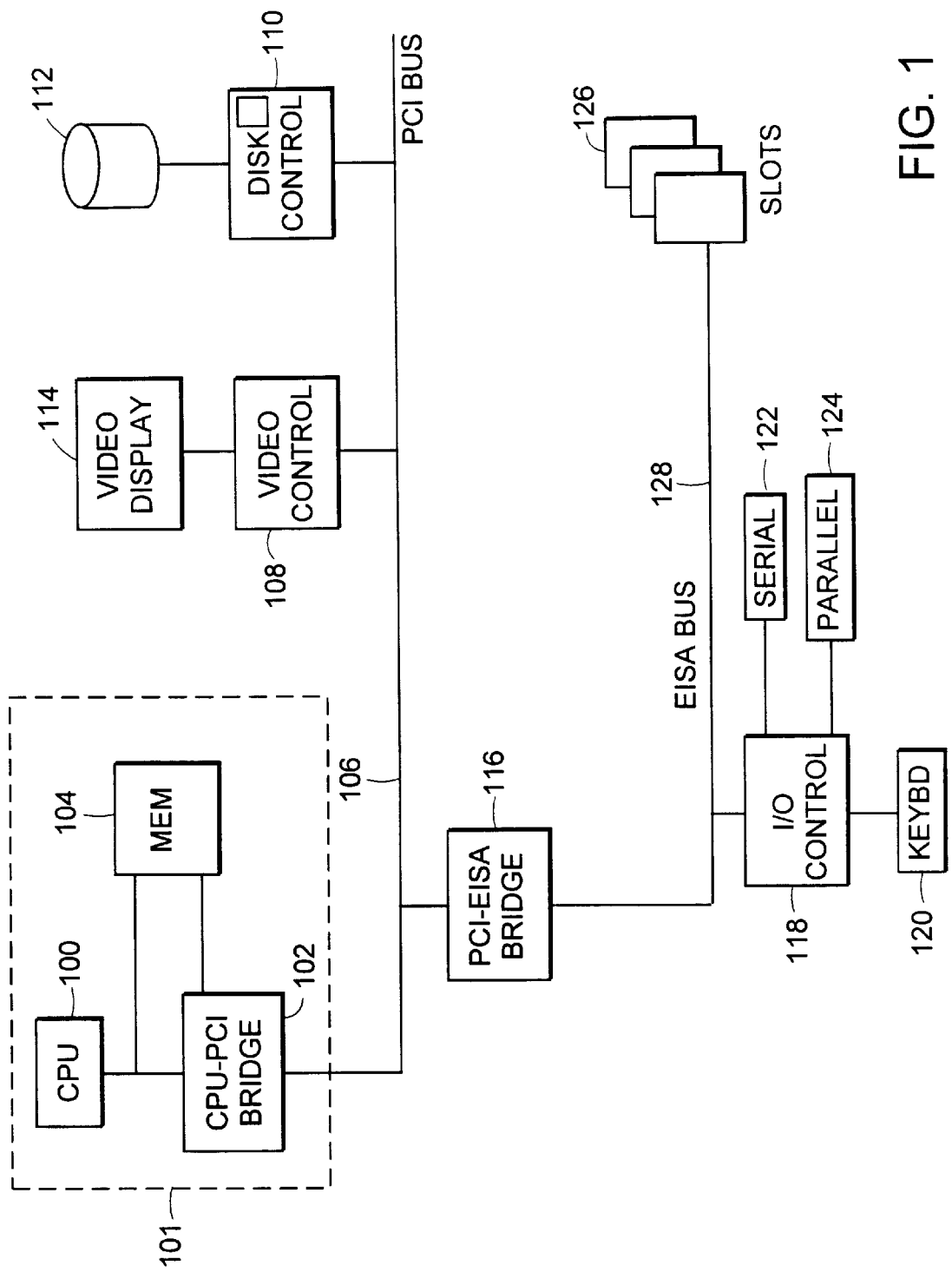
FIG. 1 is a block diagram of the computer system.

Referring to FIG. 1, a computer system includes a disk array controller 110 connected to a disk array system 112. The disk array controller 110 is connected to a Peripheral Component Interconnect (PCI) bus 106 for communication with other components of the computer system.

The disk array controller 110 has a memory (which can be made of synchronous dynamic random access memories or SDRAMs) to store data. To protect data stored in the memory, the disk array controller includes error detection and correction (EDC) logic. The EDC logic can correct any combination of eight-bit wide errors in any particular byte. The data width of the memory is 64 bits or 8 bytes. Using 16 check bits, the EDC logic in the disk array controller can protect all 8 bytes of the memory data. In addition, using the same 16 check bits, the EDC logic can detect single and two-adjacent bit errors (two physically adjacent bits) in a 32-bit address used to access the memory. All detected address bit errors are indicated as uncorrectable errors.

A processor board 101 is also connected to the PCI bus 106 and includes a central processing unit (CPU) 100 connected to a CPU-PCI bridge 102, which controls communication between the PCI bus 106 and the CPU 100. The CPU-PCI bridge 102 also includes a memory controller for controlling main memory 104.

The PCI bus 106 is further connected to a video controller 108 connected to a video display 114. The computer system also includes an expansion bus, which can be an Extended Industry Standard Architecture (EISA) bus 128. Communication between the PCI bus 106 and the EISA bus 128 is controlled by a PCI-EISA bridge 116. The EISA bus 128 is connected to EISA slots 126 to receive expansion cards. The EISA bus 128 is also connected to an I/O controller 118, which provides interfaces to a keyboard 120, a serial port 122, and a parallel port 124.

Figure 2:
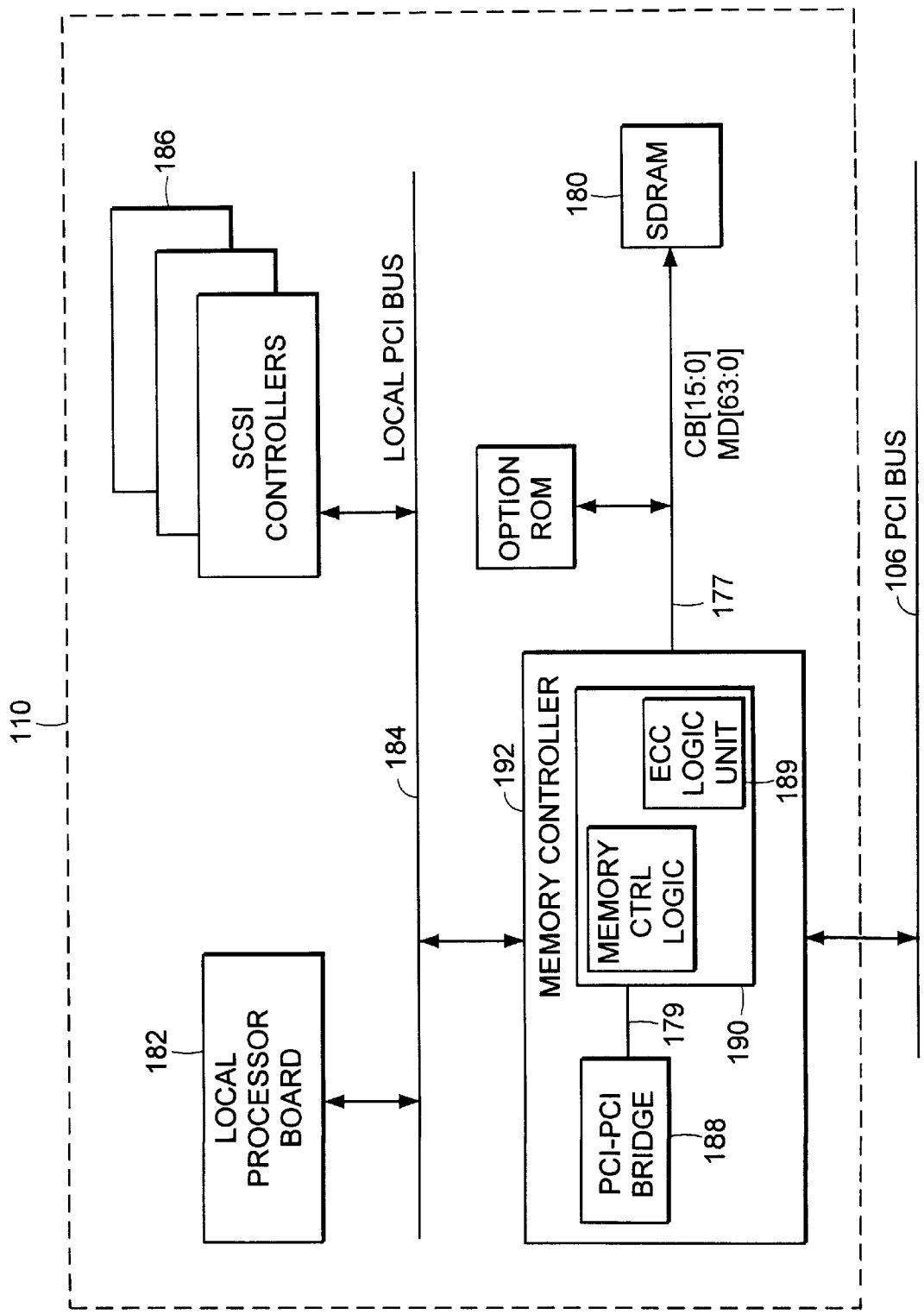
FIG. 2 is a block diagram of a disk array controller.

Referring to FIG. 2, the disk array controller 110 includes a local PCI bus 184 on which are located SCSI controllers 186 that control reads and writes to the disk array system 112. Each SCSI controller 186 is connected to an array of disk drives. The disk array controller 110 can implement a Redundant Array of Inexpensive Disks (RAID) algorithm (e.g., RAID 1, RAID 4, or RAID 5) to protect data transferred between the disk array controller 110 and the disk array system 112.

A local processor card 182 is also located on the local PCI bus 184 and controls data transfers to the SCSI controllers 186. All data transfers between the disk array system 112 and the other components of the computer system are routed between the local PCI bus 184 and host PCI bus 106 through a PCI interface controller 192 that includes a PCI-PCI bridge 188 and a memory controller 190.

The write and read data to and from the disk array system are temporarily stored (or cached) in a memory 180, which can be implemented with synchronous dynamic random access memories (SDRAMs). Alternatively, regular DRAMs can also be used. SDRAMs, which can operate at, for example, 66 MHZ or 99 MHZ provide relatively fast data transfer speeds (e.g., 528 MBytes/sec at 66 MHZ and 832 MBytes/sec at 99 MHZ). The size of the memory 180 can be varied, with a possible memory size being two gigabytes.

By using the memory 180 to store write or read data being transferred to or from the disk array system 112, disk access speeds are improved as the components on the host PCI bus 106 do not need to wait for the relatively slow disk array system 112 to complete the write or read operation.

For example, for a disk write operation in which data is transferred from the host PCI bus 106 to the disk array, the write can be performed directly to the SDRAMs 180. Upon completion of the write, the PCI-PCI bridge 188 asserts a transaction complete indication. The write data in the memory 180 is later transferred (under control of the local processor card 182) to the disk array system 112 to complete the disk write operation. In this manner, the host PCI bus 106 is not tied up waiting for the disk array controller 110 to complete a write to the disk array system 112.

In addition to caching write or read data, the memory 180 can also store other types of data structures (such as data structures for use by the local processor card 182 or SCSI controllers 186).

To ensure the integrity of data read from the SDRAMs 180, the memory controller 190 (in the PCI interface controller 192) includes an EDC logic unit 189 which can detect and correct errors in the memory data bits MD[63:0] using 16 check bits CB[15:0]. The data bits MD[63:0] and check bits CB[15:0] form an 80-bit memory data bus. The EDC logic unit 189 can also detect single or two-adjacent bit errors in the 32-bit memory address (received from either the host PCI bus 106 or local PCI bus 184) used to read data from the memory 180.

Figure 3:
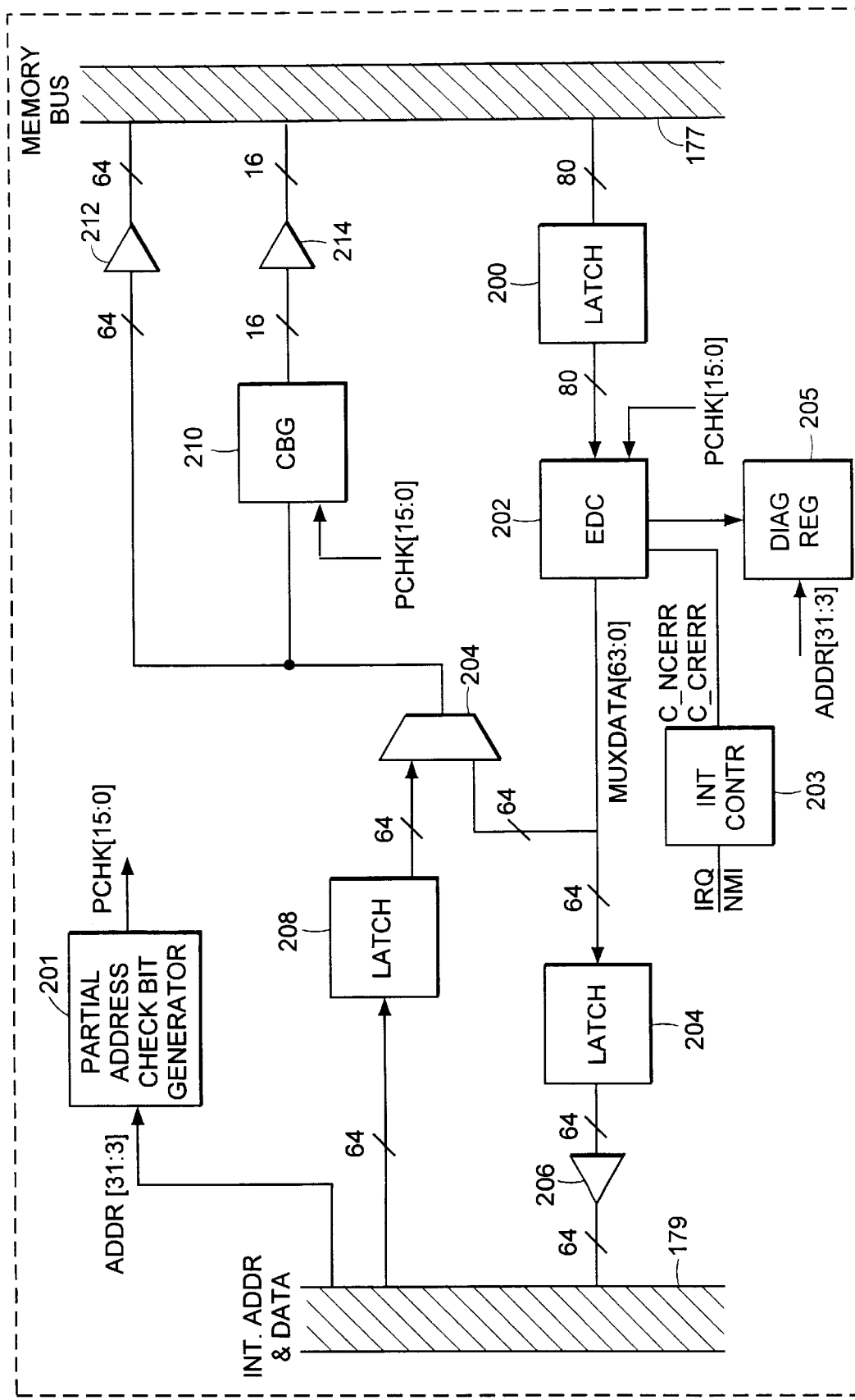
FIG. 3 is a block diagram of the data path and logic (including error detection and correction logic) in a memory controller.

Referring to FIG. 3, components of the EDC logic unit 189 in the memory controller 190 of the disk array controller 110 are shown. During a read cycle from the memory 180, data on the memory bus 177 are loaded into a latch 200 from the memory bus 177. The read data, which include check bits CB[15:0] and data bits MD[63:0] from the memory 180, are provided to an error detection and correction (EDC) circuit 202. Partial address check bits PCHK[15:0], generated by a partial address check bit generator 201 in response to the 32-bit address ADDR[31:0] on the internal address and data bus 179 (originally the PCI address from either the host or local PCI bus 106 or 184) provided to address the memory 180, are also received by the EDC circuit 202. Based on the retrieved check bits CB[15:0], partial address check bits PCHK[15:0], and the memory data MD[63:0], the EDC circuit 202 determines if an error has occurred in the memory data or address.

If the error is correctable, the erroneous bit or bits are flipped by the EDC circuit 202. If the error is uncorrectable, the EDC circuit 202 asserts a non-correctable status error signal to an interrupt controller 203. Data MUXDATA[63:0] from the EDC circuit 202 are provided to a latch 204, whose output is connected to buffers 206 for driving the read data onto the internal address and data bus 179 from the memory controller 190 to the PCI-PCI bridge 188.

During a write cycle to the memory 180 (from either PCI bus 106 or 184), write data (routed through the PCI-PCI bridge 188) are loaded from the internal address and data bus 179 into a 64-bit latch 208 whose output is connected to one input of a multiplexer 204. The other input of the multiplexer 204 is connected to receive the corrected memory data bits from the EDC circuit 202. The multiplexer 204 selects bytes from either the latch 208 or the EDC circuit 202 for output to a check-bit generator (CBG) 210, as well as to the input of a 64-bit buffer 212. The multiplexer 204 is used to route appropriate bytes to the memory bus 177 during a read-merge-write cycle, as described below. The buffer 212 drives the selected data signals onto the memory bus 177.

The check-bit generator 210 generates check bits from the 64-bit write data according to parity check matrices similar to the parity check matrices shown in FIGS. 5 and 6. The only difference is that during check bit generation by the generator 210, the check bits CB[15:0] are not used. Thus, each of the check bits is an exclusive OR of the data bits MD[63:0] that are associated with the value "1" and the corresponding partial address check bit PCHK. For example, the generated check bit CB[0] is the exclusive OR of data bits MD 1, 5–7, 10, 14, 15, 19, 23, 28, 37, 46, 55, and 56, and partial check bit PCHK[0]. Similarly, the generated check bit CB[1] is the exclusive OR of the data bits MD 2, 6, 7, 11, 15, 20, 29, 38, 47, 48, and 57, and the partial address check bit PCHK[1]. The other check bits CB[15:2] are generated in similar fashion.

The generated check bits CB[15:0] are provided to the input of a 16-bit buffer 214, which drives the states of the check bits CB[15:0] onto the memory bus 177 for storage in the memory 180 along with the write data MD[63:0].

If the write cycle is to fewer than all 8 data bytes of the memory bus 177, then a read-merge-write cycle is performed by the memory controller 190. In a read-merge-write cycle, the data stored in the memory 180 is first retrieved and provided to the input of the multiplexer 204 by the EDC circuit 202. The retrieved data corresponding to the bytes not written are then merged with the write data bytes from the latch 208 by the multiplexer 204 and presented as the write data at the output of the multiplexer 204. Thus, for example, if only bytes 0–3 and 6–7 are to be written to the memory 180 (with bytes 4 and 5 remaining unchanged in the write operation), then the read-merge-write operation would retrieve bytes 4 and 5 from the memory 180, merge them with the write bytes 0–3 and 6–7, and present the merged data at the output of the multiplexer 204.

Figure 4:
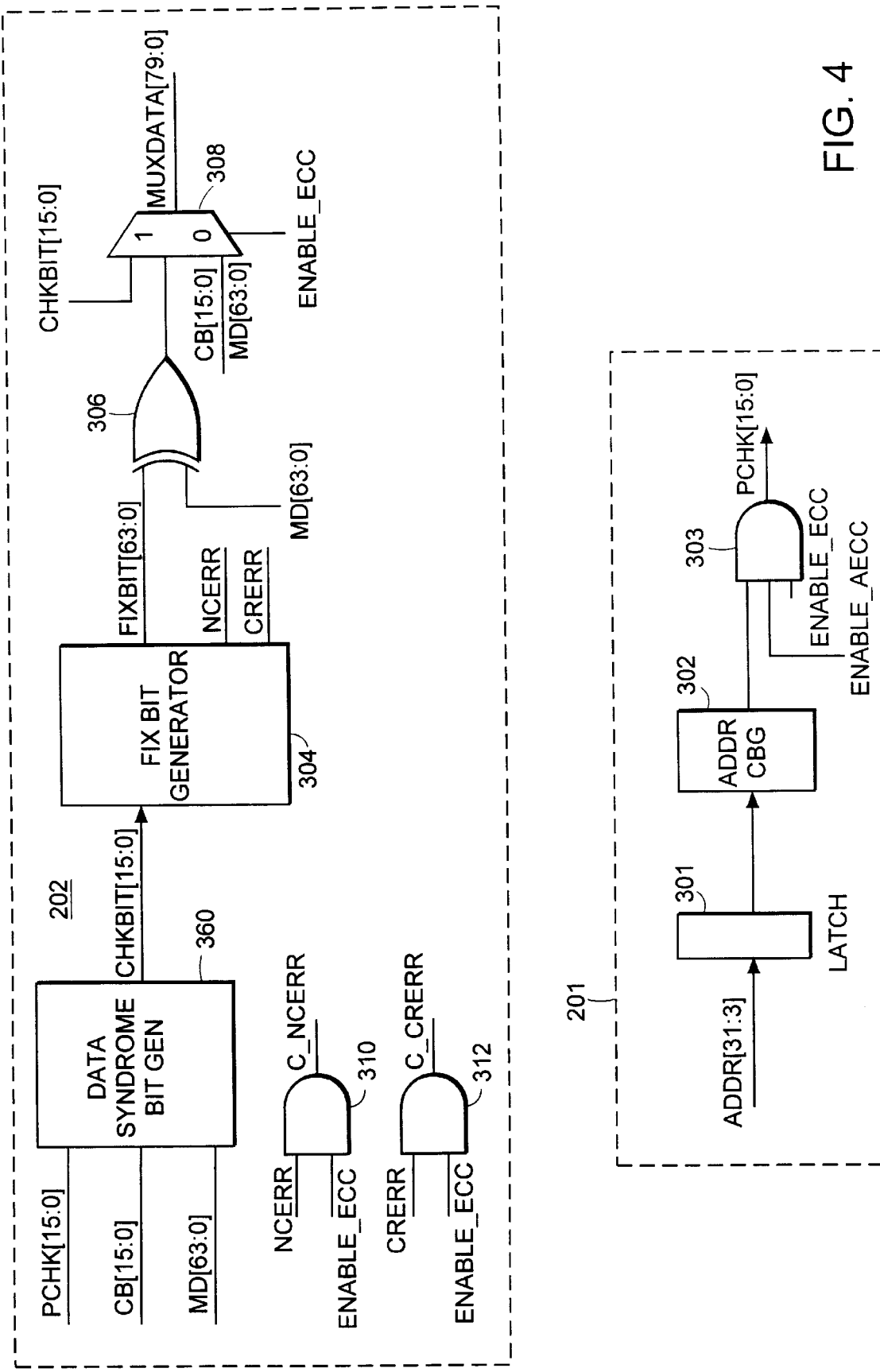
FIG. 4 is a block diagram of the error detection and correction logic.

Referring to FIG. 4, the EDC circuit 202 (FIG. 2) includes a syndrome bit generator 360 that receives partial address check bits PCHK[15:0], memory data check bits CB[15:0], and memory data bits MD[63:0]. The partial address check bits PCHK[15:0] are generated by an address check bit generator 302 from memory address signals ADDR[31:3] received from the PCI bus 106 or 184 (and latched by a latch 301) according to the address parity check matrix shown in FIG. 5. The output of the address check bit generator 302 is provided to inputs of 16 AND gates 303, which also receive the enable bit ENABLE_ECC. The output of the AND gates 303 produce PCHK[15:0] by asserting configuration signals ENABLE_ECC and ENABLE_AECC. The signal ENABLE_AECC when deasserted separately disables address error detection and correction. Thus, if desired, data EDC can be enabled (by asserting ENABLE_ECC) while address EDC can be disabled (by deasserting ENABLE_AECC).

The syndrome bit generator 360 generates syndrome bits CHKBIT[15:0] according to the data parity check matrix shown in FIG. 6. The syndrome bit signals CHKBIT[15:0] are provided to a fix bit generator 304, which generates fix bits FIXBIT[63:0] according to the syndrome table shown in FIGS. 7A–7N. For a correctable data bit error, the corresponding one of the fix bits FIXBIT[63:0] is set high. A set of 64 exclusive OR gates 306 receiving the fix bits FIXBIT[63:0] at one set of inputs and data bits MD[63:0] at a second set of inputs then flips the erroneous data bit by performing a bit-wise exclusive OR operation of the fix bits and memory data bits. For a no-error or uncorrectable error condition, the fix bits FIXBIT[63:0] are all "0"s.

The corrected data bits from the exclusive OR gates 306, as well as the syndrome bits CHKBIT[15:0], are provided to the "1" input of a multiplexer 308. The "0" input of the multiplexer 308 receives memory check bits CB[15:0] and memory data bits MD [63:0]. The multiplexer 308 selects between the corrected and uncorrected version of the memory data and check bits for output as MUXDATA[79:0], depending on whether a configuration signal ENABLE_ECC (output of an internal configuration register, not shown) is set high, which occurs when error detection and correction is enabled. If the signal ENABLE_ECC is high, then the corrected data bits from the exclusive OR gates 306 are output by the multiplexer 308.

The fix bit generator 304 also provides a signal CRERR (to indicate a correctable error has occurred) and a signal NCERR (to indicate a non-correctable error has occurred). The signal NCERR is gated with the signal ENABLE_ECC by an AND gate 310, which outputs a signal C_NCERR. The signal CRERR is gated with the signal ENABLE_ECC by an AND gate 312, which outputs a signal C_CRERR.

Once an error occurs, the interrupt controller 203 (FIG. 3) responds to assertion of either the C_NCERR or C_CRERR signals by generating an interrupt to the main CPU 100 of the computer system.

If the signal C_CRERR is asserted, the interrupt controller 203 asserts an interrupt request (IRQ) signal to the CPU 100 to indicate that a correctable error has occurred. When the interrupt is acknowledged, a software interrupt routine determines the proper procedure for informing the operator of the error, such as creating a log file listing all such correctable errors. If a non-correctable error occurs, the interrupt controller 203 initiates a non-maskable interrupt (NMI) to indicate to the CPU 100 that the data retrieved from the memory 180 is unreliable. The NMI software routine determines the proper courses of action following a non-correctable error, which include notifying the operator of such non-correctable error and/or notifying the application software of the error so that the erroneous read cycle can be retried. Alternatively, the memory controller 190 can retry or terminate its cycle (on the host or local PCI bus 106 or 184 via PCI-PCI bridge 188) without returning the corrupted data to the requester.

When either the C_NCERR or C_CRERR signal is asserted, the syndrome bits are stored in a diagnostic register 205 (FIG. 3). The register 205 includes other diagnostic bits, including a bit which indicates whether the error occurred during a read cycle or read-merge-write cycle. Further, the memory address associated with the error condition is also stored in another diagnostic register (not shown). The bit stored in the diagnostic registers are accessible by the CPU 100 under control of the interrupt handler routine.

Referring to FIG. 5, the memory address parity check matrix shows how the partial address check bits PCHK[15:0] are generated from memory address bits ADDR[31:3]. A partial address check bit PCHK[Y] (Y=0–15) is generated by performing an exclusive OR operation of the address bits associated with the value "1". Thus, for example, the partial address check bit PCHK[0] is generated by performing an exclusive OR operation of address bits ADDR 3, 5–9, 18, 20, 25, and 28. Partial address check bit PCHK[1] is generated by performing an exclusive OR operation of address bits ADDR 3, 4, 9, 11, 15, 17, 18, and 26. The other partial address check bits are generated in similar fashion.

Referring to FIG. 6, the memory data parity check matrix shows how the syndrome bits CHKBIT[15:0] are generated. A syndrome bit CHKBIT[Y] (Y=0–15) is generated by performing an exclusive OR operation of all memory data bits MD[63:0] associated with a value "1", the corresponding check bit CB[Y], and the corresponding partial address check bit PCHK[Y].

Thus, for example, the syndrome bit CHKBIT[0] is generated by performing an exclusive OR operation of memory data bits MD 1, 5–7, 10, 14, 15, 19, 23, 28, 37, 46, 55, and 56, the check bit CB[0], and the corresponding partial address check bit PCHK[0]. Similarly, the syndrome bit CHKBIT[1] is generated by performing an exclusive OR operation of data bits MD 2, 6, 7, 11, 15, 20, 29, 38, 47, 48, and 56, check bit CB[1], and the corresponding partial address check bit PCHK[1]. The other syndrome bits CHKBIT[15:2] are generated in like fashion.

Referring to FIGS. 7A–7N, the syndrome bits CHKBIT [15:0] map into a syndrome table. The 16 syndrome bits can represent 65,536 possible positions in the syndrome table. For simplicity and brevity, only the positions in the syndrome table that map to a correctable error are shown; the uncorrectable positions in the syndrome table are omitted.

Each of the syndrome table positions contains 2 entries: the first entry is the hexadecimal value of the syndrome bits CHKBIT[15:0] represented as four hexadecimal numbers; and the second entry indicates the error position associated with the memory or check bit data.

The syndrome table is further divided into eight subsections, with each subsection corresponding to a type of error condition (that is, single-bit error, two-bit error, etc.). Each subsection is further divided into 10 columns, with each column representing a byte of the 10-byte memory data bus 177. The 10 possible memory data bytes include 8 bytes of memory data and 2 bytes of check bits.

The first subsection displays the syndrome code and position for a single-bit error (FIG. 7A). For example, the syndrome code CHKBIT[15:0] having a hexadecimal value of 8013 indicates an error in byte 0 at data position 7 (D07); a syndrome code having a hexadecimal value of 8087 indicates a single-bit error in byte 1 at data position D15; a syndrome code having a hexadecimal value of 80CD indicates a single-bit error in byte 2 at position D23; etc. An error in the check bytes (byte 8 and byte 9) is also detectable. For example, a syndrome code having a hexadecimal value of 0001 indicates a single-bit error at position CB0 (check bit 0); a syndrome code having a hexadecimal value of 0100 indicates a single-bit error at check bit position CB8; etc.

The second subsection of the syndrome table (as shown in FIG. 7B) illustrates the syndrome code and positions for two-bit errors occurring within the same byte. Thus, for example, a syndrome code having a hexadecimal value of C094 indicates a two-bit error in byte 0 at memory data positions 6 and 7 (D0607); a syndrome code having a hexadecimal value of C04A indicates a two-bit error in byte 1 at positions D14 and D15; etc. Similarly, for the check bits, a syndrome code having a hexadecimal value of 0003 indicates a two-bit error in byte 8 at check bits CB0 and CB1; a syndrome code having a hexadecimal value of 0300 indicates a two-bit error in byte 9 at check bits CB8 and CB9; etc.

As shown in FIGS. 7C–7E, the third subsection of the syndrome table shows the syndrome code and positions for three-bit errors within the same byte. Thus, for example, a syndrome code having a hexadecimal value of E059 indicates a three-bit error in byte 0 at memory data bits 5, 6, and 7 (D050607); a syndrome code having a hexadecimal value of 0007 indicates a three-bit error in the check bits in byte 8 at positions CB0, CB1, and CB2; etc.

The next subsection of the syndrome table (FIG. 7F–7H) shows the syndrome code and positions for four-bit errors within the same byte. Thus, for example, the syndrome code having a hexadecimal value of F0B1 indicates a four-bit error in byte 0 at memory data bits 4, 5, 6, and 7 (D04050607); a hexadecimal value of 000F indicates a four-bit error in byte 8 at positions CB0, 1, 2, and 3.

The remaining subsections (FIGS. 7I–7L) of the syndrome table show the syndrome code and positions for five-bit errors within the same byte (FIGS. 7I–7K), six-bit errors within the same byte (FIG. 7L–7M), seven-bit errors within the same byte (FIG. 7N), and eight-bit errors within the same byte (FIG. 7N).

One advantage offered by the EDC logic is that the same number of check bits can be used to detect for address errors while also maintaining the ability to detect and correct multiple-bit errors in the data and check bits (up to 8 erroneous bits per byte). Any error in the address bits is indicated as an uncorrectable error. A further advantage offered by the EDC logic is that it can detect and correct a full range of memory data errors: from a single-bit error to a complete error of a byte (that is, all eight-bits of the byte are erroneous). When an error occurs, the CPU or system software can be notified of the error.

Figure 9:
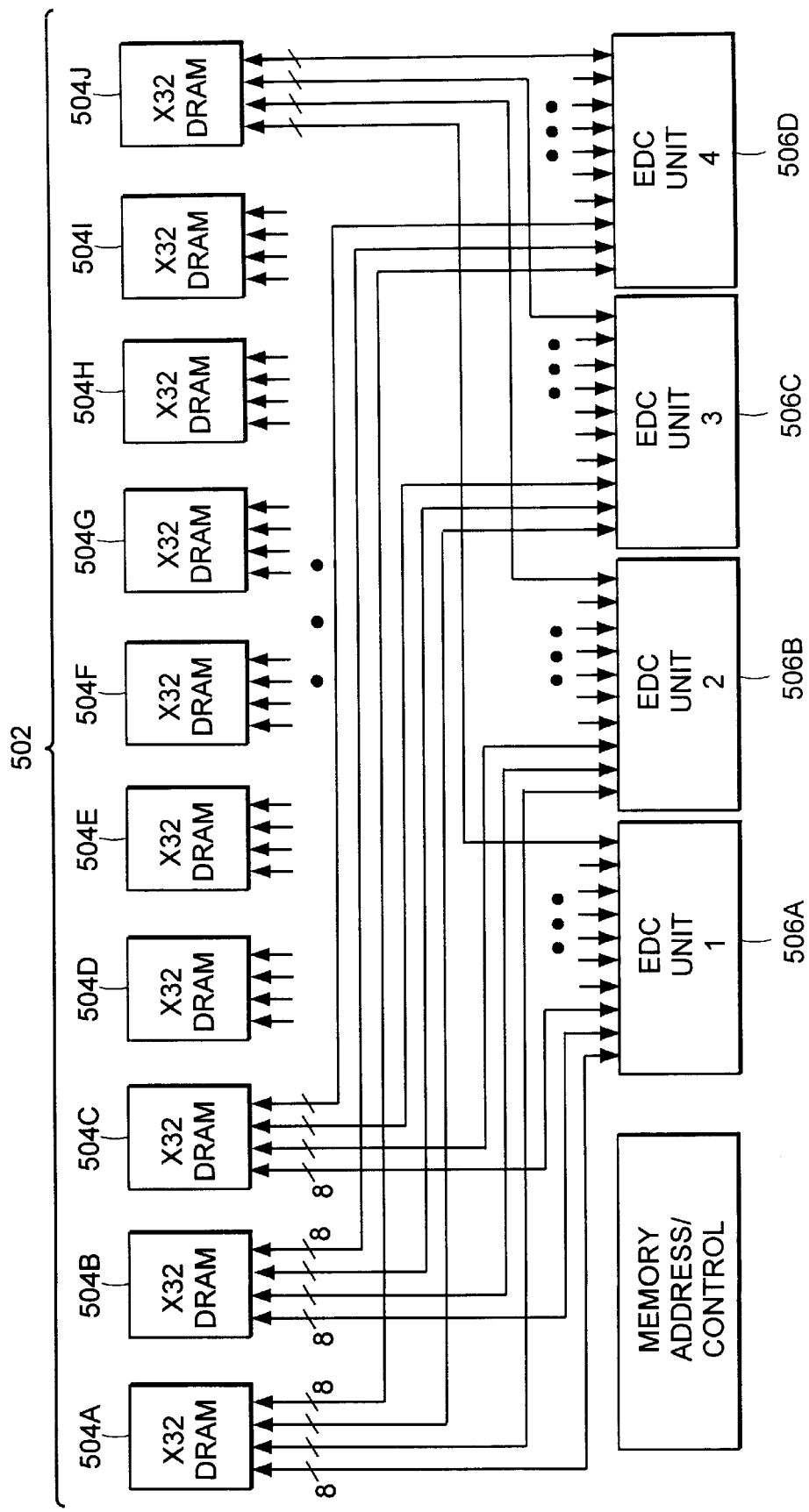

In addition, by reorganizing the memory data path, the EDC code described above can be used to detect and correct up to 16-bit errors in a word (16 bits of memory data), 32-bit errors in a double word (32 bits of memory data), and so forth. Applications where these are particularly advantageous include memory systems in which x16 and x32 DRAM devices are used. FIG. 8 is an exemplary memory system in which x16 DRAM devices are used, and FIG. 9 is an exemplary memory system in which x32 memory devices are used.

Referring to FIG. 8, a memory 402 includes ten x16 DRAM devices 404A–J connected to 160 data bits, of which 128 bits are memory data bits and 32 are memory check bits. The memory system 402 is connected to two EDC units 406A and 406B, which can be implemented in separate ASICs, as separate logical units in one ASIC, or as part of a memory controller. Each EDC unit implements the EDC code described in connection with FIGS. 5–7, and the two EDC units 406A and 406B in combination provide protection for 16 bits of data in any particular word.

To allow detection and correction of up to 16 bits of data in a given word using the ECC code of FIGS. 5–7, the memory 402 can be thought of as being divided into two halves, with half the data bits and check bits (64 data bits and 16 check bits) being provided to the EDC unit 406A, and the other half of the data bits and check bits connected to the EDC unit 406B.

When implemented with discrete x16 DRAM devices 404A–J, each x16 DRAM device is effectively divided in two halves, with a first byte going to the first EDC unit 406A, and the second byte going to the second EDC unit 406B. Thus, the first EDC unit 406A detects and corrects errors in the first byte of each of the DRAM devices 404A–J, and the second EDC unit 406B detects and corrects errors in the second byte of each of the DRAM devices 404A–J. The EDC unit 406A receives 16 of the check bits, and the EDC unit 406B receives the other 16 check bits.

Thus, the EDC unit 406A can detect and correct up to 8-bit errors in each of the 8 bytes of data it receives from the memory system 402, while simultaneously, the EDC unit 406B can detect and correct up to 8-bit errors in each of the other 8 bytes of data it receives from the memory 402. Effectively, this provides the capability to detect and correct up to 16 bits of data in any given word from the memory 402.

One advantage offered by the system shown in FIG. 8 is that the memory 402 can withstand a complete failure of one of the x16 DRAM devices 404 without loss of data or system failure. A further advantage is that the ability to detect and correct 16 bits of data in a given word can be accomplished using just 32 check bits to protect 128 total data bits.

In addition, the EDC units can also detect a single-bit or two-adjacent-bit errors in the address used to access the memory 402. The address bits ADDR[3:0] are ignored in the address parity check matrix.

Referring to FIG. 9, four EDC units 506A–D are used to detect and correct up to 32 bits of error in any given 32-bit wide (or double word) data. In the example of FIG. 9, a memory 502 (which is implemented with two x32 DRAM devices) is connected to 256 bits of data and 64 check bits. In this organization, each x32 DRAM device 504 is divided into four bytes, with each byte connected to a corresponding one of the EDC units 506A–D. Thus, the EDC unit 506A detects and corrects up to 8-bit errors in the first byte of data of each of the DRAM devices 504A–J, the second EDC unit 506B detects and corrects up to 8-bit errors in the second byte of each of the DRAM devices, and the EDC units 506C and 506D detect and correct up to 8-bit errors in the third and fourth bytes, respectively, of the DRAM devices.

Effectively, the EDC units 506A–D, each receiving 16 of the 64 total check bits, in combination can detect and correct up to 32 adjacent bits of data within a given double word while at the same time detecting for an address error. The address bits ADDR[4:0] are ignored in the address parity check matrix.

Other embodiments are within the scope of the following claims. For example, although the EDC logic has been described in a disk array controller, the same logic can be applied to any other computer memory subsystem. For example, the EDC logic can be implemented to protect data stored in main memory, video memory, cache memory, etc. In addition, although the EDC logic has been explained in conjunction with a PCI system, the same logic can be implemented with other types of buses, such as the Industry Standard Architecture (ISA) bus, the MCA bus, etc.

Further, as an alternative, the EDC logic can be modified to detect a single address pin failure on a memory device. To reduce the number of pins, DRAMs and SDRAMs receive multiplexed address signals; that is, the address is separated into a row address portion and column address portion received on the same set of pins at different times. For example, the memory controller 190 can generate row address signals RADDR[13:0] when a row address strobe (RAS_) is active and column address signals CADDR[13:0] when a column address strobe (CAS_) is active for receipt by the memory devices in the main memory 104. Thus, if a memory device has a defective input address pin, two address bits would be erroneous—one bit in the row address and one bit in the column address. If memory address pin o of a memory device is defective, for example, the row address bit RADDR[0] and column address bit CADDR[0] received in the memory device would both be erroneous.

To detect for the single address pin failure, the address parity check matrix of FIG. 5 is modified such that each row address bit and column address bit received by a DRAM or SDRAM device on the same pin is next to each other. Thus, for example, address signals corresponding to RADDR[0] and CADDR[0] would be placed in address positions 4 and 5 in the address parity check matrix; address signals corresponding to RADDR[1] and CADDR[1] would be placed in address positions 6 and 7; and so forth.

Figure 10:
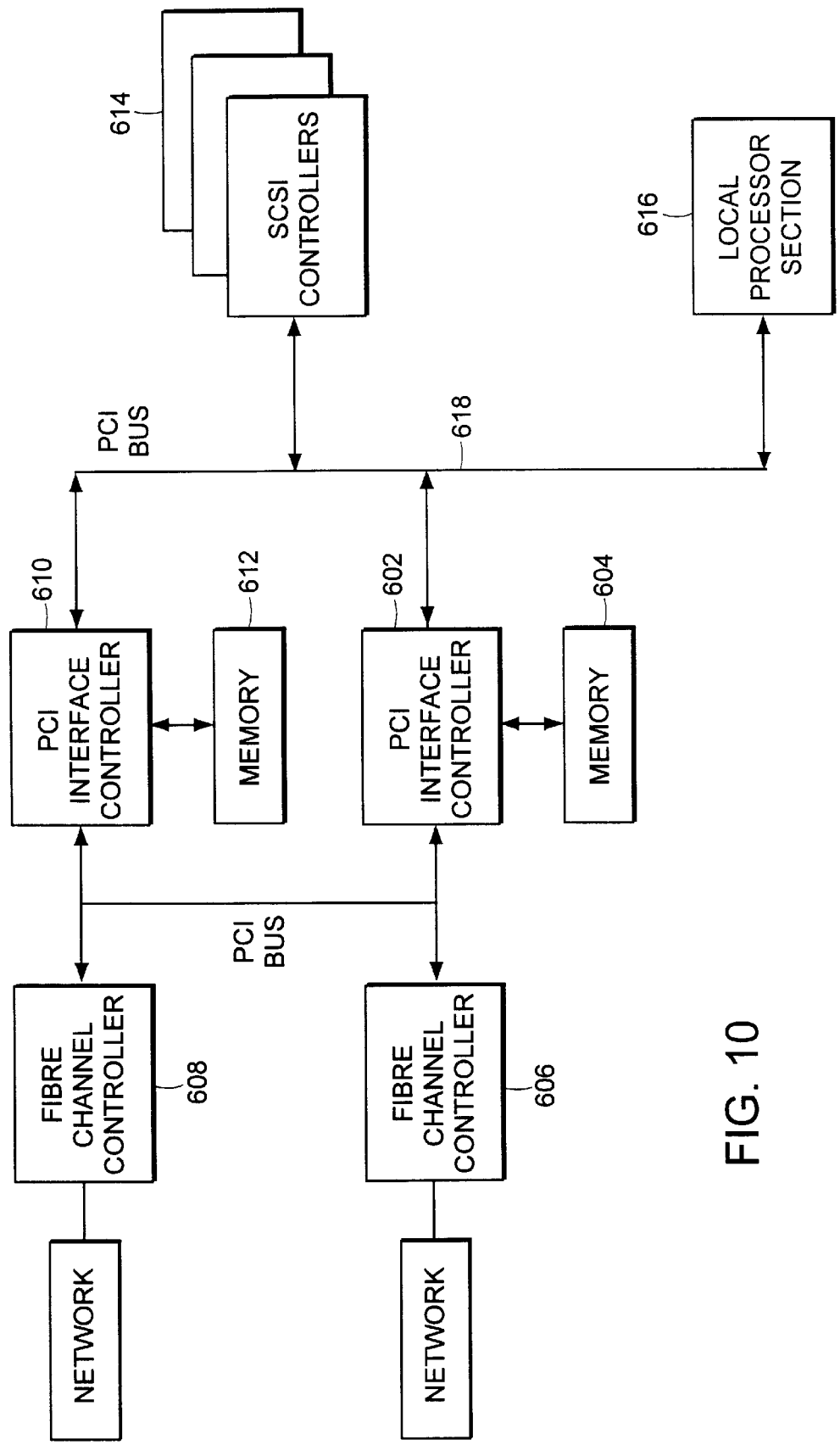
FIG. 10 is a block diagram of a disk array controller connected to network systems.
Figure 11:
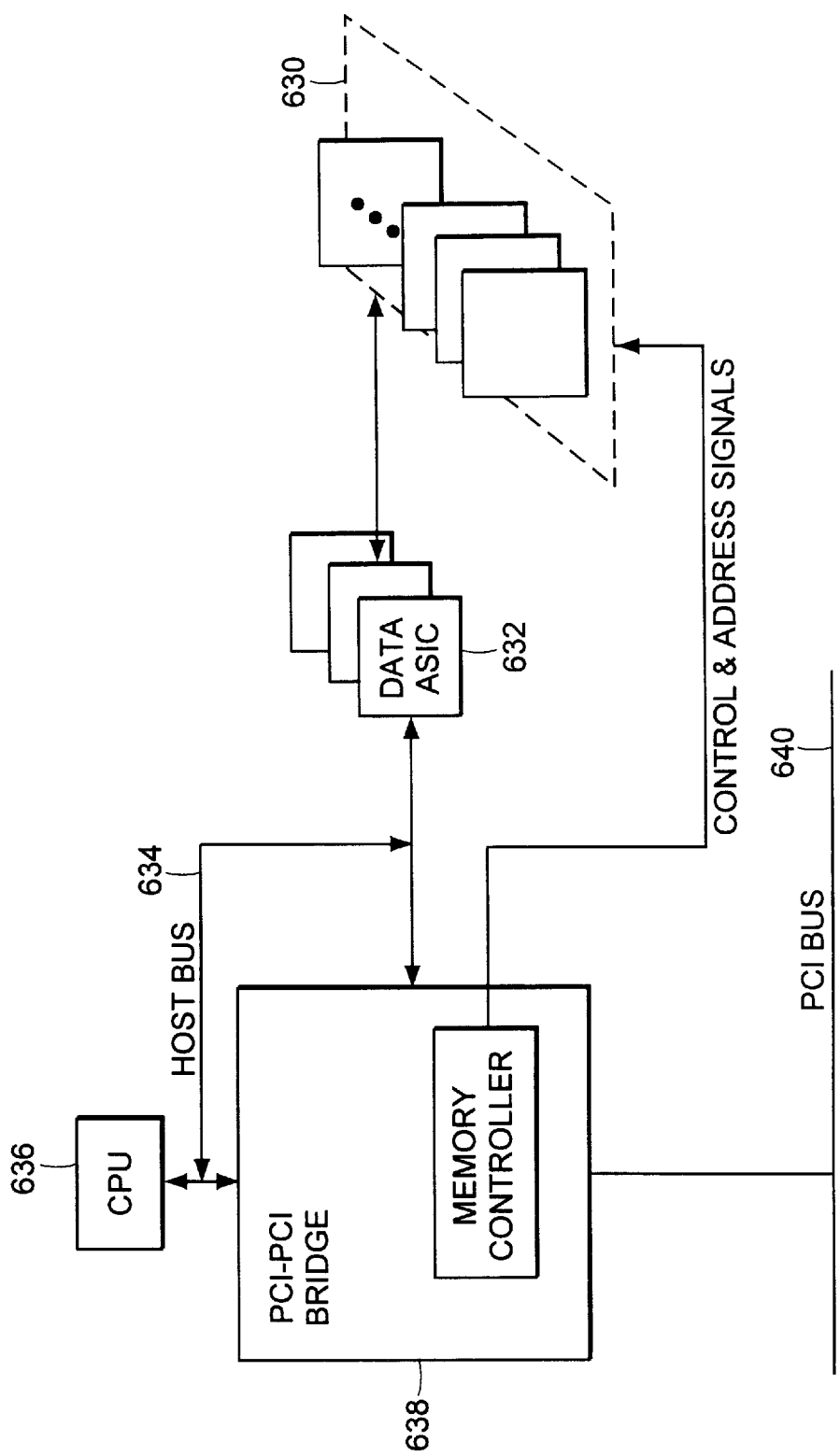
FIG. 11 is a block diagram of a main memory system in a computer.

FIGS. 10 and 11 illustrate other exemplary memory systems in which the EDC logic can be used.

Referring to FIG. 10, a disk array controller for connection to multiple network systems is shown. The disk array controller includes PCI interface controllers 602 and 610 connected between a local PCI bus 618 and a second PCI bus 620. The second PCI bus 620 is connected to network interface controllers 606 and 608, which can be Fibre Channel controllers, which are in turn connected to Fibre Channel networks. In this configuration, the disk array controller is connected to receive disk requests from multiple networks.

Each of the PCI interface controllers 602 and 610 is associated with its own local memory 604 and 612, respectively. A local processor section 616 is also connected to the PCI bus 618. EDC logic (as described above) is implemented in each of the PCI interface controllers 610 and 604 to protect data retrieved from local memories 612 and 604, respectively.

Referring to FIG. 11, the EDC logic can also be implemented in a main memory 630 of a computer system. The main memory 630 includes individual chips, which can be DRAM or SDRAM devices. The memory chips are connected to a memory data bus, which are then provided to one or more data ASICs 632 (in which the EDC logic is implemented). The data ASICs 632 are in turn connected to the host bus 634, on which a CPU 636 is located. A CPU-PCI bridge 638 is connected between the host bus 634 and a PCI bus 640. A memory controller inside the CPU-PCI bridge 636 provides control and address signals to the main memory 630. As explained above, a single date ASIC or multiple data ASICs can be used, depending on the number of data bits to be protected as well as the type of ASIC being used. For example, in one configuration, the memory 630 is 80 bits wide (64 data bits and 16 check bits) and includes ten x8 memory devices. The x8 memory devices are connected to a single data ASIC that includes EDC logic to detect and correct 8-bit errors in any given byte. In another configuration, the memory 630 is 160 bits wide and contains ten x16 memory devices. The x16 memory devices can be connected to two data ASICs to enable detection and correction of up to 16-bit errors in any given word in a similar way as the organization shown in FIG. 8. In a third configuration, the memory 630 can be 320 bits wide, contain ten x32 memory devices, and connected to four data ASICs similar to the organization shown in FIG. 9. This EDC feature can be extended to other memory organizations.

What is claimed is:

1. A computer system, comprising:
   a CPU;
   a disk array system accessible by the CPU; and
   a disk array controller connected to the disk array system, the disk array controller including:
      a processor;
      a memory system coupled to the processor, the memory system connected to signal lines carrying data bits, address bits, and check bits; and
      an error detection and correction device connected to detect and correct multiple errors in the data bits using the check bits, and to detect an error in the address bits using the same check bits, the data bits being organized as multiple bytes, wherein the error detection and correction device is connected to detect and correct up to eight-bit errors in each byte, wherein the error detection and correction device is connected to detect a single-bit error or a two-adjacent-bit error in the address bits, and wherein the error detection and correction device can be configured to disable detecting an error in the address bits while enabling detecting and correcting the data bits.

2. The computer system of claim 1, wherein the memory system is connected to signal lines carrying 64 or fewer data bits and 16 check bits.

3. A computer system, comprising:

a memory system connected to signal lines carrying data bits, address bits, and at least 16 check bits; and an error detection and correction device connected to detect and correct N-bit errors in the data bits using the check bits, and to detect an error in the address bits using the same check bits, N being greater than two, wherein the error detection and correction device can be configured to disable detecting an error in the address bits while enabling detecting and correcting the data bits.

4. The computer system of claim 3, wherein the data bits are organized as bytes, and the error detection and correction device is connected to detect and correct up to eight-bit errors in each byte.

5. The computer system of claim 3, wherein the error detection and correction device is connected to detect a single-bit error or a two-adjacent-bit error in the address bits.

6. The computer system of claim 3, wherein the memory system is connected to signal lines carrying 64 or fewer data bits and 16 check bits.

7. The computer system of claim 3, wherein the memory system is connected to signal lines carrying 32 or fewer address bits.

8. The computer system of claim 3, wherein the error detection and correction device generates a syndrome table that includes entries mapped to correctable or uncorrectable errors, and a detected address error is mapped to an uncorrectable error entry.

9. The computer system of claim 3, further comprising:

a disk controller, the memory system being located in the disk controller.

10. The computer system of claim 9, further comprising:

a disk system connected to the disk controller, wherein the memory system is used as a cache for data transferred to the disk system.

11. The computer system of claim 3, wherein the memory system includes a main memory of the computer system.

12. The computer system of claim 3, wherein the error detection and correction device includes:

a decoder connected to receive the check bits, address bits, and data bits to generate an indication that a memory address or data error has occurred; and a correction circuit connected to correct the data bits if a correctable memory data error is present.

13. The computer system of claim 12, wherein the error detection and correction device further includes a partial address check bit generator to generate partial address check bits based on the memory address bits, and wherein the decoder is connected to further receive the partial address check bits to determine if a memory address or data error has occurred.

14. The computer system of claim 13, wherein the memory system is connected to single lines carrying 32 or fewer address bits, and wherein the partial address check bit generator generates 16 partial address check bits PCHK [15:0] according to the following address parity check matrix:

| | <------------------- Address Bits --------------------> | | | | | | | |
|---|---|---|---|---|---|---|---|---|
| | 0123 | 4567 | 11 8901 | 1111 2345 | 1111 6789 | 2222 0123 | 2222 4567 | 2233 8901 |
| PCHK [F] | xxx0 | 0000 | 0000 | 0000 | 0000 | 0000 | 0000 | 0000 |
| PCHK [E] | xxx0 | 0000 | 0000 | 0000 | 0000 | 0000 | 0000 | 0000 |
| PCHK [D] | xxx0 | 0000 | 0000 | 0000 | 0000 | 0000 | 0000 | 0000 |
| PCHK [C] | xxx0 | 0000 | 0000 | 0000 | 0000 | 0000 | 0000 | 0000 |
| PCHK [B] | xxx0 | 0000 | 0000 | 0000 | 0000 | 0000 | 0000 | 0000 |
| PCHK [A] | xxx0 | 0010 | 0011 | 1000 | 0011 | 1110 | 0000 | 1110 |
| PCHK [9] | xxx0 | 1100 | 1100 | 0110 | 1100 | 0001 | 1011 | 0001 |
| PCHK [8] | xxx0 | 0101 | 0101 | 0101 | 0101 | 0101 | 0101 | 0101 |
| PCHK [7] | xxx0 | 0000 | 0000 | 1100 | 0000 | 0010 | 1000 | 0010 |
| PCHK [6] | xxx0 | 0000 | 0000 | 1000 | 0000 | 0000 | 0000 | 0001 |
| PCHK [5] | xxx0 | 0010 | 1010 | 0000 | 0000 | 0011 | 0010 | 0100 |
| PCHK [4] | xxx0 | 1000 | 0110 | 0010 | 1000 | 0100 | 0001 | 0000 |
| PCHK [3] | xxx0 | 0000 | 0000 | 0000 | 1000 | 1000 | 0100 | 0010 |
| PCHK [2] | xxx0 | 0001 | 0000 | 0011 | 0001 | 0000 | 1000 | 1000 |
| PCHK [1] | xxx1 | 1000 | 0101 | 0001 | 0110 | 0000 | 0010 | 0000 |
| PCHK [0] | xxx1 | 0111 | 1100 | 0000 | 0010 | 1000 | 0100 | 1000 |

15. The computer system of claim 14, wherein the memory system is connected to signal lines carrying 64 or fewer data bits and 16 check bits, wherein the decoder generates 16 syndrome bits, and wherein the 16 syndrome bits are generated according to the following data parity check matrix:

| | <---------------------------Data Bits----------------------------> | | | | | | | | | | | |
|---|---|---|---|---|---|---|---|---|---|---|---|---|
| SYNDROME BIT[Y] | | | | | | | | | | | | |
| | 0123 | 4567 | 11 8901 | 1111 2345 | 1111 6789 | 2222 0123 | 2222 4567 | 2233 8901 | 3333 2345 | 3333 6789 | 4444 0123 | 4444 4567 |
| F | 0000 | 0001 | 0000 | 0001 | 0000 | 0001 | 0000 | 0001 | 0000 | 0001 | 0000 | 0001 |
| E | 0000 | 0010 | 0000 | 0010 | 0000 | 0010 | 0000 | 0010 | 0000 | 0010 | 0000 | 0010 |
| D | 0000 | 0100 | 0000 | 0100 | 0000 | 0100 | 0000 | 0100 | 0000 | 0100 | 0000 | 0100 |
| C | 0000 | 1000 | 0000 | 1000 | 0000 | 1000 | 0000 | 1000 | 0000 | 1000 | 0000 | 1000 |
| B | 0001 | 0000 | 0001 | 0000 | 0001 | 0000 | 0001 | 0000 | 0001 | 0000 | 0001 | 0000 |
| A | 0010 | 0000 | 0010 | 0000 | 0010 | 0000 | 0010 | 0000 | 0010 | 0000 | 0010 | 0000 |
| 9 | 0100 | 0000 | 0100 | 0000 | 0100 | 0000 | 0100 | 0000 | 0100 | 0000 | 0100 | 0000 |

-continued

| | | | | | | | | | | | | |
|---|---|---|---|---|---|---|---|---|---|---|---|---|
| 8 | 1000 | 0000 | 1000 | 0000 | 1000 | 0000 | 1000 | 0000 | 1000 | 0000 | 1000 | 0000 |
| 7 | 1000 | 1110 | 0100 | 0111 | 0010 | 0011 | 0001 | 0001 | 0000 | 1000 | 0000 | 0100 |
| 6 | 0001 | 1100 | 1000 | 1110 | 0100 | 0111 | 0010 | 0011 | 0001 | 0001 | 0000 | 0100 |
| 5 | 0011 | 1000 | 0001 | 1100 | 1000 | 1110 | 0100 | 0111 | 0010 | 0011 | 0001 | 0001 |
| 4 | 0111 | 0001 | 0011 | 1000 | 0001 | 1100 | 1000 | 1110 | 0100 | 0111 | 0010 | 0011 |
| 3 | 0110 | 1100 | 0011 | 0110 | 0001 | 1011 | 0000 | 1101 | 1000 | 0110 | 0100 | 0011 |
| 2 | 0101 | 0110 | 0010 | 1011 | 0001 | 0101 | 0000 | 1010 | 0000 | 0101 | 1000 | 0010 |
| 1 | 0010 | 0011 | 0001 | 0001 | 0000 | 1000 | 0000 | 0100 | 0000 | 0010 | 0000 | 0001 |
| 0 | 0100 | 0111 | 0010 | 0011 | 0001 | 0001 | 0000 | 1000 | 0000 | 0100 | 0000 | 0010 |
| | Btye 0 | | Byte 1 | | Byte 2 | | Byte 3 | | Byte 4 | | Byte 5 | |

| | | <----- Data Bits -----> | | | <------- Check Bits ------> | | | | |
|---|---|---|---|---|---|---|---|---|---|
| | | 4455 8901 | 5555 2345 | 5555 6789 | 6666 0123 | CCCC 0123 | CCCC 4567 | CCCC 89AB | CCCC CDEF | |
| | F | 0000 | 0001 | 0000 | 0001 | 0000 | 0000 | 0000 | 0001 | PCHK [F] |
| | E | 0000 | 0010 | 0000 | 0010 | 0000 | 0000 | 0000 | 0010 | PCHK [E] |
| | D | 0000 | 0100 | 0000 | 0100 | 0000 | 0000 | 0000 | 0100 | PCHK [D] |
| | C | 0000 | 1000 | 0000 | 1000 | 0000 | 0000 | 0000 | 1000 | PCHK [C] |
| | B | 0001 | 0000 | 0001 | 0000 | 0000 | 0000 | 0001 | 0000 | PCHK [B] |
| | A | 0010 | 0000 | 0010 | 0000 | 0000 | 0000 | 0010 | 0000 | PCHK [A] |
| | 9 | 0100 | 0000 | 0100 | 0000 | 0000 | 0000 | 0100 | 0000 | PCHK [9] |
| | 8 | 1000 | 0000 | 1000 | 0000 | 0000 | 0000 | 1000 | 0000 | PCHK [8] |
| | 7 | 0000 | 0010 | 0000 | 0001 | 0000 | 0001 | 0000 | 0000 | PCHK [7] |
| | 6 | 0000 | 0100 | 0000 | 0010 | 0000 | 0010 | 0000 | 0000 | PCHK [6] |
| | 5 | 0000 | 1000 | 0000 | 0100 | 0000 | 0100 | 0000 | 0000 | PCHK [5] |
| | 4 | 0001 | 0001 | 0000 | 1000 | 0000 | 1000 | 0000 | 0000 | PCHK [4] |
| | 3 | 0010 | 0001 | 0001 | 0000 | 0001 | 0000 | 0000 | 0000 | PCHK [3] |
| | 2 | 0100 | 0001 | 0010 | 0000 | 0010 | 0000 | 0000 | 0000 | PCHK [2] |
| | 1 | 1000 | 0000 | 0100 | 0000 | 0100 | 0000 | 0000 | 0000 | PCHK [1] |
| | 0 | 0000 | 0001 | 1000 | 0000 | 1000 | 0000 | 0000 | 0000 | PCHK [0] |
| | | Byte 6 | | Byte 7 | | Byte 8 | | Byte 9 | | |

16. The computer system of claim 15, wherein the error detection and correction device performs the error detection and correction according to the following syndrome table, an entry in the syndrome table being selected by a hexadecimal value of the syndrome bits:

| Byte 0 | Byte 1 | Byte 2 | Byte 3 | Byte 4 | Byte 5 | Byte 6 | Byte 7 | Byte 8 | Byte 9 |
|---|---|---|---|---|---|---|---|---|---|
| | | Syndrome code (Hex) and position for a single bit | | | | | | | |
| 8013 | 8087 | 80CD | 80E8 | 8074 | 803A | 801D | 1010 | 0001 | 0100 |
| D07 | D15 | D23 | D31 | D39 | D47 | D55 | D63 | CB 0 | CB 8 |
| 4087 | 40CD | 40E8 | 4074 | 403A | 401D | 4080 | 2020 | 0002 | 0200 |
| D06 | D14 | D22 | D30 | D38 | D46 | D54 | D62 | CB 1 | CB 9 |
| 20CD | 20E8 | 2074 | 203A | 201D | 2080 | 2040 | 4040 | 0004 | 0400 |
| D05 | D13 | D21 | D29 | D37 | D45 | D53 | D61 | CB 2 | CB A |
| 10E8 | 1074 | 103A | 101D | 1080 | 1040 | 1020 | 8080 | 0008 | 0B00 |
| D04 | D12 | D20 | D28 | D36 | D44 | DS2 | D60 | CB 3 | CB B |
| 0874 | 083A | 081D | 0880 | 0840 | 0820 | 0810 | 0808 | 0010 | 1000 |
| D03 | D11 | D19 | D27 | D35 | D43 | D51 | D59 | CB 4 | CB C |
| 043A | 041D | 0480 | 0440 | 0420 | 0410 | 0408 | 0404 | 0020 | 2000 |
| D02 | D10 | D18 | D26 | D34 | D42 | D50 | D58 | CB 5 | CB D |
| 021D | 0280 | 0240 | 0220 | 0210 | 0208 | 0204 | 0202 | 0040 | 4000 |
| D01 | D09 | D17 | D25 | D33 | D41 | D49 | D57 | CB 6 | CB E |
| 0180 | 0140 | 0120 | 0110 | 0108 | 0104 | 0102 | 0101 | 00B0 | 8000 |
| D00 | D08 | D16 | D24 | D32 | D40 | D4B | D56 | CB 7 | CB F |
| | | Syndrome code (Hex) and position for double-bit within the same byte | | | | | | | |
| C094 | C04A | C025 | C09C | C04E | C027 | C09D | 3030 | 0003 | 0300 |
| D0607 | D1415 | D2223 | D3031 | D3839 | D4647 | D5455 | D6263 | CB 01 | CB 89 |
| A0DE | A06F | A0B9 | A0D2 | A069 | A0BA | A05D | 5050 | 0005 | 0500 |
| D0507 | D1315 | D2123 | D2931 | D3739 | D4547 | D5355 | D6163 | CB 02 | CB 8A |
| 90FB | 90F3 | 9QF7 | 90F5 | 90F4 | 907A | 903D | 9090 | 0009 | 0900 |
| D0407 | D1215 | D2023 | D2831 | D3639 | D4447 | D5255 | D6063 | CB 03 | CB 8B |
| 8867 | B8BD | 88D0 | 8868 | 8834 | 881A | 880D | 1818 | 0011 | 1100 |
| D0307 | D1115 | D1923 | D2731 | D3539 | D4347 | D5155 | D5963 | CB 04 | CB 8C |
| 8429 | 849A | 844D | 84A8 | 84B4 | 842A | 8415 | 1414 | 0021 | 2100 |
| D0207 | D1015 | D1823 | D2631 | D3439 | b4247 | D5055 | D5863 | CB 05 | CB 8D |
| 820E | 8207 | 828D | 82C8; | 8264 | 8232 | 8219 | 1212 | 0041 | 4100 |
| D0107 | D0915 | D1723 | D2531 | D3339 | D4147 | D4955 | D5763 | CB 06 | CB 8E |
| 8193 | 81C7 | 81ED | 81F8 | 817C | 813E | 811F | 1111 | 0081 | 8100 |
| D0007 | D0815 | D1623 | D2431 | D3239 | D4047 | D4855 | D5663 | CB 07 | CB 8F |
| 604A | 6025 | 609C | 604E | 6027 | 609D | 60C0 | 6060 | 0006 | 0600 |

| Byte 0 | Byte 1 | Byte 2 | Byte 3 | Byte 4 | Byte 5 | Byte 6 | Byte 7 | Byte 8 | Byte 9 |
|---|---|---|---|---|---|---|---|---|---|
| D0506 | D1314 | D2122 | D2930 | D3738 D4546 | D5354 | D6162 | CB 12 | CB 9A | |
| 506F | 50B9 | 50D2 | 5069 | 50BA | 505D | 50A0 | A0A0 | 000A | 0A00 |
| D0406 | D121A | D2022 | D2830 | D3638 | D4446 | D5254 | D6062 | CB 13 | CB 9B |
| 48F3 | 48F7 | 48F5 | 48F4 | 487A | 483D | 4890 | 2828 | 0012 | 1200 |
| D0306 | D1114 | D1922 | D2730 | D3538 | D4346 | D5154 | D5962 | CB 14 | CB 9C |
| 44BD | 44D0 | 4468 | 4434 | 441A | 440D | 4488 | 2424 | 0022 | 2200 |
| D0206 | D1014 | D1822 | D2630 | D3438 | D4246 | D5054 | D5862 | CB 15 | CB 9D |
| 429A | 424D | 42A8 | 4254 | 422A | 4215 | 4284 | 2222 | 0042 | 4200 |
| D0106 | D0914 | D1722 | D2530 | D3338 | D4146 | D4954 | D5762 | CB 16 | CB 9E |
| 4107 | 418D | 41C8 | 4164 | 4132 | 4119 | 4182 | 2121 | 0082 | 8200 |
| D0006 | D0814 | D1622 | D2430 | D3238 | D4046 | D4854 | D5662 | CB 17 | CB 9F |
| 3025 | 309C | 304E | 3027 | 309D | 30C0 | 3060 | C0C0 | 000C | 0C00 |
| D0405 | D1213 | D2021 | D2829 | D3637 | D4445 | D5253 | D6061 | CB 23 | CB AB |
| 28B9 | 28D2 | 2869 | 28BA | 285D | 28A0 | 2850 | 4848 | 0014 | 1400 |
| D0305 | D1113 | D1921 | D2729 | D3537 | D4345 | D5153 | D5961 | CB 24 | CB AC |
| 24F7 | 24F5 | 24F4 | 247A | 243D | 2490 | 2448 | 4444 | 0024 | 2400 |
| D0205 | D1013 | D1821 | D2629 | D3437 | D4245 | D5053 | D5861 | CB 25 | CB AD |
| 22D0 | 2268 | 2234 | 221A | 220D | 2288 | 2244 | 4242 | 0044 | 4400 |
| D0105 | D0913 | D1721 | D2529 | D3337 | D4145 | D4953 | D5761 | CB 26 | CB AE |
| 214D | 21A8 | 2154 | 212A | 2115 | 2184 | 2142 | 4141 | 0084 | 8400 |
| D0005 | D0813 | D1621 | D2429 | D3237 | D4045 | D4853 | D5661 | CB 27 | CB AF |
| 189C | 184E | 1827 | 189D | 18C0 | 1860 | 1830 | 8888 | 0018 | 1B00 |
| D0304 | D1112 | D1920 | D2728 | D3536 | D4344 | D5152 | D5960 | CB 34 | CB BC |
| 14D2 | 1469 | 14BA | 145D | 14A0 | 1450 | 1428 | 8484 | 0028 | 2800 |
| D0204 | D1012 | D1820 | D2628 | D3436 | D4244 | D5052 | D5860 | CB 35 | CB BD |
| 12F5 | 12F4 | 127A | 123D | 1290 | 1248 | 1224 | 8282 | 0048 | 4800 |
| D0104 | D0912 | D1720 | D2528 | D3336 | D4144 | D4952 | D5760 | CB 36 | CB BE |
| 1168 | 1134 | 111A | 110D | 1188 | 1144 | 1122 | 8181 | 0088 | 8800 |
| D0004 | D0812 | D1620 | D2428 | D3236 D4044 | D4852 | D5660 | CB 37 | CB BF | |
| 0C4E | 0C27 | 0C9D | 0CC0 | 0C60 | 0C30 | 0C18 | 0C0C | 0030 | 3000 |
| D0203 | D1011 | D1819 | D2627 | D3435 | D4243 | D5051 | D5859 | CB 45 | CB CD |
| 0A69 | 0ABA | 0A5D | 0AA0 | 0A50 | 0A28 | 0A14 | 0A0A | 0050 | 5000 |
| D0103 | D0911 | D1719 | D2527 | D3335 | D4143 | D4951 | D5759 | CB 46 | CB CE |
| 09F4 | 097A | 093D | 0990 | 0948 | 0924 | 0912 | 0909 | 0090 | 9000 |
| D0003 | D0811 | D1619 | D2427 | D3235 | D4043 | D4851 | D5659 | CB 47 | CB CF |
| 0627 | 069D | 06C0 | 0660 | 0630 | 0618 | 060C | 0606 | 0060 | 60 00 |
| D0102 | D0910 | D1718 | D2526 | D3334 | D4142 | D4950 | D5758 | CB 56 | CB DE |
| 05BA | 055D | 05A0 | 0550 | 0528 | 0514 | 050A | 0505 | 00A0 | A000 |
| D0002 | D0810 | D1618 | D2426 | D3234 | D4042 | D4850 | D5658 | CB 57 | CB DF |
| 039D | 03C0 | 0360 | 0330 | 0318 | 030C | 0306 | 0303 | 00C0 | C000 |
| D0001 | D0809 | D1617 | D2425 | D3233 | D4041 | D4849 | D5657 | CB 67 | CB EF |

Syndrome code and position for any combination of 3 bits within the same byte

| Byte 0 | Byte 1 | Byte 2 | Byte 3 | Byte 4 | Byte 5 | Byte 6 | Byte 7 | Byte 8 | Byte 9 |
|---|---|---|---|---|---|---|---|---|---|
| E059 | E0A2 | E051 | E0A6 | E053 | E0A7 | E0DD | 7070 | 0007 | 0700 |
| D0506 07 | D1314 15 | D2122 23 | D29.30 31 | D3738 39 | D4546 47 | D5354 55 | D6162 63 | CB 012 | CB 89A |
| D01C | D03E | D01F | D081 | D0CE | D067 | D0BD | B0B0 | C00B | CB00 |
| D0406 07 | D1214 15 | D2022 23 | D2830 31 | D3638 39 | D4446 47 | D5254 55 | D6062 63 | CB 013 | CB 89B |
| C8E0 | C870 | C838 | C81C | C80E | C807 | CB8D | 3838 | 0013 | 1300 |
| D0306 07 | D1114 15 | D1922 23 | D2730 31 | D3538 39 | D4346 47 | D5154 55 | D5962 63 | CB 014 | CB 89C |
| C4AE | C457 | C4A5 | C4DC | C46E | C437 | C495 | 3434 | 0023 | 2300 |
| D0206 07 | D1014 15 | D1822 23 | D2630 31 | D3438 39 | D4246 47 | D5054 55 | D5862 63 | CB 015 | CB 89D |
| C289 | C2CA | C265 | C2BC | C25E | C22F | C299 | 3232 | 0043 | 4300 |
| D0106 07 | D0914 15 | D1722 23 | D2530 31 | D3338 39 | D4146 47 | D4954 55 | D5762 63 | CB 016 | CB 89E |
| C114 | C10A | C105 | C18C | C146 | C123 | C19F | 3131 | 0083 | 8300 |
| D0006 07 | D0814 15 | D1622 23 | D2430 31 | D3238 39 | D4046 47 | D4854 55 | D5662 63 | CB 017 | CB 89F |
| B036 | B01B | B083 | B0CF | B0E9 | B0FA | B07D | D0D0 | 000D | 0D00 |
| D0405 07 | D1213 15 | D2021 23 | D2829 31 | D3637 39 | D4445 47 | D5253 55 | D6061 63 | CB 023 | CB 8AB |
| ABAA | AB55 | A8A4 | AB52 | AB29 | A89A | AB4D | 5858 | 0015 | 1500 |
| D0305 07 | D1113 15 | D1921 23 | D2729 31 | D3537 39 | D4345 47 | D5153 55 | D5961 63 | CB 024 | CB 8AC |
| A4E4 | A472 | A439 | A492 | A449 | A4AA | A455 | 5454 | 0025 | 2500 |
| D0205 07 | D1013 15 | D1821 23 | D2629 31 | D3437 39 | D4245 47 | D5053 55 | D5861 63 | CB 025 | CB 8AD |
| A2C3 | A2EF | A2F9 | A2F2 | A279 | A2B2 | A259 | 5252 | 0045 | 4500 |
| D0105 07 | D0913 15 | D1721 23 | D2529 31 | D3337 39 | D4145 47 | D4953 55 | D5761 63 | CB 026 | CB 8AE |
| A15E | A12F | A199 | A1C2 | A161 | A1BE | A15F | 5151 | 0085 | 8500 |
| D0005 07 | b0813 15 | D1621 23 | D2429 31 | D3237 39 | D4045 47 | D4853 55 | D5661 63 | CB 027 | CB 8AF |
| 988F | 98C9 | 98EA | 9875 | 98B4 | 985A | 982D | 9898 | 0019 | 1900 |

-continued

| Byte 0 | Byte 1 | Byte 2 | Byte 3 | Byte 4 | Byte 5 | Byte 6 | Byte 7 | Byte 8 | Byte 9 |
|---|---|---|---|---|---|---|---|---|---|
| D0304 07 | D1112 15 | D1920 23 | D2728 31 | D3536 39 | D4344 47 | D5152 55 | D5960 63 | CB 034 | CB 8BC |
| 94C1 | 94EE | 9477 | 94B5 | 94D4 | 946A | 9435 | 9494 | C029 | 29C0 |
| D0204 07 | D1012 15 | D1820 23 | D2628 31 | D3436 39 | D4244 47 | D5052 55 | D5860 63 | CB 035 | CB 8BD |
| 92E6 | 9273 | 92B7 | 92D5 | 92E4 | 9272 | 9239 | 9292 | 0049 | 4900 |
| D0104 07 | D0912 15 | D1720 23 | D2528 31 | D3336 39 | D4144 47 | D4952 55 | D5760 63 | CB 036 | CB 8BE |
| 917B | 913 | 91D7 | 91E5 | 91FC | 917E | 913F | 9191 | 0089 | 5900 |
| D0004 07 | D0812 15 | D1G20 23 | D2428 31 | D3236 39 | D4044 47 | D4B52 55 | D5GG0 63 | CB 037 | CB 8BF |
| BC5D | 8CA0 | 8C50 | 8C28 | 8C14 | 8C0A | 8C05 | 1C1C | 0031 | 3100 |
| D0203 07 | D1011 15 | D1819 23 | D2627 31 | D3435 39 | D4243 47 | D5051 55 | D5859 63 | CB 045 | CB BCD |
| BA7A | BA3D | A90 | 8A48 | 8A24 | 8A12 | 8A09 | 1A1A | 0051 | 5100 |
| D0103 07 | D0911 15 | D1719 23 | D2527 31 | D3335 39 | D4143 47 | D4951 55 | D5759 63 | CB 046 | CB 8CE |
| 89E7 | 89FD | 89F0 | 8978 | 893C | 891E | 890F | 1919 | 0091 | 9100 |
| D0003 07 | D0811 15 | D1619 23 | D2427 31 | D3235 39 | D4043 47 | D4851 55 | D5659 63 | CB 047 | CB 8CF |
| 8634 | 861A | 860D | 8 88 | 8644 | 8622 | 8611 | 1E16 | 0061 | 6100 |
| D0102 07 | D0910 15 | D1718 23 | D2526 31 | D3334 39 | D4142 47 | D4950 55 | D5758 63 | CB 056 | CB 8DE |
| 85A9 | 65DA | 856D | 85BB | 855C | 852E | 8517 | 1515 | 00A1 | A100 |
| D0002 07 | D0510 15 | D1G1B 23 | D2426 31 | D3234 39 | D4042 47 | D4550 55 | D5658 | CB 057 | CB 8DF |
| 836E | 8347 | B3AD | 83D8 | 836C | 833 | 831B | 1313 | 00C1 | C100 |
| D0001 07 | D0609 15 | D1617 23 | D2425 31 | D3233 39 | D4041 47 | D4849 55 | D5657 63 | CB 067 | CB 8EF |
| 70A2 | 7051 | 70A6 | 7053 | 70A7 | 70DD | 70E0 | E0E0 | 000E | 0E00 |
| D0405 06 | D1213 14 | D2021 22 | D2829 30 | D3637 38 | D4445 46 | D5253 54 | D6061 62 | CB 123 | CB 9AB |
| 683E | 681F | 6881 | 68CE | 6867 | 68BD | 68D0 | 6868 | 0016 | 1600 |
| D0305 06 | D1113 14 | D1921 22 | D2729 30 | D3537 38 | D4345 46 | D5153 54 | D5961 62 | CB 124 | CB 9AC |
| 6470 | 6438 | 641C | 640E | 6407 | 648D | 64C8 | 6464 | 0026 | 2600 |
| D0205 06 | D1013 14 | D1821 22 | D2629 30 | D3437 38 | D4245 46 | D5053 54 | D5BE1 62 | CB 125 | CB 9AD |
| 6257 | 62A5 | E2DC | 626E | 6237 | 6295 | 62C4 | 6262 | 0046 | 4600 |
| D0105 06 | D0913 14 | D1721 22 | D2529 30 | D3337 38 | D4145 46 | D4953 54 | D5761 62 | CB 12E | CB 9AE |
| 61CA | 6165 | 61BC | 615E | 612F | 6199 | 61C2 | 6161 | 0086 | 8600 |
| D0005 06 | D0813 14 | D1621 22 | D2429 30 | D3237 38 | D4045 46 | D4853 54 | D5GG1 62 | CB 127 | CB 9AF |
| 581B | 5B83 | 58CF | 58E9 | 58FA | 587D | 58B0 | A8A8 | 001A | 1A00 |
| D0304 06 | D1112 14 | D1920 22 | D2728 30 | D3536 38 | D4344 46 | D5152 54 | D5960 62 | CB 134 | CB 9BC |
| 5455 | 54A4 | 5452 | 5429 | 549A | 544D | 54AB | A4A4 | 002A | 2A00 |
| D0204 0G | D1012 14 | D1820 22 | D2628 30 | D3436 38 | D4244 46 | D5052 54 | D5860 62 | CB 135 | CB 9BD |
| 5272 | 5239 | 5292 | 5249 | 52AA | 5255 | 52A4 | A2A2 | 004A | 4A00 |
| D0104 06 | D0912 14 | D1720 22 | D2528 30 | D3336 38 | D4144 46 | D4952 54 | D5760 62 | CB 136 | CB 9BE |
| 51EF | 51F9 | 51F2 | 5179 | 51B2 | 5159 | 51A2 | A1A1 | 008A | 8A00 |
| D0004 06 | D0812 14 | D1620 22 | D2428 20 | D3236 38 | D4044 46 | D4852 54 | D5660 62 | CB 137 | CB 9BF |
| 4CC9 | 4CEA | 4C75 | 4CB4 | 4C5A | 4C2D | 4C98 | 2C2C | 0032 | 3200 |
| D0203 06 | D1011 14 | D1819 22 | D2627 30 | D3435 38 | D4243 46 | D5051 54 | D5859 62 | CB 145 | CB 9CD |
| 4AEE | 4A77 | 4AB5 | 4AD4 | 4A6A | 4A35 | 4A94 | 2A2A | 0052 | 5200 |
| D0103 06 | D0911 14 | D1719 22 | D2527 30 | D3335 38 | D4143 46 | D4951 54 | D5759 62 | CB 146 | CB 9CE |
| 4973 | 49B7 | 49D5 | 49E4 | 4972 | 4939 | 4992 | 2929 | 0092 | 9200 |
| D0003 06 | D0811 14 | D1619 22 | D2427 30 | D3235 38 | D4043 46 | D4851 54 | D5659 62 | CB 147 | CB 9CF |
| 46A0 | 4650 | 4628 | 4614 | 460A | 4605 | 468C | 2626 | 0062 | 6200 |
| D0102 06 | D0910 14 | D1718 22 | D2526 30 | D3334 38 | D4142 46 | D4950 54 | D5758 62 | CB 156 | CB 9DE |
| 453D | 4590 | 4548 | 4524 | 4512 | 4509 | 458A | 2525 | 00A2 | A200 |
| D0002 06 | D0810 14 | D1618 22 | D2426 30 | D3234 D4042 38 | D4850 46 | D5658 54 | CB 157 62 | CB 9DF | |
| 431A | 430D | 4388 | 4344 | 4322 | 4311 | 4386 | 2323 | 00C2 | C200 |
| D0001 06 | D0809 14 | D1617 22 | D2425 30 | D3233 38 | D4041 46 | D4849 54 | D5657 62 | CB 167 | CB 9EF |
| 3851 | 38A6 | 3853 | 38A7 | 38DD | 38E0 | 3870 | C8C8 | 001C | 1C00 |
| D0304 05 | D1112 13 | D1920 21 | D2728 29 | D3536 37 | D4344 45 | D5152 53 | D5960 61 | CB 234 | CB ABC |

-continued

| Byte 0 | Byte 1 | Byte 2 | Byte 3 | Byte 4 | Byte 5 | Byte 6 | Byte 7 | Byte 8 | Byte 9 |
|---|---|---|---|---|---|---|---|---|---|
| 341F | 3481 | 34CE | 3467 | 34BD | 34D0 | 3468 | C4C4 | 002C | 2C00 |
| D0204 | D1012 | D1820 | D2628 | D3436 | D4244 | D5052 | D5860 | CB 235 | CB ABD |
| 05 | 13 | 21 | 29 | 37 | 45 | 53 | 61 | | |
| 3238 | 321C | 320E | 3207 | 328D | 32C8 | 3264 | C2C2 | 004C | 4C00 |
| D0104 | D0912 | D1720 | D2528 | D3336 | D4144 | D4952 | D5760 | CB 236 | CB ABE |
| 05 | 13 | 21 | 29 | 37 | 45 | 53 | 61 | | |
| 31A5 | 31DC | 316E | 3137 | 3195 | 31C4 | 3162 | C1C1 | 008C | 8C00 |
| D000 405 | D0812 13 | D1620 21 | D2428 29 | D3236 37 | D4044 45 | D4852 53 | D5660 61 | CB 237 | CB ABF |
| 2C83 | 2CCF | 2CE9 | 2CFA | 2C7D | 2CB0 | 2C58 | 4C4C | 0034 | 3400 |
| D0203 | D1011 | D1819 | D2627 | D3435 | D4243 | D5051 | D5859 | CB 245 | CB ACD |
| 05 | 13 | 21 | 29 | 37 | 45 | 53 | 61 | | |
| 2AA4 | 2A52 | 2A29 | 2A9A | 2A4D | 2AA8 | 2A54 | 4A4A | 0054 | 5400 |
| D0103 | D0911 | D1719 | D2527 | D3335 | D4143 | D4951 | D5759 | CB 246 | CB ACE |
| 05 | 13 | 21 | 29 | 37 | 45 | 53 | 61 | | |
| 2939 | 2992 | 2949 | 29AA | 2955 | 29A4 | 2952 | 4949 | 0094 | 9400 |
| D0003 | D0811 | D1619 D2427 | D3235 | D404 | D4851 | D5659 | CB 247 | CB ACF | |
| 05 | 13 | 21 | 29 | 37 | 45 | 53 | 61 | | |
| 26EA | 2675 | 26B4 | 265A | 262D | 2698 | 264C | 4646 | 0064 | 6400 |
| D0102 | D0910 | D1718 | D2526 | D3334 | D4142 | D4950 | D5758 | CB 256 | CB ADE |
| 05 | 13 | 21 | 29 | 37 | 45 | 53 | 61 | | |
| 2577 | 25B5 | 25D4 | 256A | 2535 | 2594 | 254A | 4545 | 00A4 | A400 |
| D0002 | D0810 | D1618 | D2426 | D3234 | D4042 | D4850 | D5658 | CB 257 | CB ADF |
| 05 | 13 | 21 | 29 | 37 | 45 | 53 | 61 | | |
| 2350 | 2328 | 2314 | 230A | 2305 | 238C | 2346 | 4343 | 00C4 | C400 |
| D0001 | D0809 | D1617 | D2425 | D3233 | D4041 | D4849 | D5657 | CB 267 | CB AEF |
| 05 | 13 | 21 | 29 | 37 | 45 | 53 | 61 | | |
| 1CA6 | 1C53 | 1CA7 | 1CDD | 1CE0 | 1C70 | 1C38 | 8C8C | 0038 | 3800 |
| D0203 | D1011 | D1819 | D2627 | D3435 | D4243 | D5051 | D5859 | CB 345 | CB BCD |
| 04 | 12 | 20 | 28 | 36 | 44 | 52 | 60 | | |
| 1A81 | 1ACE | 1A67 | 1ABD | 1AD0 | 1A68 | 1A34 | 8ABA | 0058 | 5800 |
| D0103 | D0911 | D1719 | D2527 | D3335 | D4143 | D4951 | D5759 | CB 346 | CB BCE |
| 04 | 12 | 20 | 28 | 36 | 44 | 52 | 60 | | |
| 191C | 190E | 1907 | 198D | 19C8 | 1964 | 1932 | 8989 | 0098 | 9800 |
| D0003 | D0811 | D1619 | D2427 | D3235 | D4043 | D4851 | D5659 | CB 347 | CB BCF |
| 04 | 12 | 20 | 28 | 36 | 44 | 52 | 6C | | |
| 16CF | 16E9 | 16FA | 167D | 16B0 | 1658 | 162C | 8686 | 0068 | 6800 |
| D0102 | D0910 | D1718 | D2526 | D3334 | D4142 | D4950 | D5758 | CB 356 | CB BDE |
| 04 | 12 | 20 | 28 | 36 | 44 | 52 | 60 | | |
| 1552 | 1529 | 159A | 154D | 15AB | 1554 | 152A | 8585 | 00A8 | AB00 |
| D0002 | D0810 | D1618 | D2426 | D3234 | D4042 | D4850 | D5658 | CB 357 CB BDF | |
| 04 | 12 | 20 | 28 | 36 | 44 | 52 | 60 | | |
| 1375 | 13B4 | 135A | 132D | 1398 | 134C | 1326 | 8383 | 00C8 | C800 |
| D0001 | D0809 | D1617 | D2425 | D3233 | D4041 | D4849 | D5657 | CB 367 | CB BEF |
| 04 | 12 | 20 | 28 | 36 | 44 | 52 | 60 | | |
| 0E53 | 0EA7 | 0EDD | 0EE0 | 0E70 | 0E38 | 0E1C | 0E0E | 0070 | 7000 |
| D0102 | D0910 | D1718 | D2526 | D3334 | D4142 | D4950 | D5758 | CB 456 | CB CDE |
| 03 | 11 | 19 | 27 | 35 | 43 | 51 | 59 | | |
| 0DCE | 0D67 | 0DBD | CDDC | 0D68 | 0D34 | 0D1A | 0DCD | 00B0 | B000 |
| D0002 | D0810 | D1618 | D2426 | D3234 | D4042 | D4850 | D5658 | CB 457 | CB CDF |
| 03 | 11 | 19 | 27 | 35 | 43 | 51 | 59 | | |
| 0BE9 | 0BFA | 0B7D | 0BB0 | 0B58 | 0B2C | 0B16 | 0B0B | 0CD0 | DC00 |
| D0001 | D0809 | D1617 | D2425 | D3233 | D4041 | D4849 | D5657 | CB 467 | CB CEF |
| 03 | 11 | 19 | 27 | 35 | 43 | 51 | 59 | | |
| 07A7 | 07DD | 07E0 | 0770 | 0738 | 071C | 070E | 0707 | 00E0 | E000 |
| D0001 | D0809 | D1617 | D2425 | D3233 | D4041 | D4849 | D5657 | CB 567 | CB DEF |
| 02 | 10 | 18 | 26 | 34 | 42 | 50 | 58 | | |
| Syndrome code and position for any combination of 4 bits within the same byte | | | | | | | | | |
| F0B1 | F0D6 | F06B | F0BB | F0D3 | F0E7 | F0FD | F0F0 | 000F | 0F00 |
| D0405 | D1213 | D2021 | D2829 | D3637 | D4445 | D5253 | D6061 | CB 0123 | CB 89AB |
| 0607 | 1415 | 2223 | 3031 | 3839 | 4647 | 5455 | 6263 | | |
| E82D | E898 | E84C | E826 | E813 | E887 | E8CD | 7878 | 0017 | 1700 |
| D0305 | D1113 | D1921 | D2729 | D3537 | D4345 | D5153 | D5961 | CB 0124 | CB 89AC |
| 0607 | 1415 | 2223 | 3031 | 3839 | 4647 | 5455 | 6263 | | |
| E463 | E4BF | E4D1 | E4E6 | E473 | E4B7 | E4D5 | 7474 | C027 | 2700 |
| D0205 | D1013 | D1821 | D2629 | D3437 | D4245 | D5053 | D5861 | CB 0125 | CB 89AD |
| 0607 | 1415 | 2223 | 3031 | 3839 | 4647 | 5455 | 6263 | | |
| E244 | E222 | E211 | E286 | E243 | E2AF | E2D9 | 7272 | 0047 | 4700 |
| D0105 | D0913 | D1721 | D2529 | D3337 | D4145 | D4953 | D5761 | CB C126 | CB 89AE |
| 0607 | 1415 | 2223 | 3031 | 3839 | 4647 | 5455 | 6263 | | |
| E1D9 | E1E2 | E171 | E1B6 | E15B | E1A3 | E1DF | 7171 | 0087 | 8700 |
| D0005 | D0813 | D1621 | D2429 | D3237 | D4045 | D4853 | D5661 | CB 0127 | CB 89AF |
| 0607 | 1415 | 2223 | 3031 | 3839 | 4647 | 5455 | 6263 | | |
| D808 | D804 | D802 | D801 | D88E | D847 | D8AD | B8B8 | 001B | 1B00 |
| DC3C4 | D1112 | D1920 | D2728 | D3536 | D4344 | D5152 | D5960 | CB 0134 | CB B9BC |
| 0607 | 1415 | 2223 | 3031 | 3839 | 4647 | 5455 | 6263 | | |

-continued

| Byte 0 | Byte 1 | Byte 2 | Byte 3 | Byte 4 | Byte 5 | Byte 6 | Byte 7 | Byte 8 | Byte 9 |
|---|---|---|---|---|---|---|---|---|---|
| D446 | D423 | D49F | D4C1 | D4EE | D477 | D4B5 | B4B4 | 002B | 2B00 |
| D0204 | D1C12 | D182C | D2628 | D3436 | D4244 | D5052 | D5860 | CB 0135 | CB 89BD |
| 0607 | 1415 | 2223 | 3031 | 3839 | 4647 | 5455 | 6263 | | |
| D261 | D2BE | D25F | D2A1 | D2DE | D26F | D2B9 | B2B2 | 004B | 4B00 |
| D0104 | DC912 | D1720 | D2528 | D3336 | D4144 | D4952 | D5760 | CB 0136 | CB 89BE |
| 0607 | 1415 | 2223 | 3C31 | 3839 | 4647 | 5455 | 6263 | | |
| D1FC | D17E | D13F | D191 | D1C6 | D163 | D1BF | B1B1 | 008B | 8B00 |
| D00C4 | DC812 | D1620 | D2428 | D3236 | D4C44 | D4852 | D5660 | CB C137 | CB 89BF |
| 0607 | 1415 | 2223 | 3031 | 3839 | 4647 | 5455 | 6263 | | |
| CCDA | CC6D | CCB8 | CC5C | CC2E | CC17 | CC85 | 3C3C | 0033 | 3300 |
| D02C3 | D1C11 | D1819 | D2627 | D3435 | D4243 | D5C51 | D5859 | CB 0145 | CB 89CD |
| 0607 | 1415 | 2223 | 3031 | 3839 | 4647 | 5455 | 6263 | | |
| CAFD | CAF0 | CA78 | CA3C | CA1E | CA0F | CA89 | 3A3A | 0053 | 5300 |
| D0103 | D0911 | D17192 | D2527 | D3335 | D4143 | D4951 | D5759 | CB 0146 | CB 89CE |
| 0607 | 1415 | 223 | 3031 | 3839 | 4647 | 5455 | 6263 | | |
| C960 | C930 | C918 | C900 | C906 | C903 | C98F | 3939 | 0093 | 9300 |
| D0003 | D0811 | D1619 | D2427 | D3235 | D4043 | D4851 | D5659 | CB 0147 | CB 89CF |
| 0607 | 1415 | 2223 | 3031 | 3839 | 4647 | 5455 | 6263 | | |
| C6B3 | C6D7 | C6E5 | C6FC | C67E | C63F | C691 | 3636 | 0063 | 6300 |
| D0102 | D0910 | D1718 | D2526 | D3334 | D4142 | D4950 | D5758 | CB 0156 | CB 89DE |
| 0607 | 1415 | 2223 | 3031 | 3839 | 4647 | 5455 | 6263 | | |
| C52E | C517 | C585 | C500 | C566 | C533 | C597 | 3535 | 00A3 | A300 |
| D0002 | D0810 | D1618 | D2426 | D3234 | D4042 | D4850 | D5658 | CB 0157 | CB 89DF |
| 0607 | 1415 | 2223 | 3031 | 3839 | 4647 | 5455 | 6263 | | |
| C309 | C38A | C345 | C3AC | C356 | C32B | C39B | 3333 | 00C3 | C300 |
| D0001 | D0809 | D1617 | D2425 | D3233 | D4041 | D4849 | D5657 | CB C167 | CB 89EF |
| 0607 | 1415 | 2223 | 3031 | 3839 | 4647 | 5455 | 6263 | | |
| B842 | B821 | B89E | B84F | B8A9 | B8DA | B86D | D8D8 | 001D | 1D00 |
| DC304 | D1112 | D1920 | D2728 | D3536 | D4344 | D5152 | D5960 | CB C234 | CB 8ABC |
| 0507 | 1315 | 2123 | 2931 | 3739 | 4547 | 5355 | 6163 | | |
| B40C | B406 | B403 | B48F | B4C9 | B4EA | B475 | D4D4 | 002D | 2D00 |
| D0204 | D1012 | D1820 | D2628 | D3436 | D4244 | D5C52 | D5860 | CB C235 | CB 8ABD |
| 0507 | 1315 | 2123 | 2931 | 3739 | 4547 | 5355 | 6163 | | |
| B22B | B29B | B2C3 | B2EF | B2F9 | B2F2 | B279 | D2D2 | 004D | 4D00 |
| D0104 | D0912 | D1720 | D252B | D3336 | D4144 | D4952 | D5760 | CB C236 | CB BABE |
| 0507 | 1315 | 2123 | 2931 | 3739 | 4547 | 5355 | 6163 | | |
| B1B6 | B15B | B1A3 | B1DF | B1E1 | B1FE | B17F | D1D1 | 008D | 8D00 |
| D0004 | D0812 | D1620 | D2428 | D3236 | D4044 | D4852 | D5660 | CB C237 | CB 8ABF |
| 0507 | 1315 | 2123 | 2931 | 3739 | 4547 | 5355 | 6163 | | |
| AC90 | AC48 | AC24 | AC12 | AC09 | AC8A | AC45 | 5C5C | 0035 | 3500 |
| D0203 | D1011 | D1819 | D2627 | D3435 | D4243 | D5051 | D5859 | CB 0245 | CB 8ACD |
| 0507 | 1315 | 2123 | 2931 | 3739 | 4547 | 5355 | 6163 | | |
| AAB7 | AAD5 | AAE4 | AA72 | AA39 | AA92 | AA49 | 5A5A | 0055 | 5500 |
| D0103 | D0911 | D1719 | D2527 | D3335 | D4143 | D4951 | D5759 | CB 0246 | CB 8ACE |
| 0507 | 1315 | 2123 | 2931 | 3739 | 4547 | 5355 | 6163 | | |
| A92A | A915 | A984 | A942 | A921 | A99E | A94F | 5959 | 0095 | 9500 |
| D0003 | D0B11 | D1619 | D2427 | D3235 | D4043 | D4851 | D5659 | CB 0247 | CB 8ACF |
| 0507 | 1315 | 2123 | 2931 | 3739 | 4547 | 5355 | 6163 | | |
| A6F9 | A6F2 | A679 | A6B2 | A659 | A6A2 | AG51 | 5656 | 0065 | 6500 |
| D0102 | D0910 | D1718 | D2526 | D3334 | D4142 | D4950 | D5758 | CB 0256 | CB 8ADE |
| 0507 | 1315 | 2123 | 2931 | 3739 | 4547 | 5355 | 1G3 | | |
| A564 | A532 | A519 | A582 | A541 | A5AE | A557 | 5555 | 00A5 | A500 |
| D0002 | D0810 | D1616 | D2426 | D3234 | D4042 | D4850 | D5658 | CB 0257 | CB 8ADF |
| 0507 | 1315 | 2123 | 2931 | 3739 | 4547 | 5355 | 1G3 | | |
| A343 | A3AF | A3D9 | A3E2 | A371 | A3B6 | A35B | 5353 | 00C5 | C500 |
| D0001 | D0809 | D1617 | D2425 | D3233 | D4041 | D4849 | D5657 | CB 0267 | CB 8AEF |
| 0507 | 1315 | 2123 | 2931 | 3739 | 4547 | 5355 | 6163 | | |
| 9CB5 | 9CD4 | 9C6A | 9C35 | 9C94 | 9C4A | 9C25 | 9C9C | 0039 | 3900 |
| D0203 | D1011 | D1619 | D2627 | D3435 | D4243 | D5051 | D5B59 | CB 0345 | CB 8BCD |
| 0407 | 1215 | 2023 | 2831 | 3639 | 4447 | 5255 | 6063 | | |
| 9A92 | 9A49 | 9AAA | 9A55 | 9AA4 | 9A52 | 9A29 | 9A9A | 0059 | 5900 |
| D0103 | D0911 | D1719 | D2527 | D3335 | D4143 | D4951 | D5759 | CB 0346 | CB 8BCE |
| 0407 | 1215 | 2023 | 2831 | 3639 | 4447 | 5255 | 6063 | | |
| 990F | 9989 | 99CA | 9965 | 99B0 | 995E | 992F | 9999 | 0099 | 9900 |
| D0003 | D0511 | D1619 | D2427 | D3235 | D4C43 | D4851 | D5659 | CB 0347 | CB 8BCF |
| 0407 | 1215 | 2023 | 2831 | 3639 | 4447 | 5255 | 6063 | | |
| 9GDC | 966E | 9637 | 9695 | 96C4 | 9662 | 9631 | 9696 | 0069 | 6900 |
| D0102 | D0910 | D1718 | D2526 | D3334 | D4142 | D4950 | D5758 | CB 0356 | CB BBDE |
| 0407 | 1215 | 2023 | 2831 | 3639 | 4447 | 5255 | 6063 | | |
| 9541 | 95A | 9557 | 95A5 | 95DC | 956E | 9537 | 9595 | 00A9 | A900 |
| D0002 | D0B10 | D161B | D2426 | D3234 | D4042 | D4850 | D5656 | CB 0357 | CB 8BDF |
| 0407 | 1215 | 2023 | 2831 | 3639 | 4447 | 5255 | 6063 | | |
| 9366 | 9333 | 9397 | 93C5 | 93EC | 9376 | 933B | 9393 | 00C9 | C900 |
| D0001 | D0809 | D1617 | D2425 | D3233 | D4041 | D4849 | D5657 | CB 0367 | CB 8BEF |
| 0407 | 1215 | 2023 | 2B31 | 3639 | 4447 | 5255 | 6063 | | |
| 8E40 | 8E20 | BE10 | 8E08 | 8E04 | 8E02 | 6E01 | 1E1E | 0071 | 7100 |
| D0102 | D0910 | D1718 | D2526 | D3334 | D4142 | D4950 | D5758 | CB 045 | CB BCDE |
| 0307 | 1115 | 1923 | 2731 | 3539 | 4347 | 5155 | 5693 | | |

-continued

| Byte 0 | Byte 1 | Byte 2 | Byte 3 | Byte 4 | Byte 5 | Byte 6 | Byte 7 | Byte 8 | Byte 9 |
|---|---|---|---|---|---|---|---|---|---|
| 8DDD | 8DE0 | 8D70 | 8D38 | 6D10 | 6D0E | 8D07 | 1D1D | 00B1 | B100 |
| D0002 | D0810 | D1618 | D2426 | D3234 | D4042 | D4850 | DBG58 | CB 0457 | CB BCDF |
| 0307 | 1115 | 1923 | 2731 | 3539 | 4347 | 5155 | 5963 | | |
| 8BFA | 8B7D | BBB0 | 8B58 | 8B20 | 6B16 | BB0B | 1B1B | 00D1 | D100 |
| D0001 | D0B09 | D1617 | D2425 | D3233 | D4041 | D4849 | D5657 | CB 0467 | CB 8CEF |
| 0307 | 1115 | 1923 | 2731 | 3539 | 4347 | 5155 | 5963 | | |
| 87B4 | 875A | 872D | 8798 | 8740 | B726 | 8713 | 1717 | 00E1 | E100 |
| D0001 | D0B09 | D1617 | D2425 | D3233 | D4041 | D4849 | D5E57 | CB 0567 | CB 8DEF |
| 0207 | 1015 | 1823 | 2631 | 3439 | 4247 | 5055 | 5863 | | |
| 78D6 | 786B | 78BB | 78D3 | 78E7 | 78FD | 78F0 | E8E8 | 001E | 1E00 |
| D0304 | D1112 | D1920 | D2728 | D3536 | D4344 | D5152 | D5960 | CB 1234 | CB 9AB0 |
| 0506 | 1314 | 2122 | 2930 | 3738 | 4546 | 5354 | 6162 | | |
| 7498 | 7440 | 7426 | 7413 | 7487 | 74CD | 74E8 | E4E4 | 002E | 2E00 |
| D0204 | D1012 | D1820 | D2628 | D3436 | D4244 | D5052 | D5860 | CB 1235 | CB 9ABD |
| 0506 | 1314 | 2122 | 2930 | 3738 | 4546 | 5354 | 6162 | | |
| 72BF | 72D1 | 72E6 | 7273 | 72B7 | 72D5 | 72E4 | E2E2 | 004E | 4E00 |
| D0104 | D0912 | D1720 | D2528 | D3336 | D4144 | D4952 | D5760 | CB 1236 | CB 9ABE |
| 0506 | 1314 | 2122 | 2930 | 3738 | 4546 | 5354 | 6162 | | |
| 7122 | 7111 | 7186 | 7143 | 71AF | 71D9 | 71E2 | E1E1 | 008E | 8E00 |
| D0004 | D0812 | D1620 | D2428 | D3236 | D4044 | D4852 | D5660 | CB 1237 | CB 9ABF |
| 0506 | 1314 | 2122 | 2930 | 3738 | 4546 | 5354 | 6162 | | |
| 6C04 | 6C02 | 6C01 | 6C8E | 6C47 | 6CAD | 6CD8 | 6C6C | 0036 | 3600 |
| D0203 | D1011 | D1819 | D2627 | D3435 | D4243 | D5051 | D5859 | CB 245 | CB 9ACD |
| 0506 | 1314 | 2122 | 2930 | 3738 | 4546 | 5354 | 6162 | | |
| 6A23 | 6A9F | 6AC1 | 6AEE | 6A77 | 6AB5 | 6AD4 | 6A6A | 0056 | 5600 |
| D0103 | D0911 | D1719 | D2527 | D3335 | D4143 | D4951 | D5759 | CB 1246 | CB 9ACE |
| 0506 | 1314 | 2122 | 2930 | 3738 | 4546 | 5354 | 6162 | | |
| 69BE | 695F | 69A1 | 69DE | 696F | 69B9 | 69D2 | 6969 | 0096 | 9600 |
| D0003 | D0811 | D1619 | D2427 | D3235 | D404 | D4851 | D5659 | CB 1247 | CB 9ACF |
| 0506 | 1314 | 2122 | 2930 | 3738 | 3546 | 5354 | 6162 | | |
| 666D | 66B8 | 6650 | 662E | 6617 | 6685 | 66CC | 6666 | 0066 | 6600 |
| D0102 | D0910 | D1718 | D2526 | D3334 | D4142 | D4950 | D5758 | CB 1256 | CB 9ADE |
| 0506 | 1314 | 2122 | 2930 | 3738 | 4546 | 5354 | 6162 | | |
| 65F0 | 6578 | 653C | 651E | 650F | 6589 | 65CA | 6565 | 00A6 | A600 |
| D0002 | D0810 | D1618 | D2426 | D3234 | D4042 | D4850 | D5658 | CB 1257 | CB 9ADF |
| 0506 | 1314 | 2122 | 2930 | 3738 | 4546 | 5354 | 6162 | | |
| 63D7 | 63E5 | 63F0 | 637E | 633F | 6391 | 63C6 | 6363 | 00C6 | C600 |
| D0001 | D0809 | D1617 | D2425 | D3233 | D4041 | D4849 | D5657 | CB 1267 | CB 9AEF |
| 0506 | 1314 | 2122 | 2930 | 3738 | 4546 | 5354 | 6162 | | |
| 5C21 | 5C9E | 5C4F | 5CA9 | 5CDA | 5C6D | 5CB8 | ACAC | 003A | 3A00 |
| D0203 | D1011 | D1819 | D2627 | D3435 | D4243 | D5051 | D5859 | CB 1345 | CB 9BCD |
| 0406 | 1214 | 2022 | 2830 | 3638 | 4446 | 5254 | 6062 | | |
| 5A06 | EA03 | 5ABF | 5AC9 | 5AEA | 5A75 | 5AB4 | AAAA | 005A | 5A00 |
| D0103 | D0911 | D1719 | D2527 | D3335 | D4143 | D4951 | D5759 | CB 1346 | CB 9BCE |
| 0406 | 1214 | 2022 | 2830 | 3638 | 4446 | 5254 | 6062 | | |
| 599B | 59C3 | 59EF | 59F9 | 59F2 | 5979 | 59B2 | A9A9 | 009A | 9A00 |
| D0003 | D0811 | D1619 | D2427 | D3235 | D4043 | D4851 | D5659 | CB 1347 | CB 9BCF |
| 0406 | 1214 | 2022 | 2830 | 3638 | 4446 | 5254 | 6062 | | |
| 5648 | 5624 | 5612 | 5609 | 56EA | 5645 | 56A0 | A6A6 | 006A | 6A00 |
| D0102 | D0910 | D1718 | D2526 | D3334 | D4142 | D4950 | D5758 | CB 1356 | CB 9BDE |
| 0406 | 1214 | 2022 | 2830 | 3638 | 4446 | 5254 | 6062 | | |
| 55D5 | 55E4 | 5572 | 5539 | 5592 | 5549 | 55AA | A5A5 | 00AA | AA00 |
| D0002 | D0810 | D1618 | D2426 | D3234 | D4042 | D4850 | D5658 | CB 1357 | CB 9BDF |
| 0406 | 1214 | 2022 | 2830 | 3638 | 4446 | 5254 | 6062 | | |
| 53F2 | 5379 | 53B2 | 5359 | 53A2 | 5351 | 53A6 | A3A3 | 000A | CA00 |
| D0001 | D0809 | D1617 | D2425 | D3233 | D4041 | D4849 | D5657 | CB 1367 | CB 9BEF |
| 0406 | 1214 | 2022 | 2830 | 3638 | 4446 | 5254 | 6062 | | |
| 4ED4 | 4E6A | 4E35 | 4E94 | 4E4A | 4E25 | 4E90 | 2E2E | 0072 | 7200 |
| D0102 | D0910 | D1718 | D2526 | D3334 | D4142 | D4950 | D5758 | CB 1456 | CB 9CDE |
| 0306 | 1114 | 1922 | 2730 | 3538 | 4346 | 5154 | 5962 | | |
| 4D49 | 4DAA | 4D55 | 4DA4 | 4D52 | 4D29 | 4D9A | 2D2D | 00B2 | B200 |
| D0002 | D0810 | D1618 | D2426 | D3234 | D4042 | D4850 | D5658 | CB 1457 | CB 9CDF |
| 0306 | 1114 | 1922 | 2730 | 3538 | 4346 | 5154 | 5962 | | |
| 4B6E | 4B37 | 4B95 | 4BC4 | 4B62 | 4B31 | 4B96 | 2B2B | 00D2 | D200 |
| D0001 | D0809 | D1617 | D2425 | D3233 | D4041 | D4849 | D5657 | CB 1467 | CB 9CE |
| 0306 | 1114 | 1922 | 2730 | 3538 | 4346 | 5154 | 5962 | | |
| 4720 | 4710 | 4708 | A704 | 4702 | 4701 | 478E | 2727 | 00E2 | E200 |
| D0001 | D0809 | D1617 | D2425 | D3233 | D4041 | D4849 | D5657 | CB 1567 | CB 9DEF |
| 0206 | 1014 | 1822 | 2630 | 3438 | 4246 | 5054 | 5862 | | |
| 3C6B | 3CBB | 3CD3 | 3CE7 | 3CFD | 3CF0 | 3C78 | CCCC | 003C | 3C00 |
| D0203 | D1011 | D1819 | D2627 | D3435 | D4243 | D5051 | D5B59 | CB 2345 | CB ABCD |
| 0405 | 1213 | 2021 | 2629 | 3637 | 4445 | 5253 | 6061 | | |
| 3A4C | 3A26 | 3A13 | 3A87 | 3ACD | 3AE8 | 3A74 | CACA | 005C | 5C00 |
| D0103 | D0911 | D1719 | D2527 | D3335 | D4143 | D4951 | D5759 | CB 2346 | CB ABCE |
| 0405 | 1213 | 2021 | 2829 | 3637 | 4445 | 5253 | 6061 | | |
| 39D1 | 39E6 | 3973 | 39B7 | 39D5 | 39E4 | 3972 | C9C9 | 009C | 9C00 |
| D0003 | D0811 | D1619 | D2427 | D3235 | D4043 | D4851 | D5G59 | CB 2347 | CB ABCF |
| 0405 | 1213 | 2021 | 2829 | 3637 | 4445 | 5253 | 6061 | | |

-continued

| Byte 0 | Byte 1 | Byte 2 | Byte 3 | Byte 4 | Byte 5 | Byte 6 | Byte 7 | Byte 8 | Byte 9 |
|---|---|---|---|---|---|---|---|---|---|
| 3602 | 3601 | 368E | 3647 | 36AD | 36D8 | 3660 | C6C6 | 006C | 6C00 |
| D0102 | D0910 | D1718 | D2526 | D3334 | D4142 | D4950 | D575 | CB 2356 | CB ABDE |
| 0405 | 1213 | 2021 | 2829 | 3637 | 4445 | 5253 | 6061 | | |
| 359F | 35C1 | 35EE | 3577 | 35B5 | 35D4 | 356A | C5C5 | 00AC | AC00 |
| D0002 | D0810 | D1618 | D2426 | D3234 | D4042 | D4850 | D5658 | CB 2357 | CB ABDF |
| 0405 | 1213 | 2021 | 2829 | 3637 | 4445 | 5253 | 6061 | | |
| 33B8 | 3350 | 332E | 3317 | 3385 | 3300 | 3366 | C3C3 | 00CC | CC00 |
| D0001 | D0809 | D1617 | D2425 | D3233 | D4041 | D4849 | D5G57 | CB 2367 | CB ABEF |
| 0405 | 1213 | 2021 | 2B29 | 3637 | 4445 | 5253 | 6061 | | |
| 2E9E | 2E4F | 2EA9 | 2EDA | 2E6D | 2EBB | 2E50 | 4E4E | 0074 | 7400 |
| D0102 | D0910 | D1718 | D2526 | D3334 | D4142 | D4950 | D5756 | CB 2456 | CB ACDE |
| 0305 | 1113 | 1921 | 2729 | 3537 | 4345 | 5153 | 5961 | | |
| 2D03 | 2D8F | 2DC9 | 2DEA | 2D75 | 2DB4 | 2D5A | 4D4D | 00B4 | B400 |
| D0002 | D0810 | D1618 | D2426 | D3234 | D4042 | D4850 | D5658 | CB 2457 | CB ACDF |
| 0305 | 1113 | 1921 | 2729 | 3537 | 4345 | 5153 | 5961 | | |
| 2B24 | 2B12 | 2B09 | 2B5A | 2B45 | 2BA0 | 2B56 | 4B4B | 00D4 | D400 |
| D0001 | D0809 | D1617 | D2425 | D3233 | D4041 | D4849 | D5657 | CB 2467 | CB ACEF |
| 0305 | 1113 | 1921 | 2729 | 3537 | 4345 | 5153 | 5961 | | |
| 276A | 2735 | 2794 | 274A | 2725 | 2790 | 274E | 4747 | 00E4 | E400 |
| D0001 | D0809 | D1617 | D2425 | D3233 | D4041 | D4849 | D5657 | CB 2567 | CB ADEF |
| 0205 | 1013 | 1821 | 2629 | 3437 | 4245 | 5053 | 5861 | | |
| 1EBB | 1ED3 | 1EE7 | 1EFD | 1EF0 | 1E78 | 1E3C | 8E8E | 0078 | 7600 |
| D0102 | D0910 | D1718 | D2526 | D3334 | D4142 | D4950 | D5758 | CB 3456 | CB BCDE |
| 0304 | 1112 | 1920 | 2726 | 3536 | 4344 | 5152 | 5960 | | |
| 1D26 | 1D13 | 1D67 | 1DCD | 1DE8 | 1D74 | 1D3A | BD8D | 00B8 | B800 |
| D0002 | D0610 | D1618 | D2426 | D3234 | D4042 | D4850 | D565B | CB 3457 | CB BCDF |
| 0304 | 1112 | 1920 | 2728 | 3536 | 4344 | 5152 | 5960 | | |
| 1B01 | 1BBE | 1B47 | 1BAD | 1BD8 | 1BG0 | 1B36 | BB8B | 00D8 | D800 |
| D0001 | D0809 | D1617 | D2425 | D3233 | D4041 | D4849 | D5657 | CB 3467 | CB BCEF |
| 0304 | 1112 | 1920 | 2728 | 3536 | 4344 | 5152 | 5960 | | |
| 174F | 17A9 | 17DA | 176D | 17BB | 1750 | 172E | 8787 | 00E8 | E800 |
| D0001 | D0609 | D1617 | D2425 | D3233 | D4041 | D4849 | D5657 | CB 3567 | CB BDEF |
| 0204 | 1012 | 1820 | 2628 | 3436 | A244 | 5052 | 5860 | | |
| 0FD3 | CFE7 | 0FFD | 0FF0 | 0F78 | 0F30 | 0F1E | 0F0F | 00F0 | F000 |
| D0001 | D0809 | D1617 | D2425 | D3233 | D4041 | D4849 | D5657 | CB 4567 | CB CDEF |
| 0203 | 1011 | 1819 | 2627 | 3435 | 4243 | 5051 | 5859 | | |
| Syndrome code and position for any combination of 5 bits within the same byte ||||||||||
| F8C5 | F8CE | F876 | F83B | F893 | F8C7 | F8ED | F8F8 | 001F | 1F00 |
| D03C4 | D1112 | D1920 | D2728 | D3536 | D4344 | D5152 | D5960 | CB 01234 | CB 89ABC |
| 050607 | 131415 | 212223 | 293031 | 373839 | 454647 | 535455 | 616263 | | |
| F48B | F4CB | F4EB | F4FB | F4F3 | F4F7 | F4F5 | F4F4 | 002F | 2F00 |
| D0204 | D1C12 | D1820 | D2628 | D3436 | D4244 | D5052 | D5860 | CB 01235 | CB 89ABD |
| 050607 | 131415 | 212223 | 293031 | 373839 | 454647 | 535455 | 616263 | | |
| F2AC | F256 | F22B | F29B | F2C3 | F2EF | F2F9 | F2F2 | 004F | 4F00 |
| D0104 | D0912 | D1720 | D2528 | D3336 | D4144 | D4952 | D5760 | CB 01236 | CB 89ABE |
| 050607 | 131415 | 212223 | 293031 | 373839 | 454647 | 535455 | 616263 | | |
| F131 | F196 | F14B | F1AB | F1DB | F1E3 | F1FF | F1F1 | 008F | 8F00 |
| D0004 | D0812 | D1620 | D2428 | D3236 | D4044 | D4852 | D5660 | CB 01237 | CB 89ABF |
| 050607 | 131415 | 212223 | 293031 | 373839 | 454647 | 535455 | 616263 | | |
| EC17 | EC85 | E000 | EC66 | EC33 | EC97 | E005 | 7C7C | 0037 | 3700 |
| D0203 | D1011 | D1819 | D2627 | D3435 | D4243 | D5051 | D5859 | CB 01245 | CB 89ACD |
| 050607 | 131415 | 212223 | 293031 | 373839 | 454647 | 535455 | 616263 | | |
| EA30 | EA18 | EA00 | EA06 | EA03 | EA8F | EAC9 | 7A7A | 0057 | 5700 |
| D0103 | D0911 | D1719 | D2527 | D3335 | D4143 | D4951 | D5759 | CB 01246 | CB 89ACE |
| 050607 | 131415 | 212223 | 293031 | 373839 | 454647 | 535455 | 616263 | | |
| E9AD | E9D8 | E960 | E936 | E91B | E983 | E9CF | 7979 | 0097 | 9700 |
| D0003 | D0811 | D1619 | D2427 | D3235 | D4043 | D4851 | D5659 | CB 01247 | CB 89ACF |
| 050607 | 131415 | 212223 | 293031 | 373839 | 454647 | 535455 | 616263 | | |
| E67E | E63F | E691 | E6C6 | E663 | E6BF | E6D1 | 7676 | 0067 | 6700 |
| D0102 | D0910 | D1718 | D2526 | D3334 | D4142 | D4950 | D5758 | CB 01256 | CB 89ADE |
| 050667 | 131415 | 212223 | 293031 | 373839 | 454647 | 535455 | 616263 | | |
| E5E3 | E5FF | E5F1 | E5F6 | E57B | E5B3 | E5D7 | 7575 | 00A7 | A700 |
| D0002 | D0810 | D1618 | D2426 | D3234 | D4042 | D4850 | D5658 | CB 01257 | CB 89ABF |
| 050607 | 131415 | 212223 | 293031 | 373839 | 454647 | 535455 | 616263 | | |
| E3C4 | E362 | E331 | E396 | E34B | E3AB | E3DB | 7373 | 00C7 | C700 |
| D0001 | D0809 | D1617 | D2425 | D3233 | D4041 | D4849 | D5657 | CB 01267 | CB 89AEF |
| 050607 | 131415 | 212223 | 293031 | 373839 | 454647 | 535455 | 616263 | | |
| DC32 | DC19 | DC82 | DC41 | DCAE | DC57 | DCA5 | BCBC | 003B | 3B00 |
| D0203 | D1011 | D1819 | D2627 | D3435 | D4243 | D5051 | D5859 | CB 01345 | CB 89BCD |
| 040607 | 121415 | 202223 | 283031 | 363839 | 444647 | 525455 | 606263 | | |
| DA15 | DA84 | DA42 | DA21 | DA9E | DA4F | DAA9 | BABA | 005B | 5B00 |
| D0103 | D0911 | D1719 | D2527 | D3335 | D4143 | D4951 | D5759 | CB 01346 | CB 89BCE |
| 040607 | 121415 | 202223 | 283031 | 363839 | 444647 | 525455 | 606263 | | |
| D988 | D944 | D922 | D911 | D986 | D943 | D9AF | B9B9 | 009B | 9B00 |
| D0003 | D0811 | D1619 | D2427 | D3235 | D4043 | D4851 | D5659 | CB 01347 | CB 89BCF |
| 040607 | 121415 | 202223 | 283031 | 363839 | 444647 | 525455 | 606263 | | |
| D65B | D6A3 | D6DF | D6E1 | D6FE | D67F | D6B1 | B6B6 | 006B | 6B00 |
| D0102 | D0910 | D1718 | D2526 | D3334 | D4142 | D4950 | D5758 | CB 01356 | CB 89BDE |

-continued

| Byte 0 | Byte 1 | Byte 2 | Byte 3 | Byte 4 | Byte 5 | Byte 6 | Byte 7 | Byte 8 | Byte 9 |
|---|---|---|---|---|---|---|---|---|---|
| 040607 | 121415 | 202223 | 283031 | 363839 | 444647 | 525455 | 606263 | | |
| D5C6 | D563 | D5BF | D5D1 | D5E6 | D573 | D5B7 | B5B5 | 00AB | AB00 |
| D0002 | DC810 | D1618 | D2426 | D3234 | D4042 | D4850 | D5658 | CB C1357 | CB 89BDF |
| 040607 | 121415 | 202223 | 283031 | 363839 | 444647 | 525455 | 606263 | | |
| D3E1 | D3FE | D37F | D3B1 | D3D6 | D36B | D3BB | B3B3 | 00CB | CB00 |
| D0001 | D0809 | D1617 | D2425 | D3233 | D4041 | D4849 | D5657 | CB C1367 | CB 89BEF |
| 040607 | 121415 | 202223 | 283031 | 363839 | 444647 | 525455 | 606263 | | |
| CEC7 | CEED | CEF8 | CE70 | CE3E | CE1F | CE81 | 3E3E | 0073 | 7300 |
| D0102 | D0910 | D1718 | D2526 | D3334 | D4142 | D4950 | D5758 | CB C1456 | CB 89CDE |
| 030607 | 111415 | 192223 | 273031 | 353839 | 434647 | 515455 | 596263 | | |
| CD5A | CD2D | CD98 | CD40 | CD26 | CD13 | CD87 | 3D3D | 00B3 | B300 |
| D0002 | D0810 | D1618 | D2426 | D3234 | D4C42 | D4850 | D5658 | CB 01457 | CB 89CDF |
| 030607 | 111415 | 192223 | 273031 | 353839 | 434647 | 515455 | 596263 | | |
| CB7D | CBB0 | CB58 | CB20 | CB16 | CBCB | CB8B | 3B3B | 00D3 | D300 |
| D0001 | D0809 | D1617 | D2425 | D3233 | D4C41 | D4849 | D5657 | CB 01467 | CB 89CEF |
| 030607 | 111415 | 192223 | 273031 | 35383 | 434647 | 515455 | 596263 | | |
| C733 | C797 | C7C5 | C7E0 | C776 | C73B | C793 | 3737 | 00E3 | E300 |
| D0001 | D0809 | D1617 | D2425 | D3233 | D4041 | D4849 | D5657 | CB 01567 | CB 89DEF |
| 020607 | 101415 | 182223 | 263031 | 343839 | 424647 | 505455 | 586263 | | |
| BC78 | BC3C | BC1E | BC0F | BC89 | BCCA | BC65 | DCDC | 003D | 3D00 |
| D0203 | D1011 | D2627 | D3435 | D4243 | D5051 | D5859 | CB C2345 | CB 8ABCD | |
| | D1819 | | | | | | | | |
| 040507 | 121315 | 202123 | 282931 | 363739 | 444547 | 525355 | 606163 | | |
| BA5F | BAA1 | BADE | BA6F | BAB9 | BAD2 | BA69 | DADA | 005D | 5D00 |
| D0103 | D0911 | D1719 | D2527 | D3335 | D4143 | D4951 | CB D5759 02346 | CB 8ABCE | |
| 040507 121315 | 202123 | 282931 | 363739 | 444547 | 525355 | 606163 | | | |
| B9C2 | B961 | B9BE | B95F | B9A1 | B9DE | B96F | D9D9 | 009D | 9D00 |
| D0003 | D0811 | D1619 | D2427 | D3235 | D4043 | D4851 | D5659 | CB C2347 | CB BABCF |
| 040507 | 121315 | 202123 | 282931 | 363739 444547 | 525355 | 606163 | | | |
| B611 | B686 | B643 | B6AF | B6D9 | B6E2 | B671 | D6D6 | 006D | 6D00 |
| D0102 | D0910 | D1718 | D2526 | D3334 | D4142 | D4950 | D5758 | CB C2356 | CB 8ABDE |
| 040507 | 121315 | 202123 | 282931 | 363739 | 444547 | 525355 | 606163 | | |
| B58C | B546 | B523 | B59F | B5C1 | B5EE | B577 | D5D5 | 00AD | AD00 |
| D0002 | D0810 | D1618 | D2426 | D3234 | D4042 | D4850 | D5658 | CB 02357 | CB 8ABDF |
| 040507 | 121315 | 202123 | 282931 | 363739 | 444547 | 525355 | 606163 | | |
| B3AB | B3DB | B3E3 | B3FF | B3F1 B3F6 | B37B | D3D3 | 00CD | CD00 | |
| D0001 | D0809 | D1617 | D2425 | D3233 | D4041 | D4849 | D5657 | CB C2367 | CB 8ABEF |
| 040507 | 121315 | 202123 | 282931 | | 444547 | 525355 | 606163 | | |
| AE8D | AEC8 | AE64 AE32 | AE19 | AE82 | AE41 | 5E5E | 0075 | 7500 | |
| D0102 | D0910 | D1718 | D2526 | D3334 | D4142 | D4950 | D5758 | CB C2456 | CB 8ACDE |
| 030507 | 111315 | 192123 | 272931 | 353739 | 434547 | 515355 | 596163 | | |
| AD10 | ADC8 | ADC4 | ADC2 | AD01 | AD8E | AD47 | 5D5D | 00B5 | B500 |
| D0002 | D0810 | D1618 | D2426 | D3234 | D4042 | D4850 | D5658 | CB C2457 | CB 8ACDF |
| 030507 | 111315 | 192123 | 272931 | 353739 | 434547 | 515355 | 596163 | | |
| AB37 | AB95 | ABC4 | AB62 | AB31 | AB96 | AB4B | 5B5B | 00D5 | D500 |
| D0001 | D0809 | D1617 | D2425 | D3233 | D4041 | D4849 | D5657 | CB C2467 | CB 8ACEF |
| 030507 | 111315 | 192123 | 272931 | 353739 | 434547 | 515355 | 596163 | | |
| A779 | A7B2 | A759 | A7A2 | A751 | A7A6 | A753 | 5757 | 00E5 | E500 |
| D0001 | D0809 | D1617 | D2425 | D3233 | D4041 | D4849 | D5657 | CB C2567 | CB 8ADEF |
| 020507 | 101315 | 182123 | 262931 | 343739 | 424547 | 5C5355 | 586163 | | |
| 9EA8 | 9E54 | 9E2A | 9E15 | 9E84 | 9E42 | 9E21 | 9E9E | 0079 | 7900 |
| D0102 | D0910 | D1718 | D2526 | D3334 | D4142 | D4950 | D5758 | CB 03456 | CB 8BCDE |
| 030407 | 111215 | 192023 | 272831 | 353639 | 434447 | 515255 | 596063 | | |
| 9D35 | 9D94 | 9D4A | 9D25 | 9D9C | 9D4E | 9D27 | 9D9D | 00B9 | B900 |
| D0002 | D0B10 | D1618 | D2426 | D3234 | D4042 | D4850 | D5658 | CB 03457 | CB 8BCDF |
| 030407 | 111215 | 192023 | 272831 | 353639 | 434447 | 515255 | 596063 | | |
| 9B12 | 9B09 | 9B8A | 9B45 | 9BAC | 9B56 | 9B2B | 9B9B | 00D9 | D900 |
| D0001 | D0809 | D1617 | D2425 | D3233 | D4C41 | D4849 | D5657 | CB C3467 | CB 8BCEF |
| 030407 | 111215 | 192023 | 272631 | 353639 | 434447 | 515255 | 596063 | | |
| 975C | 972E | 9717 | 9785 | 97CC | 9766 | 9733 | 9797 | 00E9 | E900 |
| D0001 | D0809 | D1617 | D2425 | D3233 | D4041 | D4849 | D5657 | CB C3567 | CB 8BDEF |
| 020407 | 101215 | 182023 | 262631 | 343639 | 424447 | 505255 | 586063 | | |
| 8FC0 | 8F60 | 8F30 | 8F18 | 8F0C | 8FC6 | 8F03 | 1F1F | 00F1 | F100 |
| D0001 | D0809 | D1617 | D2425 | D3233 | D4041 | D4849 | D5657 | CB C4567 | CB 8CDEF |
| 020307 | 101115 | 181923 | 262731 | 343539 | 424347 | 505155 | 585963 | | |
| 7CEC | 7C76 | 7C3B | 7C93 | 7CC7 | 7CED | 7CF8 | ECEC | 003E | 3E00 |
| D0203 | D1011 | D1819 | D2627 | D3435 | D4243 | D5051 | D5859 | CB 12345 | CB 9ABCD |
| 040506 | 121314 | 202122 | 282930 | 363738 | 444546 | 525354 | 606162 | | |
| 7ACB | 7AEB | 7AFB | 7AF3 | 7AF7 | 7AF5 | 7AF4 | EAEA | 005E | 5E00 |
| D0103 | D0911 | D1719 | D2527 | D3335 | D4143 | D4951 | D5759 | CB 12346 | CB 9ABCE |
| 040506 | 121314 | 202122 | 282930 | 363738 | 444546 | 525354 | 606162 | | |
| 7956 | 792B | 799B | 79C3 | 79EF | 79F9 | 79F2 | E9E9 | 009E | 9E00 |
| D0003 | D0811 | D1619 | D2427 | D3235 | D4043 | D4851 | D5659 | CB 12347 | CB 9ABCF |
| 040506 | 121314 | 202122 | 282930 | 363738 | 444546 | 525354 | 606162 | | |

| Byte 0 | Byte 1 | Byte 2 | Byte 3 | Byte 4 | Byte 5 | Byte 6 | Byte 7 | Byte 8 | Byte 9 |
|---|---|---|---|---|---|---|---|---|---|
| 7685 | 76CC | 7666 | 7633 | 7697 | 76C5 | 76EC | E6E6 | 006E | 6E00 |
| D0102 | D0910 | D1718 | D2526 | D3334 | D4142 | D4950 | D5758 | CB 12356 | CB 9ABDE |
| 040506 | 121314 | 202122 | 282930 | 363738 | 444546 | 525354 | 606162 | | |
| 7518 | 750C | 7506 | 7503 | 758F | 75C9 | 75EA | E5E5 | 00AE | AE00 |
| D0002 | D0810 | D1618 | D2426 | D3234 | D4042 | D4850 | D5658 | CB 12357 | CB 9ABDF |
| 040506 | 121314 | 202122 | 282930 | 363738 | 444546 | 525354 | 606162 | | |
| 733F | 7391 | 73C6 | 7363 | 73BF | 73D1 | 73E6 | E3E3 | 00CE | CE00 |
| D0001 | D0809 | D1617 | D2425 | D3233 | D4041 | D4849 | D5657 | CB 12367 | CB 9ABEF |
| 040506 | 121314 | 202122 | 282930 | 363738 | 444546 | 525354 | 606162 | | |
| 6E19 | 6E82 | 6E41 | 6EAE | 6E57 | 6EA5 | 6EDC | 6E6E | 0076 | 7600 |
| D0102 | D0910 | D1718 | D2526 | D3334 | D4142 | D4950 | D5758 | CB 12456 | CB 9ACDE |
| 030506 | 111314 | 192122 | 272930 | 353738 | 434546 | 515354 | 596162 | | |
| 6D84 | 6D42 | 6D21 | 6D9E | 6D4F | 6DA9 | 6DDA | 6D6D | 00B6 | B600 |
| D0002 | D0810 | D1618 | D2426 | D3234 | D4042 | D4850 | D5658 | CB 12457 | CB 9ACDF |
| 030506 | 111314 | 192122 | 272930 | 353738 | 434546 | 515354 | 596162 | | |
| 6BA3 | 6BDF | 6BE1 | 6BFE | 6B7F | 6BB1 | 6BD6 | 6B6B | 00D6 | D600 |
| D0001 | D0809 | D1617 | D2425 | D3233 | D4041 | D4849 | D5657 | CB 12467 | CB 9ACEF |
| 030506 | 111314 | 192122 | 272930 | 353738 | 434546 | 515354 | 596162 | | |
| 67ED | 67F6 | 677C | 673E | 671F | 6761 | 67CE | 6767 | 00E6 | E600 |
| D0001 | D0809 | D1617 | D2425 | D3233 | D4041 | D4849 | D5657 | CB 12567 | CB 9ADEF |
| 020506 | 101314 | 182122 | 262930 | 343738 | 424546 | 505354 | 586162 | | |
| 5E3C | 5E1E | 5ECF | 5E89 | 5ECA | 5EE5 | 5EBC | AEAE | 007A | 7A00 |
| D0102 | D0910 | D1718 | D2526 | D3334 | D4142 | D4950 | D5758 | CB 13456 | CB 9BCDE |
| 030406 | 111214 | 192022 | 272830 | 353638 | 434446 | 515254 | 596062 | | |
| 5DA1 | 5DDE | 5D6F | 5DB9 | 5DD2 | 5D69 | 5DBA | ADAD | 00BA | BA00 |
| D0002 | D0810 | D1618 | D2426 | D3234 | D4042 | D4850 | D5658 | CB 13457 | CB 9BCDF |
| 030406 | 111214 | 192022 | 272830 | 353638 | 434446 | 515254 | 596062 | | |
| 5B86 | 5B43 | 5BAF | 5BD9 | 5BE2 | 5B71 | 5BB6 | ABAB | 00DA | DA00 |
| D0001 | D0809 | D1617 | D2425 | D3233 | D4041 | D4849 | D5657 | CB 13467 | CB 9BCEF |
| 030406 | 111214 | 192022 | 272830 | 353638 | 434446 | 515254 | 596062 | | |
| 57C8 | 5764 | 5732 | 5719 | 5782 | 5741 | 57AE | A7A7 | 00EA | EA00 |
| D0001 | D0809 | D1617 | D2425 | D3233 | D4041 | D4849 | D5657 | CB 13567 | CB 9BDEF |
| 020406 | 101214 | 182022 | 262830 | 343638 | 424446 | 505254 | 586062 | | |
| 4F54 | 4F15 | 4F84 | 4F42 | 4F21 | 4F9E | 2F2F | 00F2 | F200 | |
| 4F2A | | | | | | | | | |
| D0001 | D0809 | D1617 | D2425 | D3233 | D4041 | D4849 | D5657 | CB 14567 | CB 9CDEF |
| 020306 | 101114 | 181922 | 262730 | 343538 | 424346 | 505154 | 585962 | | |
| 3E76 | 3E3B | 3E93 | 3EC7 | 3EED | 3EF8 | 3E7C | CECE | 007C | 7C00 |
| D0102 | D0910 | D1718 | D2526 | D3334 | D4142 | D4950 | D5758 | CB 23456 | CB ABCDE |
| 030405 | 111213 | 192021 | 272829 | 353637 | 434445 | 515253 | 596061 | | |
| 3DEB | 3DFB | 3DF3 | 3DF7 | 3DF5 | 3DF4 | 3D7A | CDCD | 00BC | BC00 |
| D0002 | D0810 | D1618 | D2426 | D3234 | D4042 | D4850 | D565B | CB 23457 | CB ABCDF |
| 030405 | 111213 | 192021 | 272829 | 353637 | 434445 | 515253 | 596061 | | |
| 3BCC | 3B66 | 3B33 | 3B97 | 3BC5 | 3BEC | 3B76 | CBCB | 00DC | DC00 |
| D0001 | D0809 | D1617 | D2425 | D3233 | D4041 | D4849 | D5657 | CB 23467 | CB ABCEF |
| 030405 | 111213 | 192021 | 272829 | 353637 | 434445 | 515253 | 596061 | | |
| 3782 | 3741 | 37AE | 3757 | 37A5 | 37DC | 376E | C7C7 | 00EC | EC00 |
| D0001 | D0809 | D1617 | D2425 | D3233 | D4041 | D4849 | D5657 | CB 23567 | CB ABDEF |
| 020405 | 101213 | 182021 | 262829 | 343637 | 424445 | 505253 | 586061 | | |
| 2F1E | 2FCF | 2F89 | 2FCA | 2F65 | 2FB0 | 2F5E | 4F4F | 00F4 | F400 |
| D0001 | D0809 | D1617 | D2425 | D3233 | D4041 | D4849 | D5657 | CB 24567 | CB ACDEF |
| 020305 | 101113 | 181921 | 262729 | 343537 | 424345 | 505153 | 585961 | | |
| 1F3B | 1F93 | 1FC7 | 1FED | 1FF8 | 1F7C | 1F3E | 8F8F | 00F8 | F800 |
| D0001 | D0809 | D1617 | D2425 | D3233 | D4041 | D4849 | D5657 | CB 34567 | CB BCDEF |
| 020304 | 101112 | 181920 | 262728 | 343536 | 424344 | 505152 | 585960 | | |

Syndrome code and position for any combination of 6 bits within the same byte

| Byte 0 | Byte 1 | Byte 2 | Byte 3 | Byte 4 | Byte 5 | Byte 6 | Byte 7 | Byte 8 | Byte 9 |
|---|---|---|---|---|---|---|---|---|---|
| FCFF | FCF1 | FCF6 | FC7B | FCB3 | FCD7 | FCE5 | FCFC | 003F | 3F00 |
| D0203 | D1011 | D1819 | D2627 | D34353 | D4243 | D5051 | D5859 | CB C12345 | CB 89ABCD |
| 0405 | 1213 | 2021 | 2829 | 637 | 4445 | 5253 | 6061 | | |
| 0607 | 1415 | 2223 | 3031 | 3839 | 4647 | 5455 | 6263 | | |
| FAD8 | FA6C | FA36 | FA1B | FA83 | FACF | FAE9 | FAFA | 005F | 5F00 |
| D0103 | D0911 | D1719 | D2527 | D3335 | D4143 | D4951 | D5759 | CB C12346 | CB 89ABCE |
| 0405 | 1213 | 2021 | 2829 | 3637 | 4445 | 5253 | 6061 | | |
| 0607 | 1415 | 2223 | 3031 | 3839 | 4647 | 5455 | 6263 | | |
| F945 | F9AC | F956 | F92B | F99B | F9C3 | F9EF | F9F9 | 009F | 9F00 |
| D0003 | D0811 | D1619 | D2427 | D3235 | D4043 | D4851 | D5659 | CB C12347 | CB 89ABCF |
| 0405 | 1213 | 2021 | 2829 | 3637 | 4445 | 5253 | 6061 | | |
| 0607 | 1415 | 2223 | 3031 | 3839 | 4647 | 5455 | 6263 | | |
| F696 | F64B | F6AB | F6DB | F6E3 | F6FF | F6F1 | F6F6 | 006F | 6F00 |
| D0102 | D0910 | D1718 | D2526 | D3334 | D4142 | D4950 | D5758 | CB C12356 | CB 89ABDE |
| 0405 | 1213 | 2021 | 2829 | 3637 | 4445 | 5253 | 6061 | | |
| 0607 | 1415 | 2223 | 3031 | 3839 | 4647 | 5455 | 6263 | | |
| F50B | F58B | F5CB | F5EB | F5FB | F5F3 | F5F7 | F5F5 | 00AF | AF00 |
| D0002 | D0810 | D1618 | D2426 | D3234 | D4042 | D4850 | D5658 | CB 012357 | CB 89ABDF |
| 0405 | 1213 | 2021 | 2829 | 3637 | 4445 | 5253 | 6061 | | |
| 0607 | 1415 | 2223 | 3031 | 3839 | 4647 | 5455 | 6263 | | |
| F32C | F316 | F30B | F38B | F3CB | F3EB | F3FB | F3F3 | 00CF | CF00 |

-continued

| Byte 0 | Byte 1 | Byte 2 | Byte 3 | Byte 4 | Byte 5 | Byte 6 | Byte 7 | Byte 8 | Byte 9 |
|---|---|---|---|---|---|---|---|---|---|
| D0001 | D0809 | D1617 | D2425 | D3233 | D4041 | D4849 | D5657 | CB 012367 | CB 89ABEF |
| 0405 | 1213 | 2021 | 2829 | 3637 | 4445 | 5253 | 6061 | | |
| 0607 | 1415 | 2223 | 3031 | 3839 | 4647 | 5455 | 6263 | | |
| EE0A | EE05 | EE8C | EE46 | EE23 | EE9F | EEC1 | 7E7E | 0077 | 7700 |
| D0102 | D0910 | D1718 | D2526 | D3334 | D4142 | D4950 | D5758 | CB 012456 | CB 89ACDE |
| 03050 | 1113 | 1921 | 2729 | 3537 | 4345 | 5153 | 5961 | | |
| 0607 | 1415 | 2223 | 3031 | 3839 | 4647 | 5455 | 6263 | | |
| ED97 | EDC5 | EDE0 | ED76 | ED3B | ED93 | EDC7 | 7D7D | 00B7 | B700 |
| D0002 | D0810 | D1618 | D3234 | D4042 | D5658 | CB 012457 | CB 89ACDF | | |
| | | D2426 | | D4850 | | | | | |
| 0305 | 1113 | 1921 | 2729 | 3537 | 4345 | 5153 | 5961 | | |
| 0607 | 1415 | 2223 | 3031 | 3839 | 4647 | 5455 | 6263 | | |
| EBB0 | EB58 | EB2C | EB16 | EB0B | EB8B | EBCB | 7B7B | 00D7 | D700 |
| D0001 | D0809 | D1617 | D2425 | D3233 | D4041 | D4849 | D5657 | CB 012467 | CB 89ACEF |
| 0305 | 1113 | 1921 | 2729 | 3537 | 4345 | 5153 | 5961 | | |
| 0607 | 1415 | 2223 | 3031 | 3839 | 4647 | 5455 | 6263 | | |
| E7FE | E77F | E7B1 | E7D6 | E76B | E7BB | E7D3 | 7777 | 00E7 | E700 |
| D0001 | D0809 | D1617 | D2425 | D3233 | D4041 | D4849 | D5657 | CB 012567 | CB 89ADEF |
| 0205 | 1013 | 1821 | 2629 | 3437 | 4245 | 5053 | 5861 | | |
| 0607 | 1415 | 2223 | 3031 | 3839 | 4647 | 5455 | 6263 | | |
| DE2F | DE99 | DEC2 | DE61 | DEBE | DE5F | DEA1 | BEBE | 007B | 7B00 |
| D0102 | D0910 | D1718 | D2526 | D3334 | D4142 | D4950 | D5758 | CB 013456 | CB 89BCDE |
| 0304 | 1112 | 1920 | 2728 | 3536 | 4344 | 5152 | 5960 | | |
| 0607 | 1415 | 2223 | 3031 | 3839 | 4647 | 5455 | 6263 | | |
| DDB2 | DD59 | DDA2 | DD51 | DDA6 | DD53 | DDA7 | BDBD | 00BB | BB00 |
| D0002 | D0810 | D1618 | D2426 | D3234 | D4042 | D4850 | D5658 | CB 013457 | CB 89BCDF |
| 0304 | 1112 | 1920 | 2728 | 3536 | 4344 | 5152 | 5960 | | |
| 0607 | 1415 | 2223 | 3031 | 3839 | 4647 | 5455 | 6263 | | |
| DB95 | DBC4 | DB62 | DB31 | DB96 | DB4B | DBAB | BBBB | 00DB | DB00 |
| D0001 | D0809 | D1617 | D2425 | D3233 | D4041 | D4849 | D5657 | CB 013467 | CB 89BCEF |
| 0304 | 1112 | 1920 | 2728 | 3536 | 4344 | 5152 | 5960 | | |
| 0607 | 1415 | 2223 | 3031 | 3839 | 4647 | 5455 | 6263 | | |
| D7DB | D7E3 | D7FF | D7F1 | D7F6 | D77B | D7B3 | B7B7 | 00EB | EB00 |
| D0001 | D0809 | D1617 | D2425 | D3233 | D4041 | D4849 | D5657 | CB 013567 | CB 89BDEF |
| 0204 | 1012 | 1820 | 2628 | 3436 | 4244 | 5052 | 5860 | | |
| 0607 | 1415 | 2223 | 3031 | 3839 | 4647 | 5455 | 6263 | | |
| CF47 | CFAD | CFD8 | CF6C | CF36 | CF1B | CF83 | 3F3F | 00F3 | F300 |
| D0001 | D0809 | D1617 | D2425 | D3233 | D4041 | D4849 | D5651 | CB 014567 | CB 89CDEF |
| 0203 | 1011 | 1819 | 2627 | 3435 | 4243 | 5051 | 5859 | | |
| 0607 | 1415 | 2223 | 3031 | 3839 | 4647 | 5455 | 6263 | | |
| BE65 | BEB0 | BE5E | BE2F | BE99 | BEC2 | BE61 | DEDE | 007D | 7D00 |
| D0102 | D0910 | D1718 | D2526 | D3334 | D4142 | D4950 | D5758 | CB 023456 | CB 8ABCDE |
| 0304 | 1112 | 1920 | 2728 | 3536 | 4344 | 5152 | 5960 | | |
| 0507 | 1315 | 2123 | 2931 | 3739 | 4547 | 5355 | 6163 | | |

Syndrome code and position for any combination of 7 adjacent bits within the same byte

| Byte 0 | Byte 1 | Byte 2 | Byte 3 | Byte 4 | Byte 5 | Byte 6 | Byte 7 | Byte 8 | Byte 9 |
|---|---|---|---|---|---|---|---|---|---|
| FEE2 | FE71 | FEB6 | FE5B | FEA3 | FEDF | FEE1 | FEFE | 007F | 7F00 |
| D0102 | D0910 | D1716 | D2526 | D3334 | D4142 | D4950 | D5756 | CB 0123456 | CBB9ABCDE |
| 030405 | 111213 | 192021 | 272829 | 353637 | 434445 | 515253 | 596061 | | |
| 0607 | 1415 | 2223 | 3031 | 3639 | 4647 | 5455 | 6263 | | |
| FD7F | FDB1 | FDD6 | FD6B | FDBB | FDD3 | FDE7 | FDFD | 00BF | DF00 |
| D0002 | D0610 | D1616 | D2426 | D3234 | D4042 | D4850 | D5657 | CB 0123457 | CB B9ABCDF |
| 030405 | 111213 | 192021 | 272629 | 353637 | 434445 | 515253 | 585960 | | |
| 0607 | 1415 | 2223 | 3031 | 3839 | 4647 | 5455 | 616263 | | |
| FB58 | FB2C | FB16 | FB0B | FB6B | FBCB | FBEB | FBFB | 00DF | DF00 |
| D0001 | D0609 | D1617 | D2425 | D3233 | D4041 | D4649 | D5658 | CB 0123467 | CB B9ABCEF |
| 030405 | 111213 | 192021 | 272629 | 353637 | 434445 | 515253 | 596061 | | |
| 0607 | 1415 | 2223 | 3031 | 3639 | 4647 | 5455 | 6263 | | |
| F716 | F70B | F7BB | F7CB | F7EB | F7FB | F7F3 | F7F7 | 00EF | EF00 |
| D0001 | D0809 | D1617 | D2425 | D3233 | D4041 | D4849 | D5657 | CB 0123567 | CB B9ABDEF |
| 0204 | 101213 | 162021 | 262629 | 343637 | 424445 | 505253 | 5B6061 | | |
| 050607 | 1415 | 2223 | 3031 | 3639 | 4647 | 5455 | 6263 | | |
| EFBA | EF45 | EFAC | EF56 | EF2B | EF9B | EFC3 | 7F7F | 00F7 | F700 |
| D0001 | D0B09 | D1617 | D2425 | D3233 | D4B49 | D5657 | CB 0124567 | CB B9ACDEF | |
| | | | | D4041 | | | | | |
| 020305 | 101113 | 181921 | 262729 | 343537 | 424345 | 505153 | 565961 | | |
| 0607 | 1415 | 2223 | 3031 | 3839 | 4647 | 5455 | 6263 | | |
| DFAF | DFD9 | DFE2 | DF71 | DFB6 | DF5B | DFA3 | BFBF | 00FB | FB00 |
| D0001 | D0809 | D1617 | D2425 | D3233 | D4041 | D4849 | D5657 | CB 0134567 | CB 89BCDEF |
| 020304 | 101112 | 181920 | 262728 | 343536 | 424344 | 505152 | 555960 | | |
| 0607 | 1415 | 2223 | 3031 | 3639 | 4647 | 5455 | 6263 | | |
| BFE5 | BFF0 | BF7E | BF3F | BF91 | BFC6 | BF63 | DFDF | 00FD | FD00 |
| D0001 | D0809 | D1617 | D2425 | D3233 | D4041 | D4849 | D5657 | CB 0234567 | CB 8ABC-DEF |
| 020304 | 101112 | 161920 | 262726 | 343536 | 424344 | 505152 | 565960 | | |
| 0507 | 1315 | 2123 | 2931 | 3739 | 4547 | 5355 | 6163 | | |
| 7F71 | 7FB6 | 7F5B | 7FA3 | 7FDF | 7FE1 | 7FFE | EFEF | 00FE | FE00 |

-continued

| Byte 0 | Byte 1 | Byte 2 | Byte 3 | Byte 4 | Byte 5 | Byte 6 | Byte 7 | Byte 8 | Byte 9 |
|---|---|---|---|---|---|---|---|---|---|
| D0001 | D0609 | D1617 | D2425 | D3233 | D4041 | D4849 | D5657 | CB 1234567 | CB 9ABC-DEF |
| 020304 | 101112 | 181920 | 262728 | 343536 | 424344 | 505152 | 585960 | | |
| 0506 | 1314 | 2122 | 2930 | 3738 | 4546 | 5354 | 6162 | | |

Syndrome code and position for 8 adj bit

FF00
CB 89ABCDEF
FF31
D0809101112131415
FF4B
D2425262728293031
FF62
D0001020304050607
FF96
D1617181920212223

| BDF8 | BD7C | BD3E | BD1F | BD81 | BDCE | BD67 | DDDD | 00BD | BD00 |
|---|---|---|---|---|---|---|---|---|---|
| D0002 | D0810 | D1618 | D2426 | D3234 | D4042 | D4850 | D5658 | CB 023457 | CB 8ABCbF |
| 0304 | 1112 | 1920 | 2728 | 3536 | 4344 | 5960 | | | |
| | | | | | 5152 | | | | |
| 0507 | 1315 | 2123 | 2931 | 3739 | 4547 | 5355 | 6163 | | |
| BBDF | BBE1 | BBFE | BB7F | BBB1 | BBD6 | BB6B | DBDB | 00DD | DD00 |
| D0001 | D0809 | D1617 | D2425 | D3233 | D4041 | D4849 | D5657 | CB 023467 | CB 8ABCEF |
| 0304 | 1112 | 1920 | 2728 | 3536 | 4344 | 5152 | 5960 | | |
| 0507 | 1315 | 2123 | 2931 | 3739 | 4547 | 5355 | 6163 | | |
| B791 | B7C6 | B763 | B7BF | B7D1 | B7E6 | B773 | D7D7 | 00ED | ED00 |
| D0001 | D0809 | D1617 | D2425 | D3233 | D4041 | D4849 | D5657 | CB 023567 | CB 8ABDEF |
| 0204 | 1012 | 1820 | 2628 | 3436 | 4244 | 5052 | 5860 | | |
| 0507 | 1315 | 2123 | 2931 | 3739 | 4547 | 5355 | 6163 | | |
| AF0D | AF88 | AF44 | AF22 | AF11 | AF86 | AF43 | 5F5F | 00F5 | F500 |
| D0001 | D0809 | D1617 | D2425 | D3233 | D4041 | D4849 | CB | CB 8ACDEF | |
| | | | | | | | D5657 | 024567 | |
| 0203 | 1011 | 1819 | 2627 | 3435 | 4243 | 5051 | 5859 | | |
| 0507 | 1315 | 2123 | 2931 | 3739 | 4547 | 5355 | 6163 | | |
| 9F28 | 9F14 | 9F0A | 9F05 | 9F80 | 9F46 | 9F23 | 9F9F | 00F9 | F900 |
| D0001 | D0809 | D1617 | D2425 | D3233 | D4041 | D4849 | D5657 | CB 034567 | CB 8BCDEF |
| 0203 | 1011 | 1819 | 2627 | 3435 | 4243 | 5051 | 5859 | | |
| 0407 | 1215 | 2023 | 2831 | 3639 | 4447 | 5255 | 6063 | | |
| 7EF1 | 7EF6 | 7E7B | 7EB3 | 7ED7 | 7EE5 | 7EFC | EEEE | 007E | 7E00 |
| D0102 | D0910 | D1718 | D2526 | D3334 | D4142 | D4950 | CB | CB 9ABCDE | |
| | | | | | | | D5758 | 123456 | |
| 0304 | 1112 | 1920 | 2728 | 3536 | 4344 | 5152 | 5960 | | |
| 0506 | 1314 | 2122 | 2930 | 3738 | 4546 | 5354 | 6162 | | |
| 7D6C | 7D36 | 7D1B | 7D83 | 7DCF | 7DE9 | 7DFA | EDED | 00BE | BE00 |
| D0002 | D0810 | D1618 | D2426 | D3234 | D4042 | D4850 | D5658 | CB 123457 | CB 9ABCDF |
| 0304 | 1112 | 1920 | 2728 | 3536 | 4344 | 5152 | 5960 | | |
| 0506 | 1314 | 2122 | 2930 | 3738 | 4546 | 5354 | 6162 | | |
| 7B4B | 7BAB | 7BDB | 7BE3 | 7BFF | 7BF1 | 7BF6 | EBEB | 00DE | DE00 |
| D0001 | D0809 | D1617 | D2425 | D3233 | D4041 | D4849 | D5657 | CB 123467 | CB 9ABCEF |
| 0304 | 1112 | 1920 | 2728 | 3536 | 4344 | 5152 | 5960 | | |
| 0506 | 1314 | 2122 | 2930 | 3738 | 4546 | 5354 | 6162 | | |
| 7705 | 7780 | 7746 | 7723 | 779F | 77C1 | 77EE | E7E7 | 00EE | EE00 |
| D0001 | D0809 | D1617 | D2425 | D3233 | D4041 | D4849 | D5657 | CB 123567 | CB 9ABDEF |
| 0204 | 1012 | 1820 | 2628 | 3436 | 4244 | 5052 | 5860 | | |
| 0506 | 1314 | 2122 | 2930 | 3738 | 4546 | 5354 | 6162 | | |
| 6F99 | 6FC2 | 6F61 | 6FBE | 6F5F | 6FA1 | 6FDE | 6F6F | 00F6 | F600 |
| D0001 | D0809 | D1617 | D2425 | D3233 | D4041 | D4849 | D5657 | CB 124567 | CB 9ACDEF |
| 0203 | 1011 | 1819 | 2627 | 3435 | 4243 | 5051 | 5859 | | |
| 0506 | 1314 | 2122 | 2930 | 3738 | 4546 | 5354 | 6162 | | |
| 5FBC | 5F5E | 5F2F | 5F99 | 5FC2 | 5F61 | 5FBE | AFAF | 00FA | FA00 |
| D0001 | D0809 | D1617 | D2425 | D3233 | D4041 | D4849 | D5657 | CB 134567 | CB 9BCDEF |
| 0203 | 1011 | 1819 | 2627 | 3435 | 4243 | 5051 | 5859 | | |
| 0406 | 1214 | 2022 | 2830 | 3638 | 4446 | 5254 | 6062 | | |
| 3FF6 | 3F7B | 3FB3 | 3FD7 | 3FE5 | 3FF0 | 3F7E | CFCF | 00FC | FC00 |
| D0001 | D0809 | D1617 | D2425 | D3233 | D4041 | D4849 | D5657 | CB 234567 | CB ABCDEF |
| 0203 | 1011 | 1819 | 2627 | 3435 | 4243 | 5051 | 5859 | | |
| 0405 | 1213 | 2021 | 2829 | 3637 | 4445 | 5253 | 6061 | | |

17. The computer system of claim 3, wherein the memory system includes a memory device having address pins to receive the address bits, and wherein the error detection and correction device can detect failure of the address pin.

18. The computer system of claim 17, wherein the memory device receives the address bits in a multiplexed manner.

19. The computer system of claim 18, wherein the memory device receives the address bits as a row address and a column address at different times.

20. A computer system, comprising:

a processor;

a memory system coupled to the processor, the memory system connected to signal lines carrying 64 or fewer data bits and 16 check bits;

an error detection and correction device connected to detect and correct up to eight-bit errors in the data bits using the check bits, and to detect a single-bit error or two-adjacent-bit error in the address bits using the same check bits, wherein the error detection and correction device generates a syndrome table that includes entries mapped to correctable or uncorrectable errors, and a detected address error is mapped to an uncorrectable error entry, and wherein the error detection and correction device can be configured to disable detecting an error in the address bits while enabling detecting and correcting the data bits.

21. A method of detecting and correcting errors in a memory system having address bits, the memory system storing data bits and at least 16 check bits, the method comprising:

configuring address bit error detection;

receiving the data bits, address bits, and check bits;

detecting an error in the address bits using the check bits if the address bit error detection is enabled; and detecting and correcting N-bit errors in the data bits using the same check bits, N being greater than two.

22. The method of claim 21, wherein the data bits are organized as bytes, and the data error detecting and correcting step can detect and correct up to eight-bit errors in each byte.

23. The method of claim 21, wherein the address error detecting step can detect a single-bit error or a two-adjacent-bit error in the address bits.

24. The method of claim 21, wherein the memory system stores 64 or fewer data bits and 16 check bits.

25. The method of claim 21, wherein the memory system stores 32 or fewer address bits.

26. The method of claim 21, wherein the address error detecting step and data error detecting and correcting step generate a syndrome table that includes a plurality of entries mapped to correctable or uncorrectable errors, and wherein a detected address error is mapped to an uncorrectable error entry.

27. The method of claim 21, wherein the address error detecting step includes generating partial address check bits based on the memory address bits, and receiving the partial address check bits to determine if a memory address or data error has occurred.

28. A disk controller, comprising:

a memory system connected to signal lines carrying data bits, address bits, and at least 16 check bits; and an error detection and correction device connected to detect and correct N-bit errors in the data bits using the check bits, and to detect an error in the address bits using the same check bits, N being greater than two, wherein the error detection and correction device can be configured to disable detecting an error in the address bits while enabling detecting and correcting the data bits.

29. The disk controller of claim 28, wherein the data bits are organized as bytes, and the error detection and correction device is connected to detect and correct up to eight-bit errors in each byte.

30. The disk controller of claim 28, wherein the error detection and correction device is connected to detect a single-bit error or a two-adjacent-bit error in the address bits.

31. The disk controller of claim 28, wherein the memory system is connected to signal lines carrying 64 or fewer data bits and 16 check bits.

32. The disk controller of claim 28, wherein the memory system is connected to signal lines carrying 32 or fewer address bits.

33. The disk controller of claim 28, wherein the memory system is used as a cache for data transferred to a disk system connected to the disk controller.

34. The disk controller of claim 28, wherein the memory system includes a memory device having address pins to receive the address bits, and wherein the error detection and correction device can detect failure of the address pin.

35. The disk controller of claim 34, wherein the memory device receives the address bits in a multiplexed manner.

36. The disk controller of claim 35, wherein the memory device receives the address bits as a row address and a column address at different times.

37. A computer system, comprising:

a memory connected to signal lines carrying address bits, 128 or fewer data bits and 32 check bits; and an error detection and correction device connected to detect and correct up to 16-bit errors in the data bits using the check bits, wherein the error detection and correction device is further connected to detect an address error using the same check bits, and wherein the error detection and correction device can be configured to disable detecting an error in the address bits while enabling detecting and correcting the data bits.

38. The computer system of claim 37, the data bits being organized as words, the error detection and correction device capable of detecting and correcting up to 16-bit errors in any particular word.

39. A computer system, comprising:

a memory connected to signal lines carrying address data bits and 64 check bits; and an error detection and correction device connected to detect and correct up to N-bit errors in the data bits, N being greater than or equal to 32, wherein the error detection and correction device is further connected to detect an address error using the same check bits, and wherein the error detection and correction device can be configured to disable detecting an error in the address bits while enabling detecting and correcting the data bits.

40. The computer system of claim 39, wherein the memory is connected to 256 or fewer data bits.

41. The computer system of claim 39, wherein the data bits are organized as double words, and wherein the error and detection device is capable of detecting and correcting up to 32-bit errors in any particular double word.

42. A computer system, comprising:

a memory connected to signal lines carrying address bits, M data bits and N check bits, the ratio of M to N being four, N being greater than or equal to 32; and an error detection and correction device connected to detect and correct up to N/2-bit errors in the M data bits using the check bits, wherein the error detection and correction device is further connected to detect an error in the address bits, and wherein the error detection and correction device can be configured to disable detecting an error in the address bits while enabling detecting and correctino the data bits.

43. The computer system of claim 42, wherein M is 128 and N is 32.

44. The computer system of claim 42, wherein M is 256 and N is 64.

45. A method of detecting and correcting errors in a memory having address bits, the memory storing M data bits and N check bits, the method comprising:

configuring address bit error detection;

receiving the address bits, M data bits and N check bits, the ratio of M to N being four, and N being greater than or equal to 32;

detecting an error in the address bits using the check bits if the address bit error detection is enabled; and detecting and correcting up to N/2-bit errors in the data bits using the check bits.

46. The method of claim 45, wherein M is 128 and N is 32.

47. The method of claim 45, wherein M is 256 and N is 64.

48. A method of detecting and correcting errors in a memory having address bits, the memory storing data bits and check bits, the method comprising:

configuring address bit error detection;

receiving the data bits and address bits;

detecting an error in the address bits using the check bits if the address bit error detection is enabled; and detecting and correcting up to 32-bit errors in the data bits using the check bits.

* * * * *